(12) United States Patent
Seki et al.

(10) Patent No.: US 8,331,653 B2
(45) Date of Patent: Dec. 11, 2012

(54) OBJECT DETECTOR

(75) Inventors: Akihito Seki, Yokohama (JP);
 Masatoshi Okutomi, Tokyo (JP)

(73) Assignees: Tokyo Institute of Technology, Tokyo (JP); Honda Motor Co., Ltd., Tokyo (JP)

( * ) Notice: Subject to any disclaimer, the term of this patent is extended or adjusted under 35 U.S.C. 154(b) by 1069 days.

(21) Appl. No.: 11/659,911

(22) PCT Filed: Aug. 11, 2005

(86) PCT No.: PCT/JP2005/014785
§ 371 (c)(1),
(2), (4) Date: Oct. 7, 2008

(87) PCT Pub. No.: WO2006/016663
PCT Pub. Date: Feb. 16, 2006

(65) Prior Publication Data
US 2009/0169052 A1 Jul. 2, 2009

(30) Foreign Application Priority Data
Aug. 11, 2004 (JP) .................................. 2004-234947

(51) Int. Cl.
 *G06K 9/00* (2006.01)
 *G06K 9/62* (2006.01)
 *G06K 9/36* (2006.01)
(52) U.S. Cl. ........ 382/154; 382/103; 382/106; 382/107; 382/225; 382/291
(58) Field of Classification Search .................. None
See application file for complete search history.

(56) References Cited

U.S. PATENT DOCUMENTS

| 2001/0018640 | A1 | 8/2001 | Matsunaga |
| 2002/0181764 | A1* | 12/2002 | Otani et al. ................. 382/154 |
| 2003/0138133 | A1* | 7/2003 | Nagaoka et al. ............. 382/104 |
| 2004/0085207 | A1 | 5/2004 | Kreiner et al. |
| 2004/0233461 | A1 | 11/2004 | Armstrong et al. |
| 2005/0018043 | A1 | 1/2005 | Takeda et al. |
| 2005/0024491 | A1 | 2/2005 | Takeda et al. |
| 2005/0094879 | A1* | 5/2005 | Harville ....................... 382/209 |

(Continued)

FOREIGN PATENT DOCUMENTS

JP 02-156383 6/1990

(Continued)

OTHER PUBLICATIONS

Vlacic et al., "Intelligent Vehicle Technologies: Theory and Applicatons", Butterworth-Heinemann, 2001 pp. 148-152, 186.

(Continued)

*Primary Examiner* — Vu Le
*Assistant Examiner* — Kenny Cese
(74) *Attorney, Agent, or Firm* — Carrier Blackman & Associates, P.C.; Joseph P. Carrier; William D. Blackman

(57) ABSTRACT

An object position area is calculated according to a position in the space of a detected truck. A template corresponding to the object position area recorded at the previous time is then called. The template is moved to a position on a reference image $I_b$ where the similarity is highest. Overlap rate of the object position area and the template is calculated. A decision is made whether the object is identical to that detected in the past by using the overlap rate.

6 Claims, 39 Drawing Sheets

U.S. PATENT DOCUMENTS

2005/0196015 A1* 9/2005 Luo et al. .................. 382/103
2007/0242944 A1 10/2007 Mizusawa

FOREIGN PATENT DOCUMENTS

| JP | 11-252587 | 9/1999 |
| JP | 11-351862 | 12/1999 |
| JP | 2000-293693 | 10/2000 |
| JP | 2001-021345 | 1/2001 |
| JP | 2001-242934 | 9/2001 |
| JP | 2001-243456 | 9/2001 |
| JP | 2002-157599 | 5/2002 |
| JP | 2003-269937 | 9/2003 |
| JP | 2004-030453 | 1/2004 |
| JP | 2004-177295 | 6/2004 |

OTHER PUBLICATIONS

Authors: Franke, U., et al.; paper title: "Fast Stereo based Object Detection for Stop&Go Traffic", presented at: Intelligent Vehicles Symposium, 1996; published in: *Proceedings of The 1996 IIEE*, Tokyo, Japan, Sep. 19-20, 1996; published by: IIEE, New York City, New York, pp. 339-344.

Authors: Luong, Q.-T., et al.; paper title: "An integrated stereo-based approach to automatic vehicle guidance"; published in: *Proceedings, Fifth International Conference on Computer Vision*, Cambridge, Massachusetts, Jun. 20-23, 1995; published by: IIEE Computer Society, Los Alamitos, California, pp. 52-57.

Author: Seki, A. et al.; Title: "Extraction of Planar Region and Obstacle Detection Using Stereo Images [English translation]"; Publication: JPSJ SIG Technical Report, v. 2004, n. 26; Date=Mar. 5, 2004; pp. 17-24.

Baltzakis H. et al., "Interative computation of 3D plane parameters", Image and Vision Computing Elsevier Netherlands, vol. 18, No. 14, Nov. 2000, pp. 1093-1100, XP008126579, ISSN: 0262-8856, *section 2.3*.

Heung-Yeung Shum and Richard Szeliski (Microsoft Research), Panoramic Image Mosaics, Technical Report—MSR-TR-97-23.

authors: Franke, U., et al.; paper title: "Fast Stereo based Object Detection for Stop&Go Traffic", presented at: Intelli-gent Vehicles Symposium, 1996; published in: *Proceedings of the 1996 IIEE*, Tokyo, Japan, Sep. 19-20, 1996; published by: IIEE, New York City, New York, Sep. 19, 1996; pp. 339-344.

authors: Luong, Q.-T., et al.; paper title: "An integrated stereo-based approach to automatic vehicle guidance"; pub-lished in: *Proceedings, Fifth International Conference on Computer Vision*, Cambridge, Massachusetts, Jun. 20-23, 1995; published by: IIEE Computer Society, Los Alamitos, California, Jun. 20, 1995; pp. 52-57.

editors: Vlacic, L., et al.; book title: *Intelligent Vehicle Technologies: Theory and Applications*; published by: Butter-worth-Heinemann, London, United Kingdom, 2001. pages 446-447.

* cited by examiner

OBJECT DETECTOR

TECHNICAL FIELD

The present invention relates to an object detecting apparatus for detecting a peripheral object based on an acquired image.

BACKGROUND ART

Processes for detecting a road plane area that can be traveled or detecting an obstacle that is present in a traveling environment in guiding a mobile object such as an automobile or the like are roughly classified into processes using a laser radar, ultrasonic waves, a milliwave radar, etc., and processes using images.

The detecting processes using a laser radar and a milliwave radar are problematic in that the apparatus used are generally expensive and a sufficient spatial resolution cannot be achieved. The detecting processes using ultrasonic waves are problematic in that it is difficult to make measurements in distant ranges and the spatial resolution is low.

The processes using images are grouped into single-eyed processes and double-eyed processes. Heretofore, many of the processes using images employ an image obtained from a single eye, i.e., a single viewpoint. They are assumed to be used in a well-maintained environment such as an expressway or the like, and detect a traveling area by detecting a white line on the road (for example, a separation line or a center line). However, in general roads and parking lots where the presence of white lines or the like is not guaranteed and various road plane colors and patterns are present, it is difficult to stably distinguish between areas that can be traveled and obstacles, only from a density pattern obtained from a single-eyed image.

The double-eyed processes, i.e., processes using a stereo image, make it possible to recognize a traveling environment more stably because they can make use of a three-dimensional structure of the traveling environment in principle. Particularly, since an area that can be traveled can be regarded essentially as a plane in space, there has been proposed a process of calculating a projection transformation matrix between images, transforming one of the images into a two-dimensional projection image according to the projection transformation matrix, overlapping the transformed image onto the other image, and detecting whether the image represents a plane area or not or an obstacle or not, based on the overlapping (see Patent Document 1, Non-patent Document 1).

Patent Document 2 discloses an obstacle detecting apparatus. In order to estimate an object area in an image, the obstacle detecting apparatus determines edges of the object area from density change in the image and estimates the object area from an image area with motion using an optical flow detecting means. Then, the apparatus checks matching of position and size in the image with respect to an object area detected by a feature extracting means and an object area detected by the optical flow detecting means, thereby detecting an identical object.

Patent Document 1: Laid-Open Patent Publication 2000-293693 (Japan);

Patent Document 2: Laid-Open Patent Publication 2001-21345 (Japan); and

Non-patent Document 1: Heung-Yeung Shum, Richard Szeliski, "Panoramic Image Mosaics" Technical report, 1997, MSR-TR-97-23, Microsoft Research.

DISCLOSURE OF THE INVENTION

When a vehicle with an object detecting apparatus travels outside, object edges are not necessarily stably determined due to effects of shadows or the like resulting from brightness changes depending on the weather and time. Thus, it is difficult to estimate an object area.

In the image of a complicated scene, there are often some background objects overlapping, other than objects on the road plane. Therefore, when edges are to be extracted from such an image based on density changes, it is likely to estimate an object as including the background objects.

Further, since the image captured by a camera is two-dimensional information, depth information of an object photographed is lost. Because motion of an object in space is observed in the image, as the motion on a two-dimensional plane, a plurality of objects spaced away from each other in space is observed in the image, as the objects being in proximity to or overlapping each other. Therefore, when motion of a plurality of objects is to be observed in the image using an optical flow or the like, the motion of the objects often cannot be traced due to effects of the proximity or the overlapping in the image.

For example, when a periphery of a vehicle traveling a general road, such as the front or the back, is captured by an in-vehicle camera from the vehicle, there are some moving objects, background objects, etc. captured in the image. In the image captured at each time in the above situation, proximity or overlapping in the image frequently occurs depending on the positional relationship of the objects in space.

Also, when a plurality of objects in an image are observed as being in proximity to each other, the obstacle detecting apparatus according to Patent Document 2 may estimate an area enclosing an edge set of the objects as one object area. When a template corresponding to the object area is generated based on the above result, and correlation operation is performed on the images at successive times, accurate detecting process cannot be performed because of low correlation if the objects are moving away from each other in the image.

It is a main object of the present invention to provide an object detecting apparatus which can identify a plurality of objects individually and stably even if the objects are in proximity to or partially overlap each other in an image.

Another object of the present invention is to trace an object more reliably, in view of travel distance with respect to a center-of-gravity position.

Further object of the present invention is to calculate a relative velocity highly accurately with variation on measure points reduced and to improve accuracy in stereo measurement.

With an object detecting apparatus according to the present invention, since object tracing is performed using the correlation of features in an image and the positional relationship of features in space, even if near objects and remote objects are observed in the image as being in proximity to or partially overlapping each other, the apparatus can distinguish between the near objects and the remote objects and associate them with each other, respectively. Therefore, it is possible to accurately associate an object position area at each time with an object and to stably identify each object. Also, in comparison with the object tracing using only positional relationship in space, it is possible to trace objects more stably when correlation on the image is considered.

Furthermore, it is possible to trace an object more reliably in view of travel distance with respect to a center-of-gravity position.

With the object detecting apparatus installed in a vehicle, the relative velocity of an object can be determine accurately and the absolute velocity of the detected object can be determined accurately based on a mobile object's own velocity and the relative velocity of the detected object. Thus, it can be judged accurately whether the detected object is a still object or not.

BEST MODE FOR CARRYING OUT THE INVENTION

Figure 1:
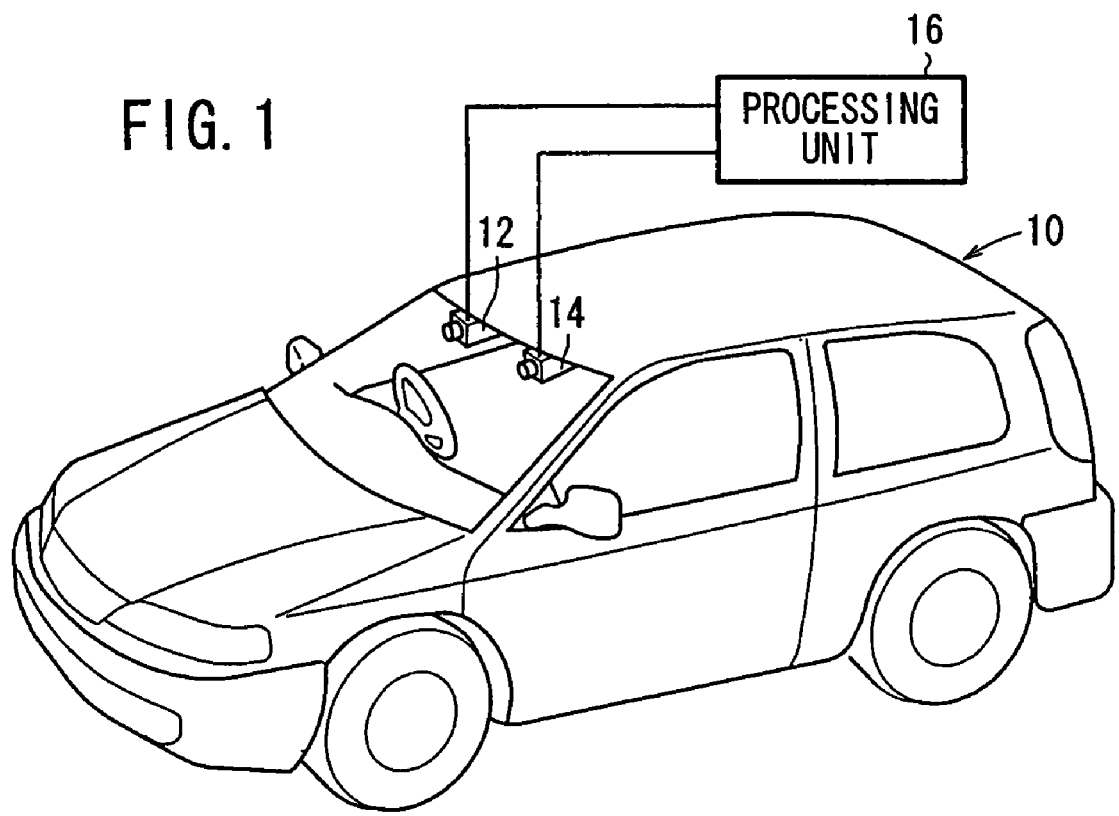
FIG. 1 is a view illustrative of a vehicle to which an object detecting apparatus according to the present invention is applied.

FIG. 1 shows a vehicle 10 according to an embodiment to which an object detecting apparatus according to the present invention is applied. The vehicle 10 has a windshield on which there are fixedly mounted a base camera 12 and a reference camera 14 in upper left and right regions thereof as a pair of image capturing means for capturing images including a road plane area where the vehicle 10 travels. The base camera 12 and the reference camera 14 are stereo cameras comprising CCD cameras or the like with a common image capturing area set therein. The base camera 12 and the reference camera 14 are connected to a processing unit 16 for processing captured images to detect the road plane area and an object which may possibly become an obstacle. In the description which follows, an image captured by the base camera 12 will be referred to as a base image, and an image captured by the reference camera 14 as a reference image.

Figure 2:
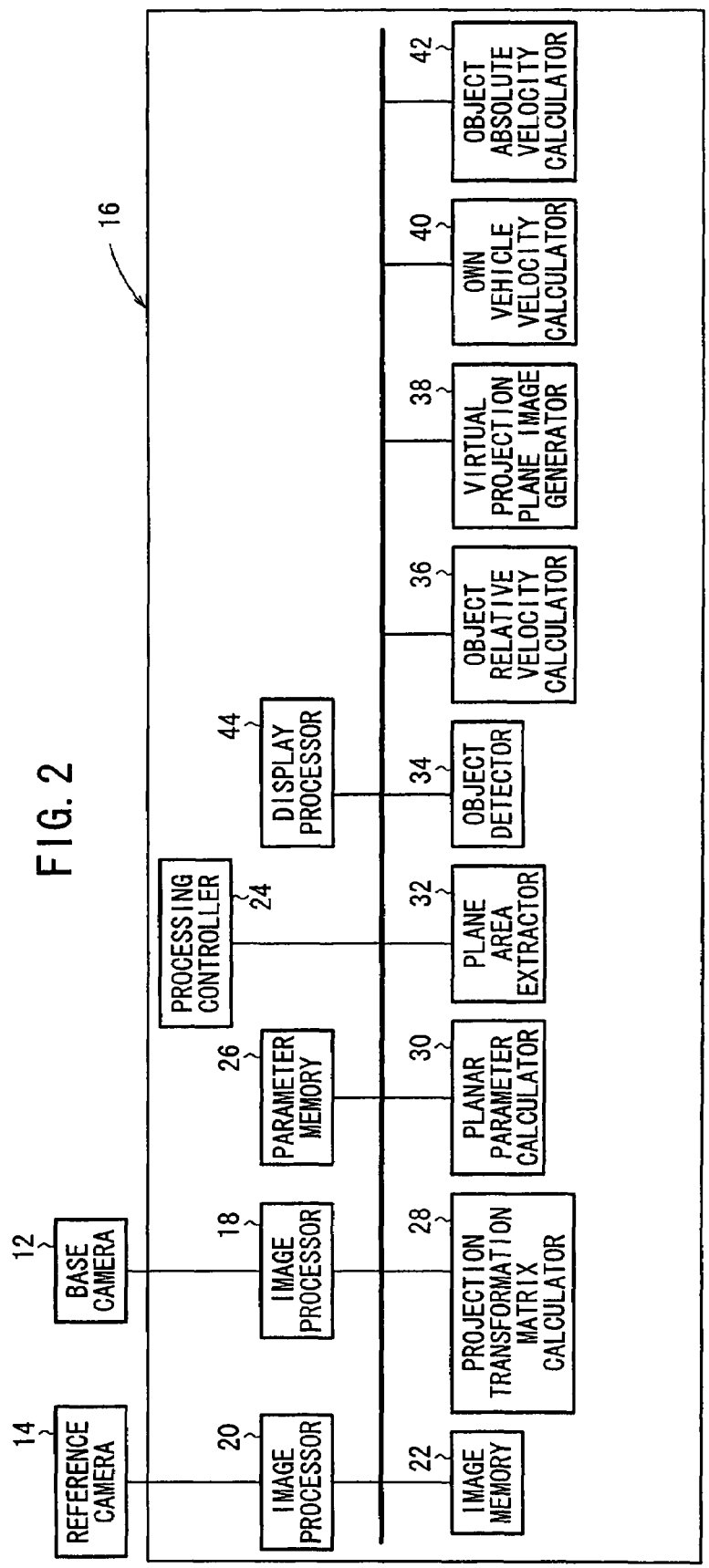
FIG. 2 is a functional block diagram of a processing unit mounted on the vehicle shown in FIG. 1.

FIG. 2 is a functional block diagram of the processing unit 16. The processing unit 16 has an image processor 18 for processing a plurality of base images captured by the base camera 12, an image processor 20 for processing a plurality of reference images captured by the reference camera 14, and an image memory 22 for storing base images and reference images that are captured at given image capturing time intervals.

The processing unit 16 also has a processing controller 24 to which there are connected the image memory 22, a parameter memory 26, a projection transformation matrix calculator 28, a plane parameter calculator 30, a plane area extractor 32, an object detector 34, an object relative velocity calculator 36, a virtual projection plane image generator 38, an own vehicle velocity calculator 40, an object absolute velocity calculator 42, and a display processor 44.

The parameter memory 26 stores initial value parameters required for processing operation and parameters calculated in previous and present processing cycles. The projection transformation matrix calculator 28 calculates a projection transformation matrix for performing a two-dimensional projection transformation from a road plane area in a reference image into a road plane area in a base image. The plane parameter calculator 30 calculates a normal vector to a road plane and a distance from the optical center of the base camera 12 to a road plane as plane parameters. The plane area extractor 32 extracts a road plane area that can be traveled by the vehicle 10, using a base image and a reference image projectively transformed by a projection transformation matrix. The object detector 34 detects an object that is present in an area outside of a road plane area. The object relative velocity calculator 36 calculates a relative velocity vector of an extracted object with respect to the vehicle 10. The virtual projection plane image generator 38 generates a virtual projection plane (VPP) image representative of an extracted road plane area as projected onto a virtual plane parallel to an actual road plane. The own vehicle velocity calculator 40 calculates an own vehicle velocity vector of the vehicle 10 on a VPP image. The object absolute velocity calculator 42 calculates an absolute velocity vector of an object from a relative velocity vector of the object with respect to the vehicle 10 and an own vehicle velocity vector of the vehicle 10. The display processor 44 displays the above processed results on a display, and announces a warning or the like based on the processed results.

Figure 3:
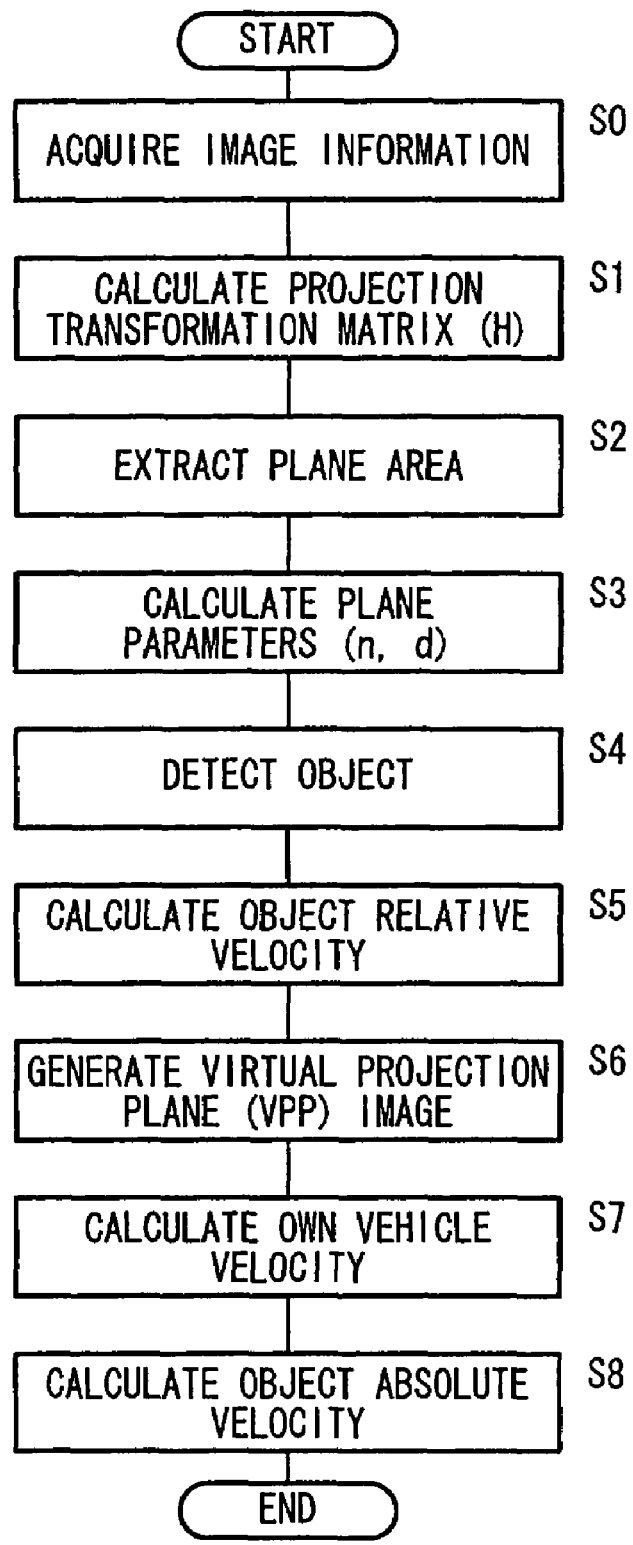
FIG. 3 is a flowchart of an overall processing sequence of the processing unit shown in FIG. 1.

The vehicle 10 to which the object detecting apparatus according to the present invention is applied and the processing unit 16 are basically constructed as described above. An overall processing sequence of the processing unit 16 will be described below based on a flowchart shown in FIG. 3.

First, the base camera 12 and the reference camera 14 captures base images and reference images including a road plane area which is being traveled by the vehicle 10, at given time intervals. After the images are processed by the image processors 18, 20, they are stored as image information in the image memory 22 at each time (step S0).

Then, the projection transformation matrix calculator 28 dynamically calculates a projection transformation matrix for performing a two-dimensional projection transformation from a road plane area in a reference image into a road plane area in a base image, using the initial value parameters stored in the parameter memory 26 (step S1).

The plane area extractor 32 extracts the road plane area from a base image, using the projection transformation matrix calculated in step S1 (step S2).

The plane parameter calculator 30 calculates a normal vector to the road plane and a distance from the optical center of the base camera 12 to the road plane as plane parameters (step S3).

Then, the object detector 34 transforms the road plane area extracted in step S2 onto a road plane, using the plane parameters calculated in step S3, and detects objects which may possibly become obstacles other than the vehicle 10, or alternatively makes a stereo measurement with respect to an area other than the road plane area extracted in step S2, and detects objects (step S4).

The object relative velocity calculator 36 calculates a relative velocity vector of each object with respect to the vehicle 10, from positional changes at each time of the respective extracted objects (step S5).

The virtual projection plane image generator 38 generates a virtual projection plane (VPP) image representative of a road plane area as viewed from above, using the normal vector which indicates the gradient of the road plane calculated in step S3 (step S6).

The own vehicle velocity calculator 40 calculates an own vehicle velocity vector of the vehicle 10 from the position at each time in the VPP image generated in step S6 (step S7).

The object absolute velocity calculator 42 calculates an absolute velocity vector of each object from the relative velocity vector of the object calculated in step S5 and the own vehicle velocity vector of the vehicle 10 calculated in step S7 (step S8).

The display processor 44 displays the road plane area extracted as described above, the objects which may possibly become obstacles, the absolute velocities of the vehicle 10 and the objects, etc. on the display, and, if necessary, announces a warning based on the relative positional and velocity relationships between the vehicle 10 and the objects, for example.

The present embodiment will be described in detail below with respect to each of the steps.

First, the principles of the extraction of a road plane area and the two-dimensional projection transformation used in the present invention will be described below. In the description which follows, homogeneous coordinates will be denoted by reference characters followed by a symbol "^" in the description, and reference characters capped with a symbol "~" in the equations and the expressions. Projectively transformed images will be denoted by reference characters followed by a symbol "'" in the description, and reference characters capped with a symbol "~" in the equations and the expressions.

Figure 4:
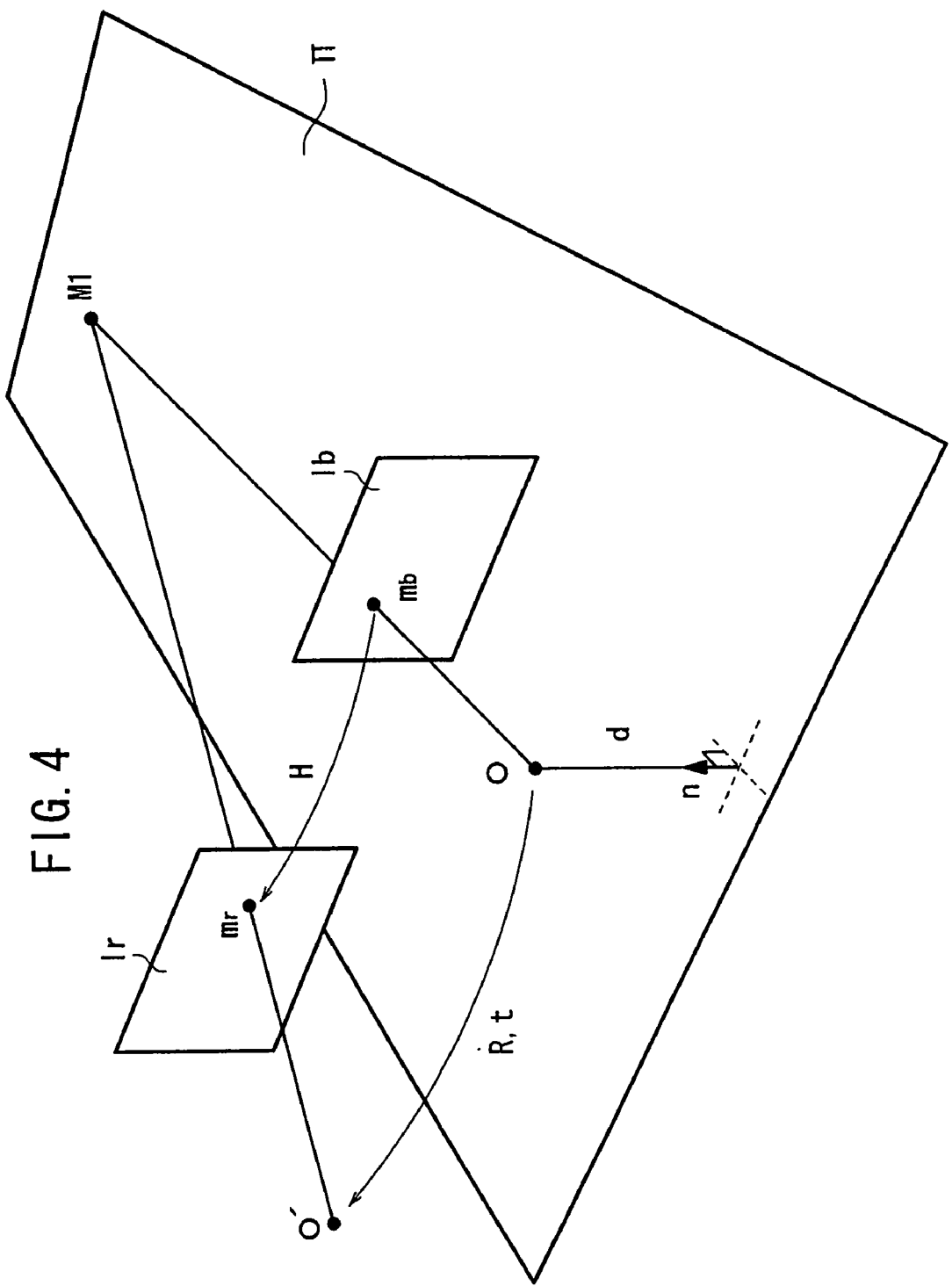
FIG. 4 is a diagram illustrative of a two-dimensional projection transformation between a pair of image capturing means.

As shown in FIG. 4, it is well known in the art that when an observational point M1 on a plane Π in space (also referred to as a road plane) is projected onto a base image $I_b$ and a reference image $I_r$, homogeneous coordinates $\hat{m}_b$ on the base image $I_b$ and homogeneous coordinates $\hat{m}_r$ on the reference image $I_r$ are related to each other by a two-dimensional projection transformation as indicated by the expression (1-1):

$$\tilde{m}_r \sim H\tilde{m}_b \qquad (1\text{-}1)$$

("~" between both sides represents equality therebetween while allowing indefiniteness of a constant multiplication)

In the above expression, H represents a 3×3 projection transformation matrix. In FIG. 4, O represents the optical center of the base camera 12, O' the optical center of the reference camera 14, R a rotation matrix from a base camera coordinate system to a reference camera coordinate system, t a translation vector directed from the optical center of the reference camera 14 to the optical center of the base camera 12 in the reference camera coordinate system, d the distance between the optical center O of the base camera 12 and the plane Π, and n the normal vector to the plane Π.

If an area that can be traveled, such as a road, can be regarded as being essentially a plane in space, then it is possible to obtain an image that agrees with the base image $I_b$ with respect to the plane by performing an appropriate projection transformation on the area with respect to the reference image $I_r$. On the other hand, an object which is not present on the plane produces a projectively transformed image which does not agree with the base image $I_b$, and thus the area of the object can be judged not as an area that can be traveled, or can be judged as an area which could become an obstacle. Therefore, an area that can be traveled or an area which can be an obstacle can be detected by calculating the expansiveness of the plane.

<Step S0>

Image information of the base image $I_b$ and the reference image $I_r$ is acquired.

Images are captured using the base camera 12 and the reference camera 14. In order to remove the brightness difference between the images, the images are subjected to LOG (Laplacian of Gaussian) filters by the image processors 18, 20. Since the images processed by the LOG filters have a low contrast level, they are subjected to histogram equalization.

The base image $I_b$ and the reference image $I_r$ thus processed and their original images are stored in the image memory 22.
<Step S1>
The projection transformation matrix calculator 28 dynamically calculates a projection transformation matrix H with respect to a road plane, using the base image $I_b$ and the reference image $I_r$ that are stored in the image memory 22.

Specifically, within a certain area $R^1$ in the base image $I_b$, the projection transformation matrix H is changed slightly, and a projection transformation matrix H for minimizing an evaluation function E(H) according to the expression (1-2) below is estimated by repetitive optimization.

$$E(H) = \sum_{m_b \in R^I} [I_r(H\tilde{m}_b) - I_b(\tilde{m}_b)]^2 \quad (1\text{-}2)$$

where $I_b(\hat{m}_b)$, $I_r(H\hat{m}_b)$ represent respective luminance values of the base image $I_b$ and the reference image $I_r$ at the homogeneous coordinates $\hat{m}_b$, $H\hat{m}_b$.

The above estimation requires the projection transformation matrix H as an initial value that is appropriately close to a true value and an area $R^1$ (according to the present invention, hereinafter called "calculation area"). The projection transformation matrix H and the calculation area $R^1$ are then determined according to a process described below, using time-series information.

A projection transformation matrix $H_s$ between a base image $I_b$ and a reference image $I_r$ at the same time, a projection transformation matrix $H_m$ between two base images $I_b$ acquired at successive times, and a calculation area $R^1$ with respect to a base image $I_b$ are determined. For estimating a projection transformation matrix H ($H_s$, $H_m$) at a certain time t, estimated results up to a preceding time (t−1) are employed.

First, a projection transformation matrix $H_m$(t) between successive base images $I_b$(t−1) and $I_b$(t), is estimated by repetitive optimization based on the expression (1-2). At this time, a projection transformation matrix $H_m$(t−1) estimated at the preceding time may be used as an initial value of the projection transformation matrix $H_m$(t), and a calculation area $R^1$(t−1) determined at the preceding time with respect to a base image $I_b$(t−1) may be used as an initial value of the calculation area $R^1$.

Then, using the determined projection transformation matrix $H_m$(t), the calculation area $R^1$(t−1) at the preceding time is transformed to determine a predicted value of a calculation area $R^1$(t) at the present time.

A projection transformation matrix $H_s$(t) between a base image $I_b$ and a reference image $I_r$ is estimated by repetitive optimization based on the expression (1-2), using the projection transformation matrix $H_s$(t−1) estimated at the preceding time as an initial value and also using the calculation area $R^1$(t) determined from the projection transformation matrix $H_m$(t).

In the successive estimation using time-series images, a dynamic projection transformation matrix $H_s$ (hereinafter referred to as a projection transformation matrix H) between a base image $I_b$ and a reference image $I_r$ at the time t can stably be estimated using the projection transformation matrix H as an initial value that is appropriately close to a true value and the calculation area $R^1$.

A process of estimating the projection transformation matrix H according to repetitive optimization (density gradient method) using the expression (1-2) will be described in detail below.

The density gradient method is a method of estimating a change in the projection transformation matrix H for maximum image overlapping by changing one of two images slightly and minimizing an evaluation function representing how the images are overlapped (density difference).

If a luminance value of a reference image $I_r$ at coordinates x (x, y) is represented by $I_r$(x), then a reference image $I_r'$ projectively transformed by an appropriate projection transformation matrix H is expressed by the expression (1-3) shown below. The symbol "~" above the reference image $I_r$ indicates an image that has been projectively transformed, and the symbol "~" above x indicates homogeneous coordinates of the coordinates x (x, Y).

$$\tilde{I}_r(\tilde{x}) = I_r(H\tilde{x}) \quad (1\text{-}3)$$

The projection transformation matrix H is a matrix with 8 degrees of freedom (one parameter being fixed) made up of 3×3 parameters.

If, when the 8 parameters of the projection transformation matrix H are changed slightly, the coordinates x (x, y) on the reference image $I_r'$ that has been projectively transformed change to coordinates x" (x", y"), then the relationship expressed by:

$$\tilde{x}'' \sim (I + D_x)\tilde{x} \quad (1\text{-}4)$$

("~" between both sides represents equality therebetween while allowing indefiniteness of constant multiplication) is obtained. In the above expression, I represents a 3×3 unit matrix, and $D_x$ a 3×3 slightly changed matrix having, as parameters thereof, slight changes in the parameters of the projection transformation matrix H.

Using the relationships represented by the expressions (1-3), (1-4), the evaluation function E(H) according to the expression (1-2), which represents an overlapped state of the projectively transformed reference image $I_r'$ and the base image $I_b$ is expressed, using as variables, the parameters of the slightly changed matrix $D_x$ of the projection transformation matrix H, as follows:

$$E(d_x) = \sum_i \left[\tilde{I}_r(\tilde{x}_i'') - I_b(\tilde{x}_i)\right]^2 \quad (1\text{-}5)$$

("i" represents a pixel number)
In the above expression, $d_x$ represents a parameter of the slightly changed matrix $D_x$ as expressed in terms of a vector.

When the expression (1-5) is Taylor expanded for first-order approximation, it is expressed as follows:

$$E(d_x) \approx \sum_i \left[\tilde{I}_r(\tilde{x}_i) + \nabla \tilde{I}_r(\tilde{x}_i) \frac{\partial \tilde{x}_i''}{\partial d_x} d_x - I_b(\tilde{x}_i)\right]^2 \quad (1\text{-}6)$$

$$= \sum_i [g_i^t J_{dxi}^t d_x + e_i]^2$$

where $$g_i = \nabla \tilde{I}_r(\tilde{x}_i)$$

$$e_i = \tilde{I}_r(\tilde{x}_i) - I_b(\tilde{x}_i)$$

$$J_{dxi} = J_{dxi}^t(\tilde{x}_i) = \frac{\partial \tilde{x}_i''}{\partial d_x}$$

("≈" an between both sides represents equality therebetween within the range of first-order approximation according to the expression (1-5))

The vector $d_x$ for minimizing the evaluation function $E(d_x)$ according to the expression (1-6) can be determined by differentiating the evaluation function $E(d_x)$ with respect to the vector $d_x$, setting the differential value to 0, and solving the following equation:

$$Ad_x = -b \qquad (1\text{-}7)$$

where $$A = \sum_i J_{dxi} g_i g_i^t J_{dxi}^t$$

$$b = \sum_i e_i J_{dxi} g_i$$

In this case, $g_i$ (luminance gradient) and $e_i$ (luminance difference) are calculated from the base image $I_b$ and the projectively transformed reference image $I_r'$, and the Jacobian $J_{dxi}$ is calculated from the coordinates x (x, y). Therefore, the vector $d_x$ is determined according to the equation (1-7) based on the least-squares method.

Using the vector $d_x$ thus determined, i.e., the slightly changed matrix $D_x$, the projection transformation matrix H is updated according to the expression (1-8) shown below. In the expression (1-8), I represents a 3×3 unit matrix.

$$H \leftarrow H(I+D_x) \qquad (1\text{-}8)$$

Using the projection transformation matrix H determined according to the expression (1-8), the value of the evaluation function $E(d_x)$ according to the expression (1-6) is repeatedly calculated again. A projection transformation matrix H calculated when the value of the evaluation function $E(d_x)$ converges to a predetermined value or less is used as a desired projection transformation matrix H.

<Step S2 (First Road Plane Area Extracting Means)>

The plane area extractor 32 extracts a road plane area that can be traveled by the vehicle 10, using the projection transformation matrix H estimated in step S1. The extracting process will be described below with reference to FIG. 5.

The projection transformation matrix H estimated in step S1 acts on the reference image $I_r$ that has been LOG-filtered and histogram-equalized in step S0, generating a projectively transformed image $I_r'$.

Then, a differential image $(I_r'-I_b)$ between the base image $I_b$ that has been LOG-filtered and histogram-equalized in step S0 and the generated projectively transformed image $I_r'$ is determined.

Since a point that is present on the plane is accurately projected onto the base image $I_b$, the luminance value of the differential image $(I_r'-I_b)$ is small. On the other hand, the luminance value of a differential image $(I_r'-I_b)$ of a point that is not present on the plane is large. Therefore, a road plane area $\Pi_f$ can be extracted by establishing a certain threshold value and binarizing the differential image $(I_r'-I_b)$ using the established threshold value.

<Step S3>

The plane parameter calculator 30 determines a normal vector n which is a plane parameter of the plane $\Pi$ and a distance d from the optical center O of the base camera 12 to the plane $\Pi$, using the projection transformation matrix H estimated in step S1.

In the relationship shown in FIG. 4, using the rotation matrix R from the base camera coordinate system to the reference camera coordinate system, the translation vector t directed from the optical center of the reference camera 14 to the optical center of the base camera 12, and internal parameters $A_b$, $A_r$ of the base camera 12 and the reference camera 14, the projection transformation matrix H is expressed as:

$$H = A_r \cdot k\left(R + \frac{tn^t}{d}\right)A_b^{-1} \qquad (3\text{-}1)$$

In the above expression, k is a coefficient which is not 0, and indicates that the projection transformation matrix H obtained from the image has degrees of freedom which are represented by a constant multiplication. If the internal parameters $A_b$, $A_r$ are known, then the following expression (3-2) is satisfied:

$$H' = A_r^{-1} H A_b = k\left(R + \frac{tn^t}{d}\right) \qquad (3\text{-}2)$$

The projection transformation matrix H' is singular-value decomposed. If it is assumed that U, V represent orthonormal matrixes and $\Sigma$ a diagonal matrix having singular values $\sigma_1$ through $\sigma_3$ ($\sigma_1 \geq \sigma_2 \geq \sigma_3 > 0$) of the projection transformation matrix H' as elements, the projection transformation matrix H' can be written as:

$$H' = U \Sigma V^t \qquad (3\text{-}3)$$

The diagonal matrix $\Sigma$ is given as follows:

$$\Sigma = \begin{pmatrix} \sigma_1 & 0 & 0 \\ 0 & \sigma_2 & 0 \\ 0 & 0 & \sigma_3 \end{pmatrix} \qquad (3\text{-}4)$$

From the expressions (3-2), (3-3), the diagonal matrix $\Sigma$ is expressed as follows:

$$\Sigma = U^t H' V = k\left(U^t R V + U^t \frac{tn^t}{d} V\right) \qquad (3\text{-}5)$$

If $$U^t R V = R', \ U^t t = t', \ n^t V = n'^t \qquad (3\text{-}6)$$

then the following expression (3-7) is obtained:

$$\Sigma = k\left(R' + \frac{t' n'^t}{d}\right) \qquad (3\text{-}7)$$

Introducing a base vector $(e_1, e_2, e_3)$ of the base camera coordinate system to produce the following expression:

$$n' = n_1' e_1 + n_2' e_2 + n_3' e_3 \qquad (3\text{-}8)$$

based on three vector equations obtained from the expression (3-7), and since n, n' represent unit vectors, V an orthonormal vector, and R' a rotational matrix free of a norm change, the following equation (3-9) is obtained:

$$(k^2-\sigma_j^2)n_i'^2 + (k^2-\sigma_i^2)n_j'^2 = 0 \ (i \neq j) \qquad (3\text{-}9)$$

If the equation (3-9) is considered to be simultaneous equations of $n_1'^2$, $n_2'^2$, $n_3'^2$, then in order to have solutions which are not 0, since the matrix is 0, the equation (3-9) becomes:

$$(k^2-\sigma_1^2)(k^2-\sigma_2^2)(k^2-\sigma_3^2) = 0 \qquad (3\text{-}10)$$

Different cases wherein the singular values $\sigma_1$ through $\sigma_3$ of the projection transformation matrix H':

(I) do not have multiple roots ($\sigma_1 \approx \sigma_2 \approx \sigma_3$),
(II) have multiple roots ($\sigma_1 = \sigma_2 \approx \sigma_3$ or $\sigma_1 \approx \sigma_2 = \sigma_3$), and
(III) have three multiple roots ($\sigma_1 = \sigma_2 = \sigma_3$)

will be considered below. In the cases (I), (II), if $k = \pm \sigma_1$ or $k = \pm \sigma_3$, then it is contradictory to the fact that n' calculated according to the equation (3-9) is a unit vector. Therefore, in any case, it is determined that $k = \pm \sigma_2$. The case where $k = -\sigma_2$ is excluded because the two cameras (the base camera 12 and the reference camera 14) are positioned so as to sandwich a plane therebetween, and k is determined as $\sigma_2$. The case (III) where three multiple roots are obtained is excluded because the optical centers of the base camera 12 and the reference camera 14 coincide with each other and only rotation is involved.

In the cases (I), (II), n' is determined according to the equation (3-9) as:

$$n' = \begin{pmatrix} n'_1 \\ n'_2 \\ n'_3 \end{pmatrix} = \begin{pmatrix} \varepsilon_1 \sqrt{\frac{\sigma_1^2 - \sigma_2^2}{\sigma_1^2 - \sigma_3^2}} \\ 0 \\ \varepsilon_2 \sqrt{\frac{\sigma_2^2 - \sigma_3^2}{\sigma_1^2 - \sigma_3^2}} \end{pmatrix} (\varepsilon_1, \varepsilon_2 = \pm 1) \quad (3\text{-}11)$$

When $\sigma_1 \approx \sigma_2 \approx \sigma_3$, since $n_2' = 0$, the following expression is obtained:

$$R'e_2 = e_2 \quad (3\text{-}12)$$

R' represents a rotation matrix around $e_2$. Therefore, the following expressions (3-13), (3-14), (3-15) are obtained:

$$R' = \begin{pmatrix} \cos(\theta) & 0 & -\sin(\theta) \\ 0 & 1 & 0 \\ \sin(\theta) & 0 & \cos(\theta) \end{pmatrix} \quad (3\text{-}13)$$

$$\begin{cases} \sin(\theta) = \frac{\acute{o}_1 - \acute{o}_3}{\acute{o}_2} n'_1 n'_3 = \varepsilon_1 \varepsilon_2 \sqrt{\frac{(\sigma_1^2 - \sigma_2^2)(\sigma_2^2 - \sigma_3^2)}{(\sigma_1 + \sigma_3)\sigma_2}} \\ \cos(\theta) = \frac{\acute{o}_1 n'^2_3 + \acute{o}_3 n'^2_1}{\acute{o}_2} = \frac{\sigma_2^2 + \sigma_1 \sigma_3}{(\sigma_1 + \sigma_3)\sigma_2} \end{cases} \quad (3\text{-}14)$$

$$\frac{t'}{d} = \frac{\sigma_1 + \sigma_3}{\sigma_2} \begin{pmatrix} n'_1 \\ 0 \\ -n'_3 \end{pmatrix} \quad (3\text{-}15)$$

In the case (II), $\sigma_1 = \sigma_2$ (or $\sigma_2 = \sigma_3$), and from the expression (3-13), $$n_1' = n_2' = 0, n_3' = \pm 1 \ (n_1' = \pm 1, n_2' = n_3' = 0) \quad (3\text{-}16)$$

$$R' = I \quad (3\text{-}17)$$

and $$\frac{t'}{d} = \frac{\sigma_3 - \sigma_1}{\sigma_2} n' \quad (3\text{-}18)$$

Because of the different signs of $\varepsilon_1$, $\varepsilon_2$ in the expression (3-11), there are four solution candidates. Of the four candidates, n' which satisfies the condition that a point on the plane appears in the image is selected, narrowing them down to two candidates. Furthermore, the condition that the positional relationship between the base camera 12 and the reference camera 14 does not change during the image capturing process is added, thereby determining a unique solution.

By thus substituting R', t'/d, and n' determined according to the expressions (3-11), (3-13), (3-15) or the expression (3-18), into the expression (3-6), a rotation matrix R and t/d and a normal vector n serving as plane parameters are determined. Since the length |t| (the distance between the base camera 12 and the reference camera 14) of the translation vector t can be determined in advance from a design value and a measured value, the distance d serving as a plane parameter can be determined from t/d that has been determined.

The above process of calculating plane parameters (step S3) is based on the premise that the rotation matrix R and the translation vector t between the base camera 12 and the reference camera 14 vary. If the rotation matrix R and the translation vector t are fixed with respect to the vehicle 10, then plane parameters can quickly be calculated using the rotation matrix R and the translation vector t that have been determined in advance, according to the following process:

After the base camera 12 and the reference camera 14 have been secured to the vehicle 10, the rotation matrix R and the translation vector t can be determined in an ideal environment such as a maintenance factory where the vehicle 10 is held at rest. When plane parameters are determined from the projection transformation matrix H on a plane calculated at a desired time while the vehicle 10 is traveling, the rotation matrix R and the translation vector t that have been highly accurately determined in the ideal environment are employed. Therefore, even if the projection transformation matrix H on the plane contains an error, the plane parameters can be calculated without lowering their accuracy.

First, while the vehicle 10 is being held at rest, the plane Π is imaged by the base camera 12 and the reference camera 14, and the projection transformation matrix H is estimated using the processing of step S1. Then, a rotation matrix R and a unit vector $t_e$ of a translation vector t are determined according to the above process of calculating plane parameters. Specifically, a rotation matrix R is determined according to the expressions (3-6), (3-13), (3-14). Then, t/d is determined according to the expressions (3-6), (3-15) or the expression (3-18), and normalized to determine a unit vector $t_e$ of a translation vector t as:

$$t_e = \frac{1}{\left|\frac{t}{d}\right|} \cdot \frac{t}{d} \quad (3\text{-}19)$$

Inasmuch as the length |t| (the distance between the base camera 12 and the reference camera 14) of the translation vector t can be determined in advance from a design value or a measured value, the translation vector t can be determined by multiplying the unit vector $t_e$ according to the expression (3-19) by |t|.

In order to estimate the projection transformation matrix H highly accurately in the processing of step S1, there may be prepared a plane Π which is patterned and has a sufficiently wide area, so as to allow easy evaluation of how images are overlapped. Alternatively, the direction of the plane Π may be changed and then a rotation matrix R and a translation vector t may be determined according to the above process, after which the results are averaged to determine a rotation matrix R and a translation vector t with higher accuracy.

The rotation matrix R and the translation vector t thus calculated are stored in the parameter memory 26. The translation vector t may be stored as the unit vector $t_e$ and the magnitude |t| of the vector. Rather than calculating the rotation matrix R and the translation vector t as described above, the rotation matrix R and the translation vector t may be calculated according to another calibration process or may be determined by directly measuring the positional relationship between the base camera 12 and the reference camera 14.

Then, at a desired time while the vehicle 10 is traveling, a dynamic projection transformation matrix H is calculated (step S1).

The expression (3-2) is modified into:

$$\frac{|t|}{d} n^t = t_e^t \left( \frac{A_r^{-1} H A_b}{k} - R \right) \quad (3\text{-}20)$$

Since the normal vector n is a unit vector and |t|/d is a scalar quantity, a normal vector n to the plane Π can be determined by normalizing the vector calculated according to the expression (3-20).

As the length |t| of the translation vector t is known from a design value or a measured value, the distance d from the optical center of the base camera 12 to the plane Π can be calculated according to the following expression (3-21):

$$d = \frac{|t|}{\left| n t_e^t \left( \frac{A_r^{-1} H A_b}{k} - R \right) \right|} \quad (3\text{-}21)$$

Using the rotation matrix R and the translation vector t thus determined in advance, it is possible to calculate the normal vector n and the distance d quickly from the projection transformation matrix H estimated by any desired process.

If the rotation matrix R and the translation vector t between the base camera 12 and the reference camera 14 have been determined in advance, then a projection transformation matrix H and plane parameters (a normal vector n and a distance d) can be determined quickly and highly accurately using these known parameters.

Specifically, the expression (3-1) can be rewritten to expand the projection transformation matrix H as follows:

$$H = A_r R A_b^{-1} + A_r t \frac{n^t}{d} A_b^{-1} \quad (1'\text{-}1)$$

As the projection transformation matrix H is calculated from its constituent parameters, the coefficient k indicative of the indefiniteness of a constant multiplication may be set to 1. In this case, the first term of the projection transformation matrix H is a constant as the translation vector t is known, and the second term thereof is a variable of n/d. Therefore, the projection transformation matrix H can be determined by estimating the second term.

If a slightly changed matrix of the projection transformation matrix H at the time when n/d is slightly changed is represented by D, then the slightly changed matrix D is expressed by:

$$D = A_r t \delta n''^t A_b^{-1} \quad (1'\text{-}2)$$

where $\delta n'' = \delta\left(\frac{n}{d}\right)$ n''=n/d, and its slightly changed quantity is represented by δn''.

The slightly changed matrix D is rewritten into the slightly changed quantity δn'' of n/d, and an evaluation function E(δn'') corresponding to the expression (1-5) is Taylor expanded for first-order approximation, it is expressed as follows:

$$E(\delta n'') \approx \sum_i \left[ \tilde{I}_r(\tilde{x}_i) + \nabla \tilde{I}_r(\tilde{x}_i) \frac{\partial \tilde{x}_i''}{\partial d_{xi}} \frac{\partial d_{xi}}{\partial \delta n''} \delta n'' - \tilde{I}_b(\tilde{x}_i) \right]^2 \quad (1'\text{-}3)$$

$$= \sum_i [g_i^t J_{dxi}^t J_{\delta n''} \delta n'' + e_i]^2$$

where $d_{xi} = \frac{\partial d_{xi}}{\partial \delta n''} \delta n''$, $J_{\delta n''} = J_{\delta n''}(d_{xi}) = \frac{\partial d_{xi}}{\partial \delta n''}$ ("≈" between both sides represents equality therebetween within the range of first-order approximation according to the expression (1-5))

The slightly changed quantity δn'' for minimizing the evaluation function E(δn'') according to the expression (1'-3) can be determined by differentiating the evaluation function E(δn'') with respect to the slightly changed quantity δn'' and setting the differential value to 0. In this case, $g_i$ (luminance gradient) and $e_i$ (luminance difference) are calculated from the base image $I_b$ and the reference image $I_r$, and the Jacobian $J_{dxi}$ is calculated from the coordinates x (x, y). The Jacobian $J_{\delta n''}$ is calculated from internal parameters $A_b$, $A_r$ of the base camera 12 and the reference camera 14, and the translation vector t. Therefore, the slightly changed quantity δn'' is determined based on the least-squares method as follows:

$$A \delta n'' = -b \quad (1'\text{-}4)$$

where $$A = \sum_i J_{\delta n''}^t J_{dxi} g_i g_i^t J_{dxi}^t J_{\delta n''}$$

$$b = \sum_i e_i J_{\delta n''}^t J_{dxi} g_i$$

From the slightly changed quantity δn'' thus determined, the slightly changed matrix D of the projection transformation matrix H is determined according to the expression (1'-2), and the projection transformation matrix H is updated according to the expression (1'-5) shown below.

$$H \leftarrow H + D \quad (1'\text{-}5)$$

The slightly changed quantity δn'' is added to n (=n/d) determined in the preceding processing cycle, and updated according to the expression (1'-6) shown below.

$$n'' \leftarrow n'' + \delta n'' \quad (1'\text{-}6)$$

Using the projection transformation matrix H determined according to the expression (1'-5) and n'' determined according to the expression (1'-6), the value of the evaluation function E(δn'') according to the expression (1'-3) is repeatedly calculated again. A projection transformation matrix H calculated when the value of the evaluation function E(δn'')

converges to a predetermined value or less is used as a desired projection transformation matrix H.

From n″ at the time the projection transformation matrix H converges, a normal vector n and a distance d which serve as plane parameters are determined as follows:

$$n = \frac{n''}{|n''|} \quad (1'\text{-}7)$$

$$d = \frac{1}{|n''|} \quad (1'\text{-}8)$$

Using the rotation matrix R and the translation vector t thus determined in advance, a projection transformation matrix H can be estimated quickly and highly accurately, and a normal vector n and a distance d can immediately be calculated from the projection transformation matrix H.

<Step S4>

Figure 6:
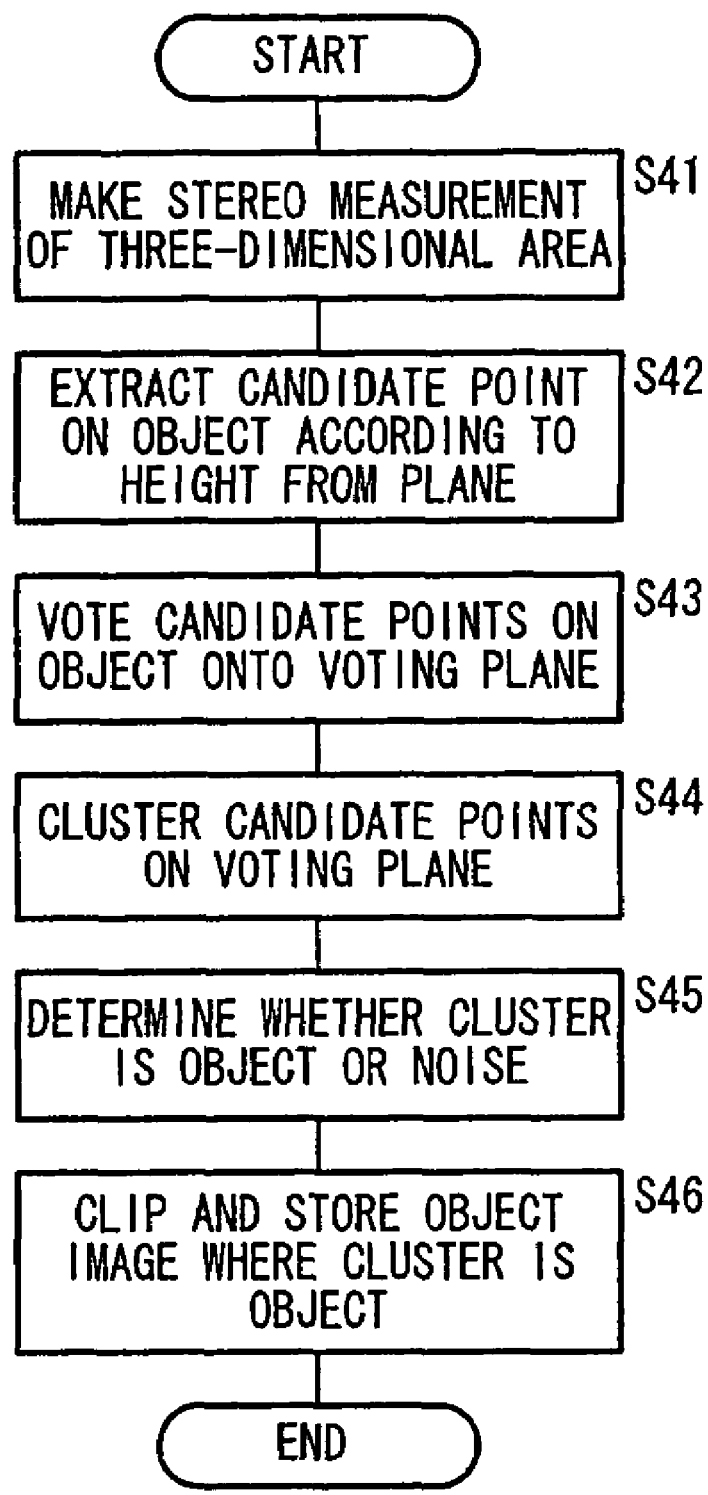
FIG. 6 is a flowchart of a processing sequence of an object extracting process.

Step S4 is a process of detecting an object, and comprises a subroutine of steps S41 through S46 shown in FIG. 6.

In step S41, the base camera 12 and the reference camera 14 make a stereo measurement of a three-dimensional area to determine world coordinates Cw of each edge point of an object.

Figure 7:
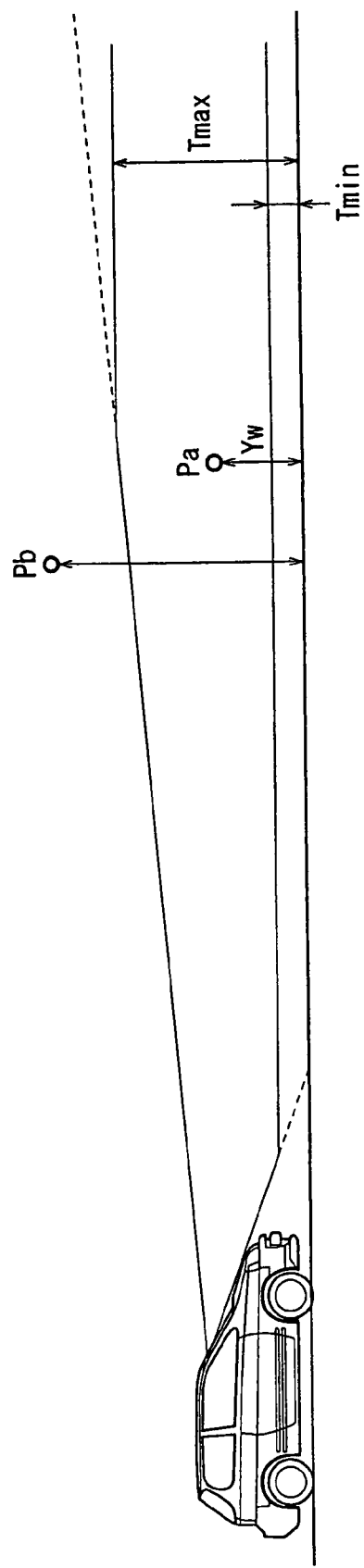
FIG. 7 is a diagram showing the manner in which a candidate point is extracted based on a height limitation.

In step S42, based on a height coordinate Yw (see FIG. 7) of the world coordinates Cw, a candidate point on the object is extracted according to the height from the plane. Specifically, as shown in FIG. 7, candidate points (Tmin≦Yw<Tmax) that are present in a space whose height from the plane is equal to or greater than Tmin (e.g., 20 cm) and smaller than Tmax (e.g., 2.5 m) are extracted. Consequently, at least portions of a crossover bridge, a tunnel entrance, a billboard, etc. on the road are excluded, and only portions involved in the travel of the vehicle 10, such as other vehicles, guardrails, etc. are extracted more easily. Thus, a candidate point Pa shown in FIG. 7 is extracted, and a candidate point Pb shown in FIG. 7 is excluded.

Figure 8:
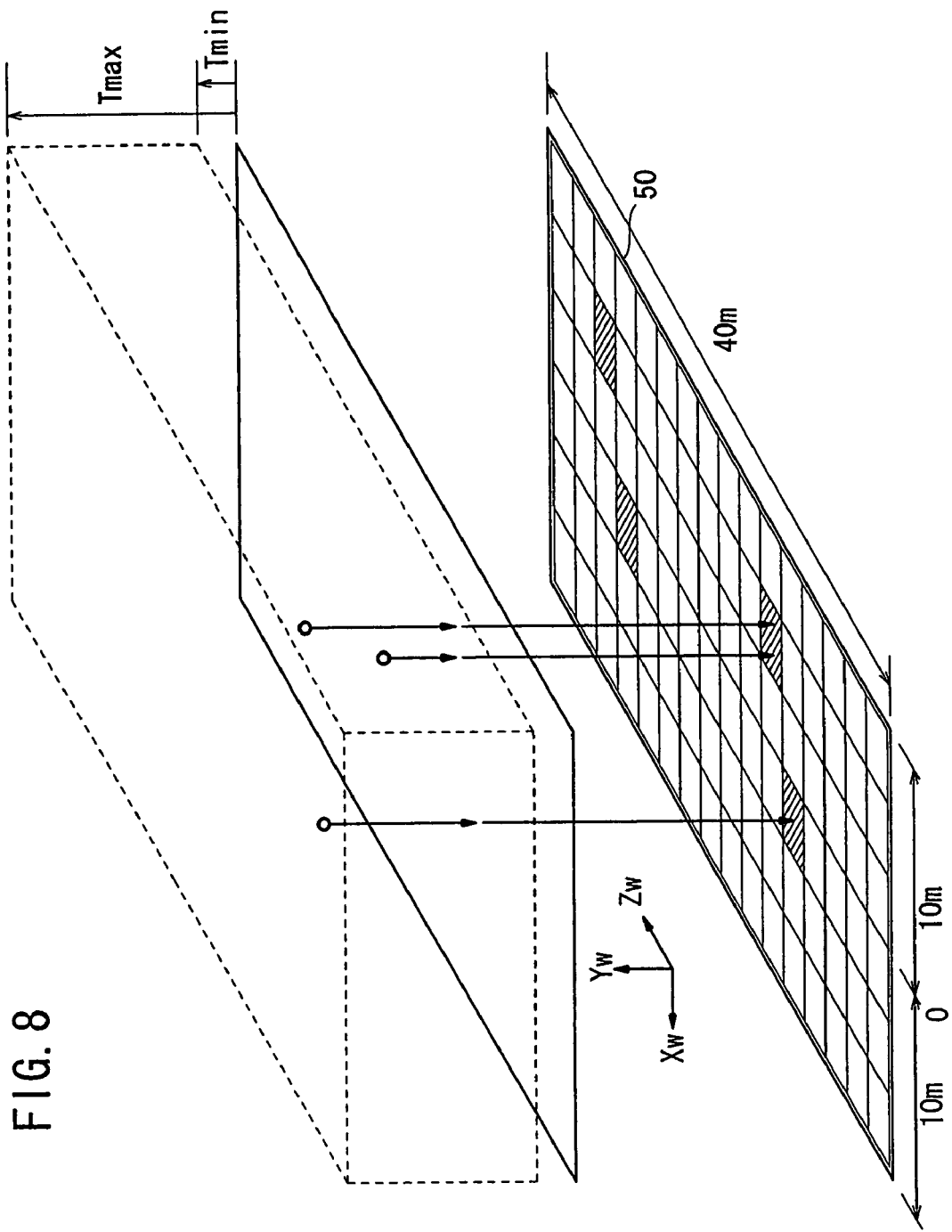
FIG. 8 is a diagram showing the manner in which a voting process is performed.

Candidate points limited to predetermined ranges in an Xw direction which is the transverse direction of the vehicle and a Zw direction which is the longitudinal direction of the vehicle may also be extracted. Accordingly, an unnecessary voting process is prevented from being carried out for areas where there is no possibility for the vehicle 10 to pass through, resulting in a reduction in the amount of calculations. As shown in FIG. 8, the range in an x direction may be limited to −10 through 10 m and the range in a z direction may be limited to 0 through 40 m.

In step S43, the candidate points on the object are projected onto blocks (cells) of a uniform size on a voting plane 50 shown in FIG. 8, depending on their Xw, Zw coordinates. The voting plane 50 is represented as a coordinate plane of coordinate axes Xw, Zw (see FIG. 16) which are two orthogonal axes of a world coordinate system. If a plurality of candidate points are overlappingly projected onto a cell of the same object, then the overlap count is recorded. A process of projecting candidate points while taking into account the overlap count is referred to as voting, and the overlap count as a vote count. According to the voting process, since points smaller than Tmin and points equal to and greater than Tmax have been excluded in step S42, the vote counts for points corresponding to a crossover bridge, a tunnel entrance, a billboard, etc. is 0 or a sufficiently small value. The voting plane 50 in FIGS. 8 and 9 is shown by way of illustrative example only, and has no bearing on FIG. 5, etc.

In step S44, a clustering process is performed to group candidate points voted onto the voting plane 50, into adjacent groups. The groups produced by the clustering process are referred to as clusters. The clustering process may be a nearest neighbor method, and features used in the nearest neighbor method may include a width (coordinate Xw) and a depth (coordinate Zw). According to the clustering process, no model is required for an object to be detected, and objects of various shapes can be detected.

Figure 9:
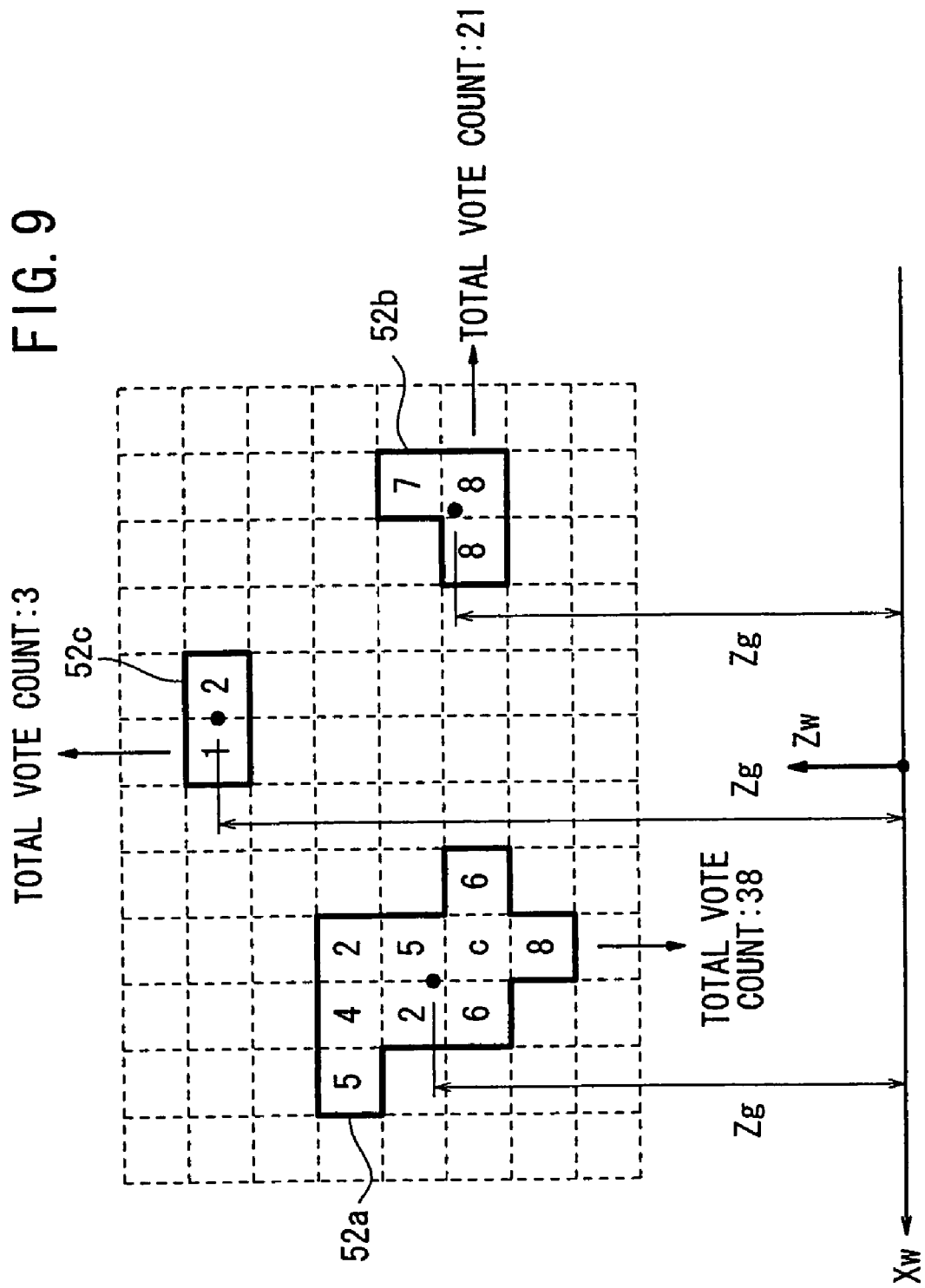
FIG. 9 is a diagram showing a clustering process performed on a voting plane.

As shown in FIG. 9, three clusters 52a, 52b, 52c, for example, are obtained on the voting plane 50 according to the clustering process in step S44.

For the purpose of removing noise due to a correspondence search error (matching error) in the stereo measurement, the clusters produced by the clustering process may be processed by a dilation/erosion process. If a matching error occurs when an object is stereographically measured, then measured three-dimensional positions suffer an error, and the measured object shape has surface irregularities (noise), which tend to change the cluster shapes. According to the dilation/erosion process, the surface irregularities are joined when the clusters are dilated, and then returned to their original sizes when they are eroded. Therefore, the clusters are processed into shapes less susceptible to noise.

In step S45, it is determined whether the clusters 52a, 52b, 52c grouped by the clustering process represent an object or noise, and then clusters representative of noise are removed.

Specifically, the total vote count of each of the clusters 52a, 52b, 52c is determined. The total vote count of the cluster 52a is 38, the total vote count of the cluster 52b is 21, and the total vote count of the cluster 52c is 3. Then, a threshold value Thz based on the values Zg of coordinates Zw which represent depths of centers g of gravity on respective areas of the clusters 52a, 52b, 52c is compared with each of the total vote counts. Those clusters whose total vote counts are equal to or smaller than the threshold value Thz are removed as noise. The threshold value Thz is expressed by the following expression (4-1):

$$Thz = Kg \times (1/Zg)^2 \quad (4\text{-}1)$$

Where Kg is a coefficient which may be, for example, a minimum total vote count in the case where there exists an object 1 m ahead. The expression (4-1) is established based on the phenomenon that the area of an object in an image is smaller in inverse proportion to the square of the distance.

According to the processing of step S45, the cluster 52c with the small total vote count is removed as noise. Objects with small total vote counts, such as a crossover bridge, a tunnel entrance, a billboard, etc., are also removed as noise.

Figure 5:
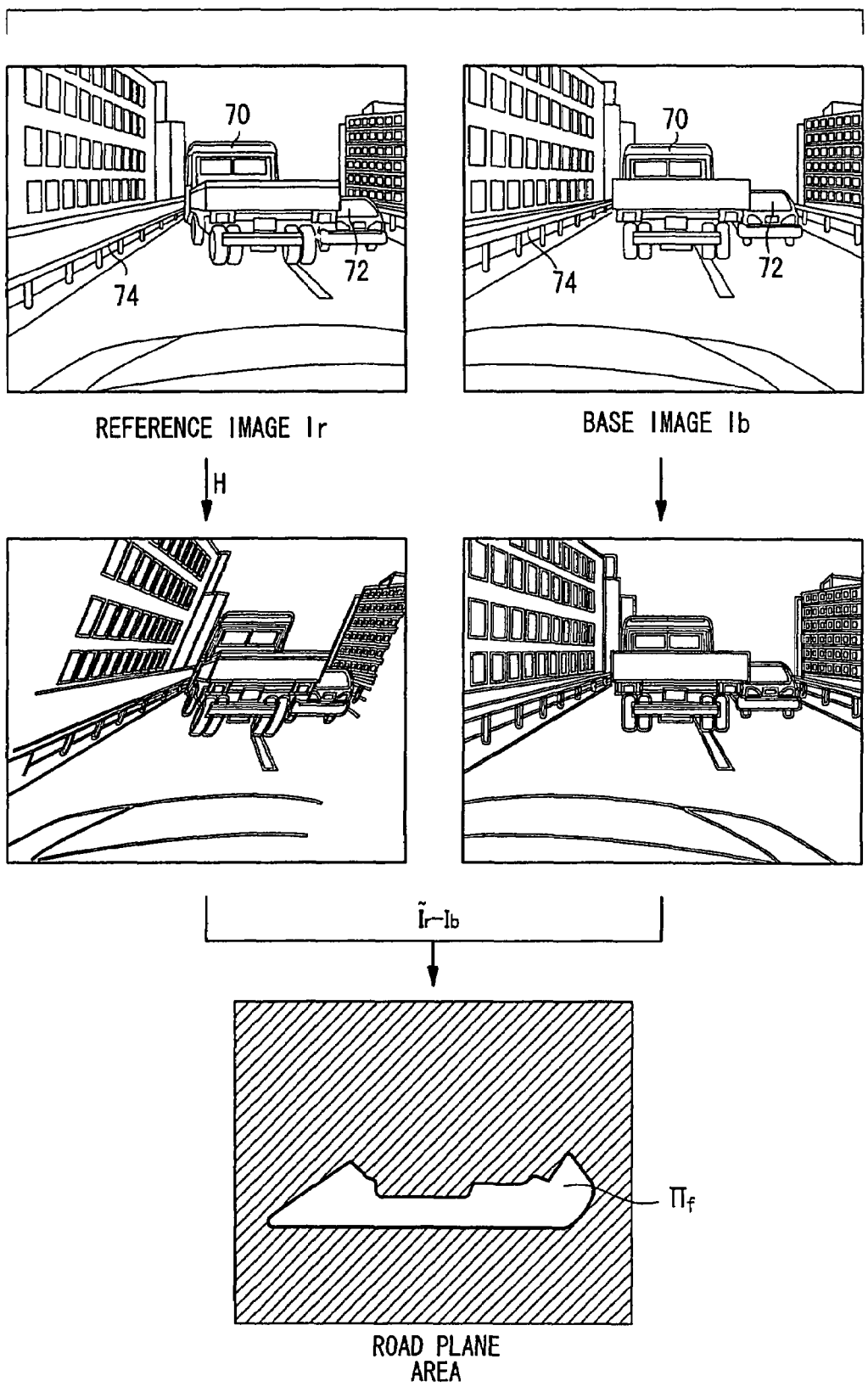
FIG. 5 is a diagram illustrative of a process of extracting a plane area.
Figure 10:
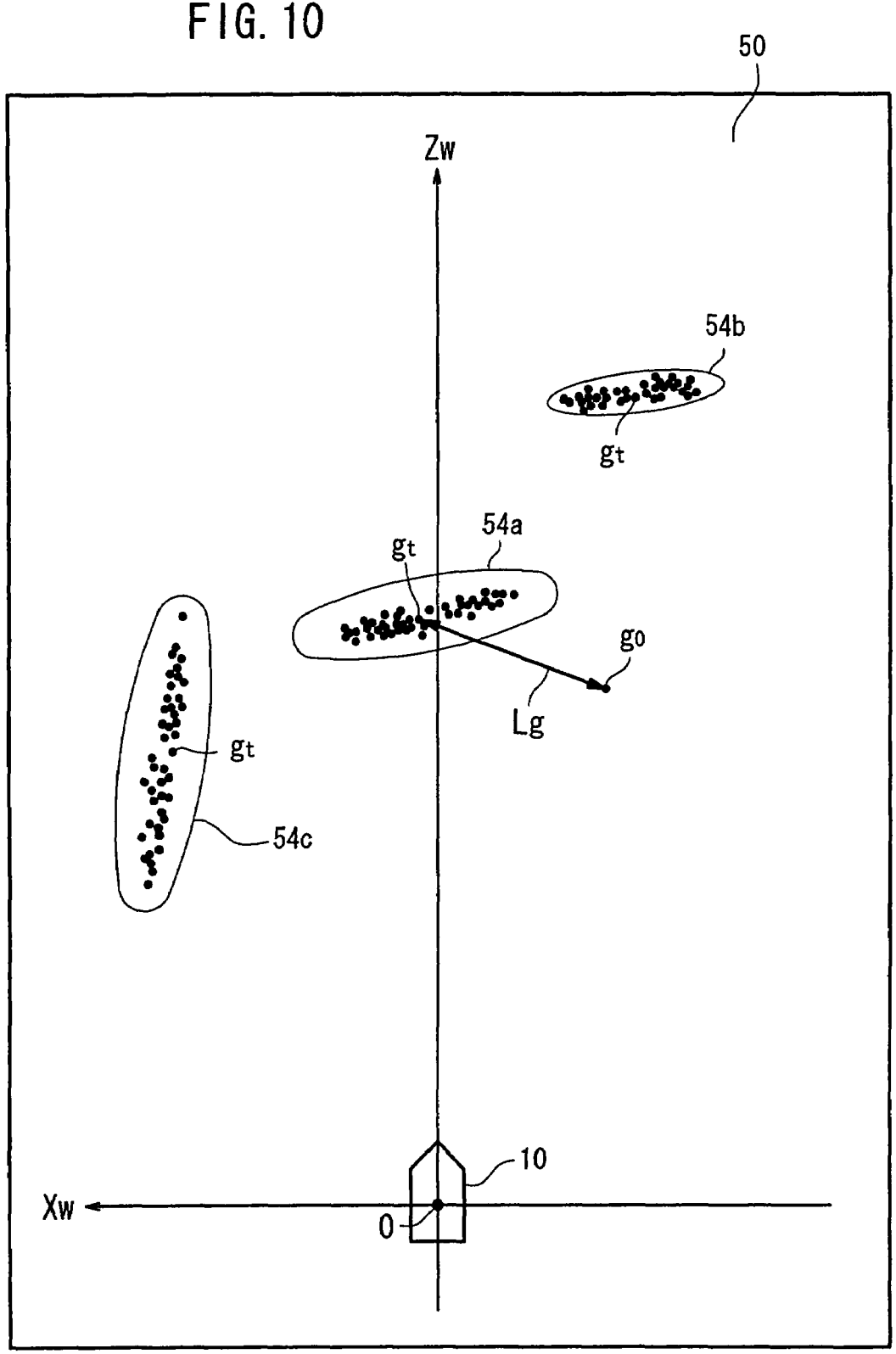
FIG. 10 is a diagram showing a voting plane.

A voting plane from which noise has been removed is shown in FIG. 10 as representing nearly actual data in view of the example shown in FIG. 5. The voting plane 50 is recorded in a given memory. In the voting plane 50, there are extracted a cluster 54a corresponding to a truck that is changing lanes in a relatively close forward position, a cluster 54b corresponding to a passenger car traveling ahead of the truck, and a cluster 54c corresponding to a guardrail. The coordinate axis Xw, the coordinate axis Zw, and the vehicle 10 which is the own vehicle are also schematically shown in the voting plane 50 for confirmation by the designer.

In step S46, the remaining clusters 54a, 54b, 54c are recognized as objects, and corresponding object position areas are clipped and stored in the memory.

The object extracting process in step S4 (see FIG. 3) is made up of these steps S41 through S46. Each of these steps will be described in greater detail below.

Figure 11:
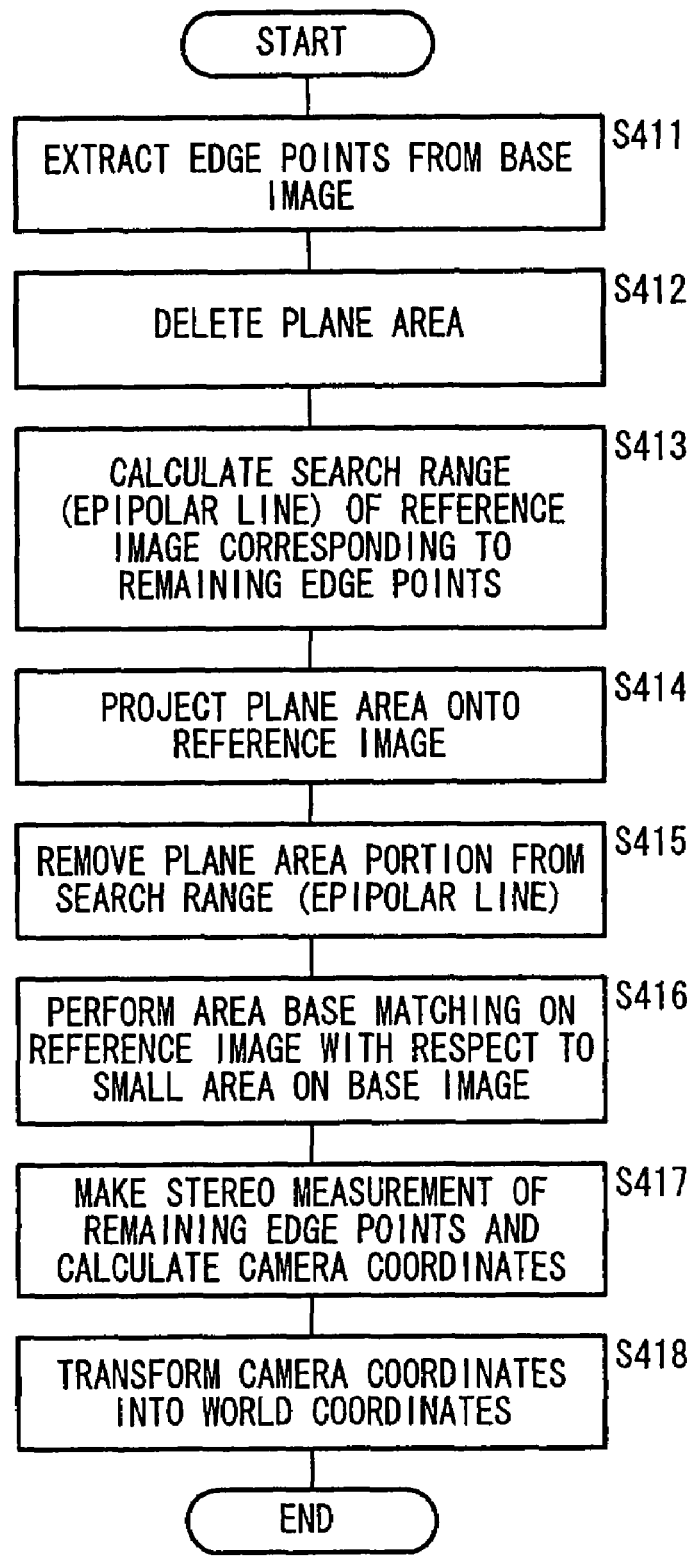
FIG. 11 is a flowchart of a processing sequence for determining world coordinates of each edge point of an object.

Step S41 comprises a subroutine of steps S411 through S417 shown in FIG. 11.

In step S411 (base image feature point extracting means), a Sobel filtering process is performed for extracting edges and feature points from the base image $I_b$. The Sobel filtering process is a filtering process for extracting image edges by multiplying pixels adjacent to each pixel by given coefficients and totaling the multiplied results. The Sobel filtering process is carried out using two coefficient matrixes in vertical and horizontal directions.

Specifically, the light reflected from an object whose surface causes specular reflection, such as an automobile, changes depending on the angle at which the reflected light is viewed. A point on the object which is observed in left and right images exhibits different luminance values. Therefore, an area base matching process may not be done well between the left and right images, tending to result in inaccurate stereo distance measurement. To avoid such a drawback, a stereo matching process is not performed on textureless portions and portions causing specular reflection, but on edges only for distance measurement. First, the Sobel filtering process is performed on an input image to extract edges and feature points, and thereafter the extracted data are binarized to generate an edge image 60 shown in FIG. 12. At this time, as shown in FIG. 12, portions, such as a white line on the road, which are not related to the detection of an object are also extracted in the edge image 60.

Figure 12:
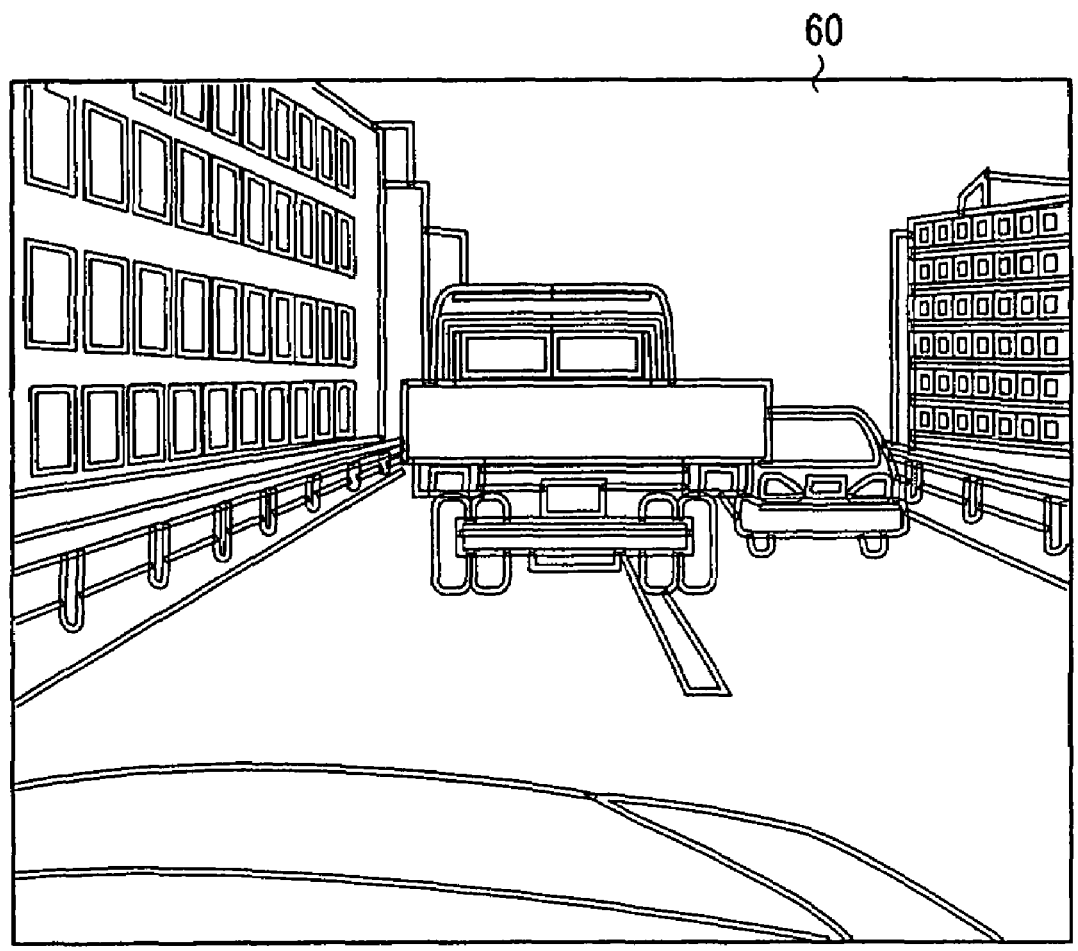
FIG. 12 is a diagram showing an edge image of extracted edges.
Figure 13:
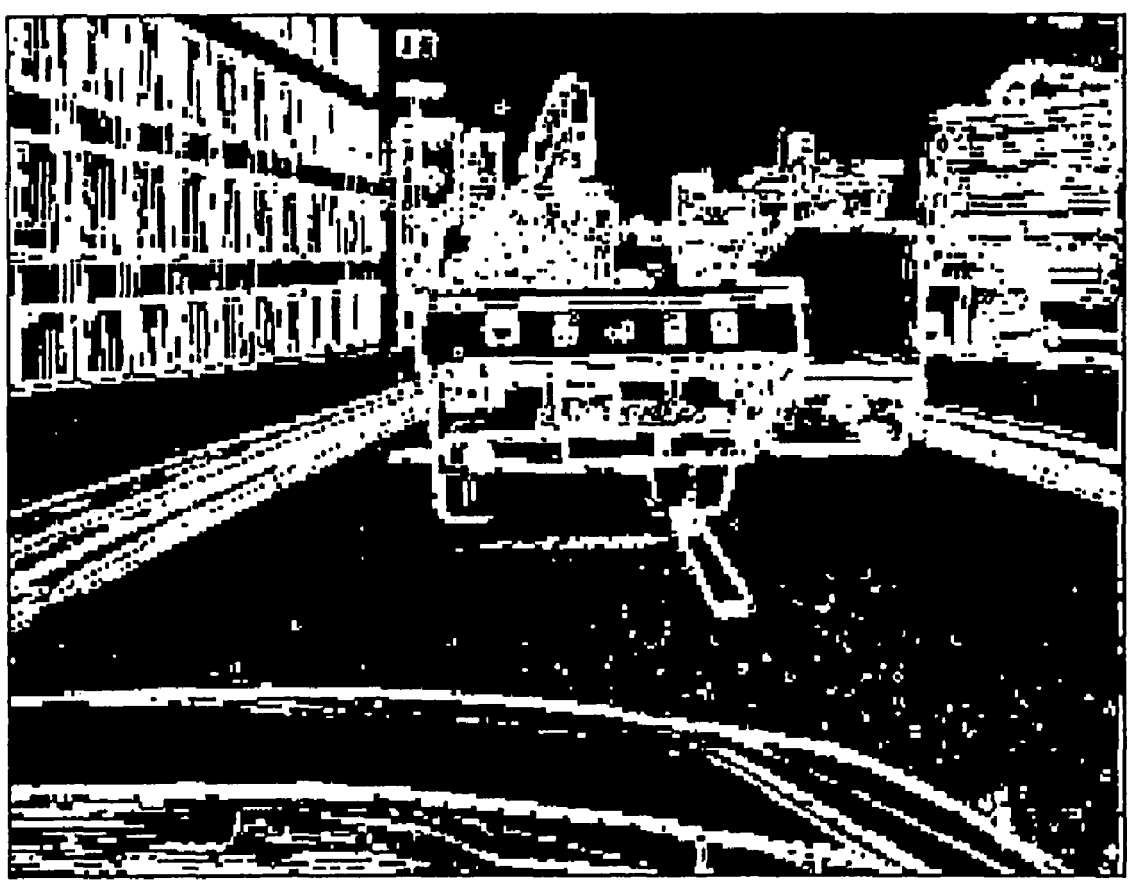
FIG. 13 is a diagram showing actual image data of the edge image of extracted edges.

In FIG. 12, the edge image 60 is schematically shown for illustrative purpose. Actually, image data shown in FIG. 13 are generated as data of the edge image 60.

Figure 14:
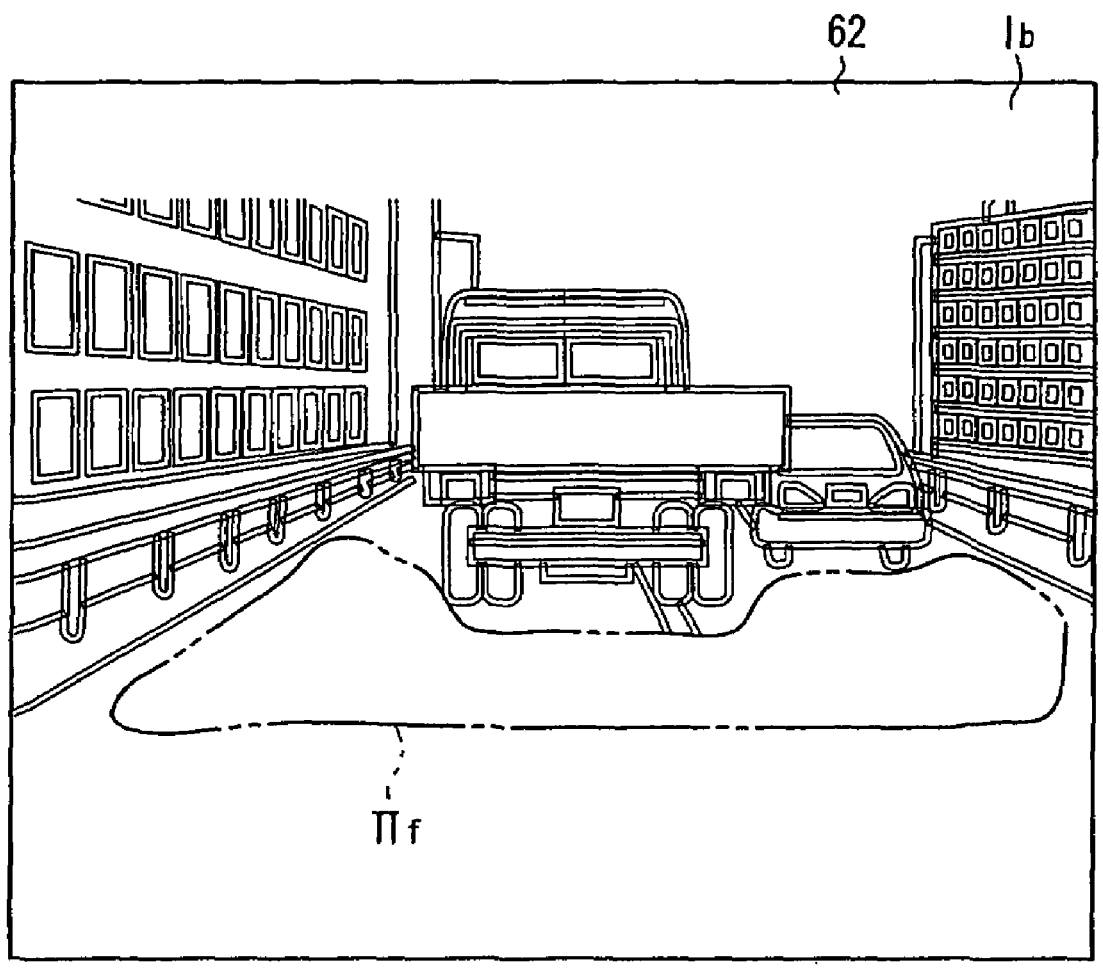
FIG. 14 is a diagram showing a corrected edge image with a plane area removed.

In step S412, since edges on the road plane such as the white line are not to be detected, a plane area $\Pi_f$ (see FIG. 5) obtained in the road plane area extracting process (step S2) is removed from the edge image 60. Specifically, the binary data of the edge image 60 and the plane area $\Pi_f$ are exclusively-operated to produce a corrected edge image 62 shown in FIG. 14. An upper area having a certain width in the edge image 60 and an area on a lower engine hood in the edge image 60 are not to be detected. Since these areas are fixed in position in the edge image 60, these areas are also removed by a given area specifying means.

Even if plane portions are not fully removed from the edge image 60, they will not be detected in error since a process limited to the space where the vehicle 10 passes through is carried out as described later.

Figure 15:
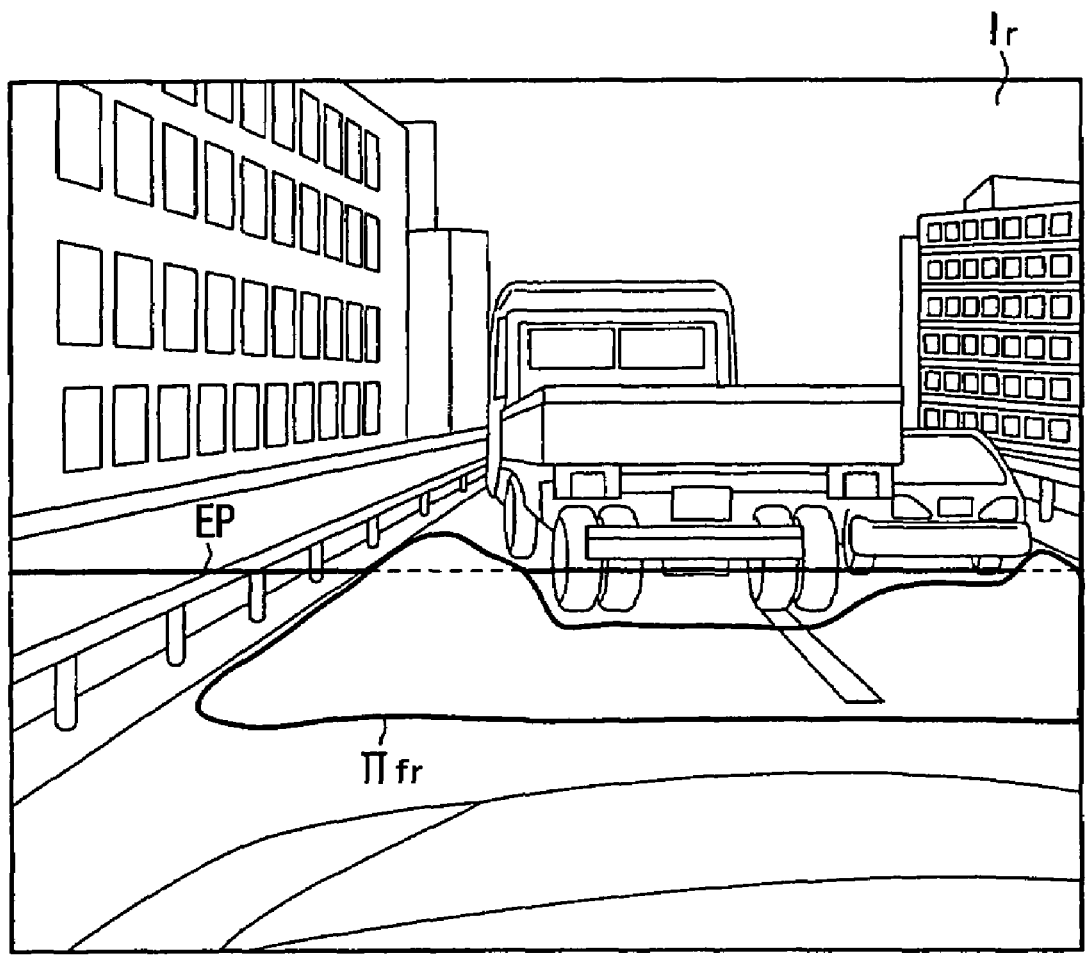
FIG. 15 is a diagram showing a reference image with an epipolar line established therein.

In step S413, an epipolar line EP (see FIG. 15) is established as a search range on the reference image $I_r$ which corresponds to edge points remaining on the corrected edge image 62. The epipolar line EP is calculated as a straight line including points corresponding to the reference image $I_r$ of the edge points on the corrected edge image 62, based on the internal parameter of the reference camera 14, the internal parameter of the base camera 12, and the rotation matrix R and the translation vector t between the reference camera 14 and the base camera 12. Details of the epipolar line EP will be described later.

In step S414, the plane area $\Pi_f$ obtained in the road plane area extracting process (step S2) is multiplied by an inverse matrix of the projection transformation matrix to determine a reference plane area $\Pi_{fr}$ on the reference image $I_r$, and the reference plane area $\Pi_{fr}$ is projected onto the reference image $I_r$.

In step S415, the reference plane area $\Pi_{fr}$ is removed from the epipolar line EP on the reference image $I_r$, limiting the epipolar line EP to a non-plane area.

In step S416, an area base matching process is performed on the epipolar line EP on the reference image $I_r$ with respect to a small area on the base image $I_b$ which corresponds to edge points. The area base matching process is a process of generating a small matching window around the edge points in the base image $I_b$ and successively calculating similarities between the matching window and the small window on the epipolar line EP on the reference image $I_r$. According to the area base matching process, points whose similarity is the highest are determined as points (window) corresponding to the edge points.

At this time, the area base matching process is performed from the base image $I_b$ to the reference image $I_r$, and calculated similarities are compared with a threshold value. If matching is judged as being successful, then the area base matching process is performed from the reference image $I_r$ to the base image $I_b$. If points match the points in the preceding base image $I_b$, then matching is judged as being established. When the area base matching process is performed in this manner, a matching error due to repetitive patterns is avoided. The threshold value used may include a first threshold value for a maximum value of similarity and a second threshold value based on the difference between the maximum value of similarity and a second greatest value of similarity.

The similarities may be calculated using a zero-mean normalized cross-correlation function (ZNCC) as a similarity function. Since pattern similarities are calculated by the zero-mean normalized cross-correlation function, a matching error is less likely to occur even if an overall luminance offset is present between the base image $I_b$ and the reference image $I_r$. The zero-mean normalized cross-correlation function is determined by the following expression (4-2):

$$ZNCC = \frac{\sum_{x \in R}(I_b(x+u) - \bar{I}_b)(I_r(x+v) - \bar{I}_r)}{\sqrt{\sum_{x \in R}(I_b(x+u) - \bar{I}_b)^2} \sqrt{\sum_{x \in R}(I_r(x+v) - \bar{I}_r)^2}} \quad (4\text{-}2)$$

where $I_b$, $I_r$ represent the base image and the reference image, respectively, R the window area, x the position of a pixel in the window, and u, v the base positions of the windows of the base image and the reference image, respectively.

Other similarity functions (SSD (sum of squared differences), NSSD, and SAD (sum of absolute differences)) may be used based on the types of the base image $I_b$ and the reference image $I_r$, a required calculation velocity, etc.

According to the area base matching process in step S416, only edge points in the base image $I_b$ from which the plane area $\Pi_f$ is removed are to be processed, and only edge points on the epipolar line EP in the reference image $I_r$ from which the reference plane area $\Pi_{fr}$ is removed are to be processed. Therefore, the calculation load is greatly reduced, and points in the plane area are not detected. Since the calculation load is reduced, inexpensive hardware may be used for calculations.

In step S417 (first object position calculating means), camera coordinates Cc of a corresponding point according to stereo measurement based on the principles of trigonometry are calculated based on points (window) on the base image $I_b$ and points (window) on the reference image $I_r$ where the area base matching process is satisfied.

Figure 16:
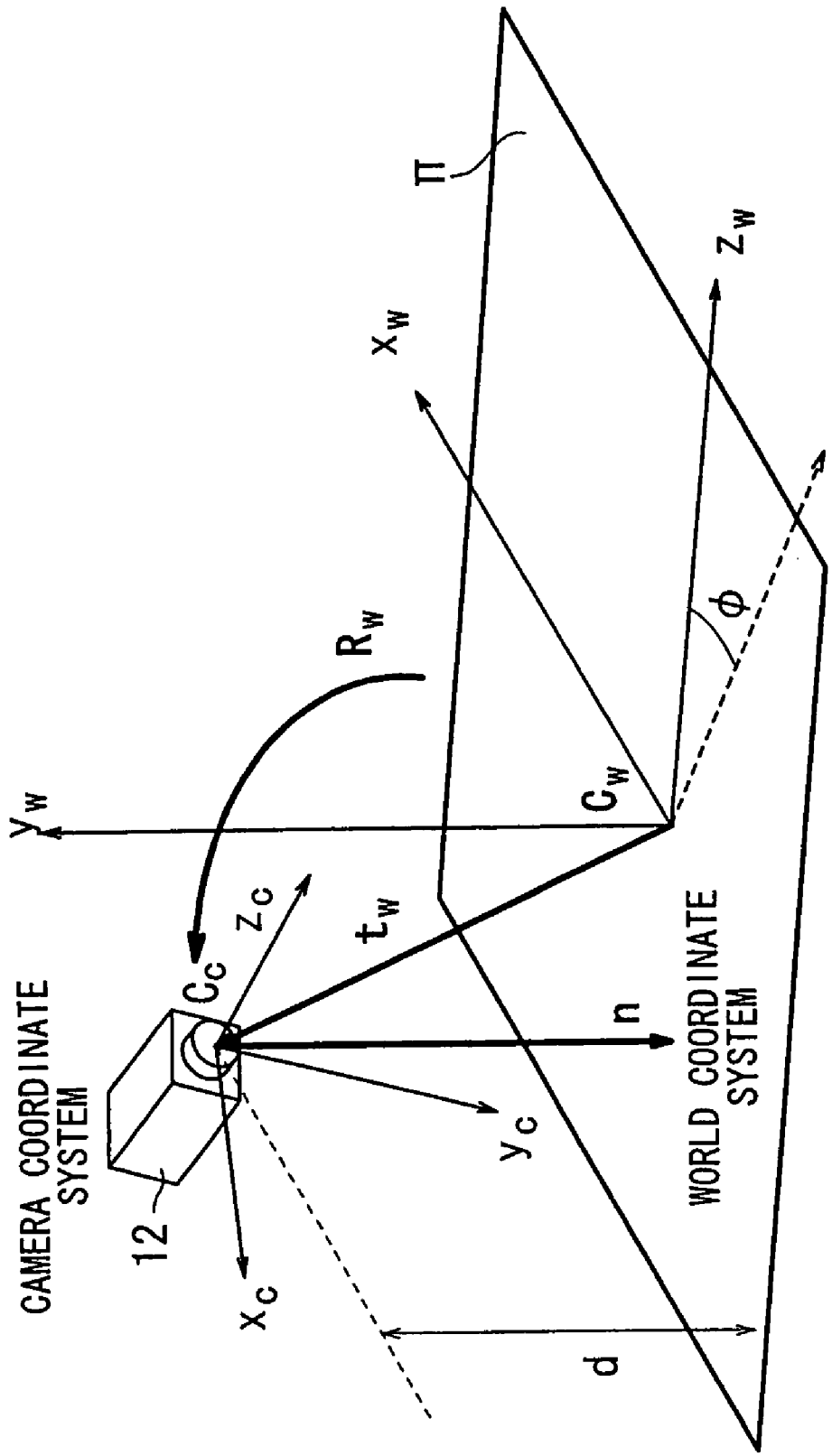
FIG. 16 is a diagram showing a relationship between a world coordinate system and a camera coordinate system.

In step S418, the camera coordinates Cc are transformed into world coordinates Cw based on the vehicle 10 which is the own vehicle. Specifically, as shown in FIG. 16, the camera coordinate system has its origin aligned with the optical center of the base camera 12 and has orthogonal coordinate axes Xc, Yc, Zc with the optical axis of the base camera 12 being aligned with the coordinate axis Zc. The world coordinate system has a coordinate axis Yw represented by the normal vector n and coordinate axes Xw, Zw represented respectively by orthogonal axes Xw, Zw on the plane Π. The coordinate axis Zw is aligned with the longitudinal direction of the vehicle, and the origin is aligned with a particular position on the vehicle (a position on the plane Π) which serves as a basis for determining the position of an object with respect to the vehicle. A vector directed from the origin of the world coordinate system to the origin of the camera coordinate system is expressed as $[t_{wx}, t_{wy}, t_{wz}]^t = tw$ (twy is equal to the distance d). With each parameter thus expressed, the world coordinates Cw are expressed by the following expression (4-3):

$$Cw = Rw \cdot Cc + tw \qquad (4\text{-}3)$$

If the normal vector n is expressed by the expression (4-4) shown below, then a rotation matrix $R_w$ is expressed by the expression (4-5) shown below:

$$n = (n_x, n_y, n_z)^t \qquad (4\text{-}4)$$

$$R_w = \begin{pmatrix} \cos\pi & -\sin\pi & 0 \\ \sin\pi & \cos\pi & 0 \\ 0 & 0 & 1 \end{pmatrix} \begin{pmatrix} \cos\phi & 0 & -\sin\phi \\ 0 & 1 & 0 \\ \sin\phi & 0 & \cos\phi \end{pmatrix} \begin{pmatrix} 1 & 0 & 0 \\ 0 & \cos\theta & -\sin\theta \\ 0 & \sin\theta & \cos\theta \end{pmatrix} \begin{pmatrix} \cos\varphi & -\sin\varphi & 0 \\ \sin\varphi & \cos\varphi & 0 \\ 0 & 0 & 1 \end{pmatrix} \qquad (4\text{-}5)$$

where $\varphi = \arctan\left(\dfrac{n_x}{n_y}\right)$ (roll angle)

$\theta = \arctan(-n_z)$ (pitch angle)

$\phi$: the orientation of the camera optical axis with respect to the Zw axis (yaw angle)

For a simpler explanation, steps S413 through S418 are shown in a serial sequence in the flowchart shown in FIG. 11. Actually, steps S413 through S418 are executed for each of the edge points represented by the corrected edge image 62 to determine corresponding world coordinates Cw.

Figure 17:
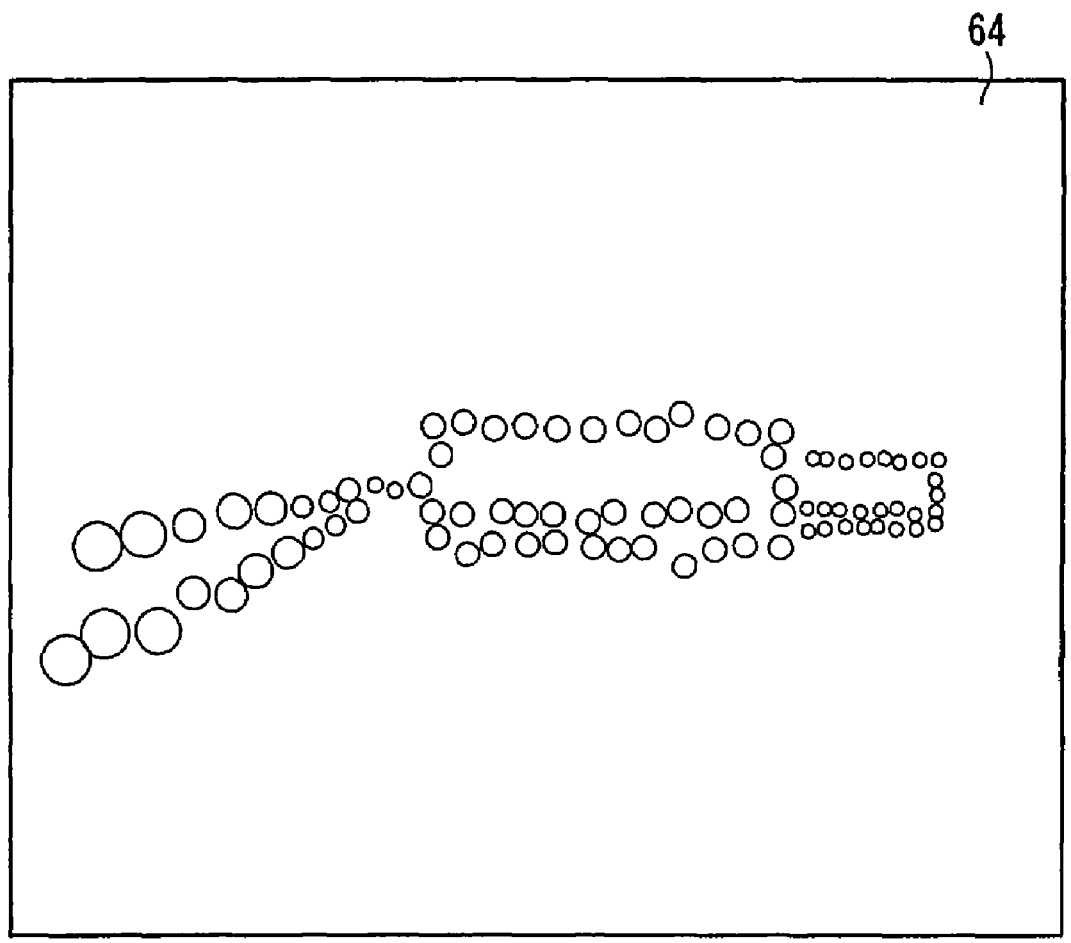
FIG. 17 is a diagram showing a depth image.

The edge points on the corrected edge image 62 can thus be expressed as a depth image 64 as shown in FIG. 17, for example, based on the depth coordinate axis Zw. In the depth image 64, points having sizes depending on the value on the coordinate axis Zw (or the distance from the origin of the world coordinate system) are shown. Each of the points may be indicated as a gradation point whose color changes depending on the value on the coordinate axis Zw. The depth image 64 is presented for the designer to confirm operation and hence may not actually be provided. However, the world coordinates Cw required to generate the depth image 64 are recorded in the given memory.

According to the processing of step S41 (steps S411 through S418), as described above, the world coordinates Cw of each of the edge points of the object can be determined based on the base image $I_b$ and the reference image $I_r$. Since the portion from which the plane area $\Pi_f$ is removed is processed, the calculation load is reduced. Steps S413 through S416 may be referred to as a reference image corresponding portion searching means.

<Step S5>

Figure 18:
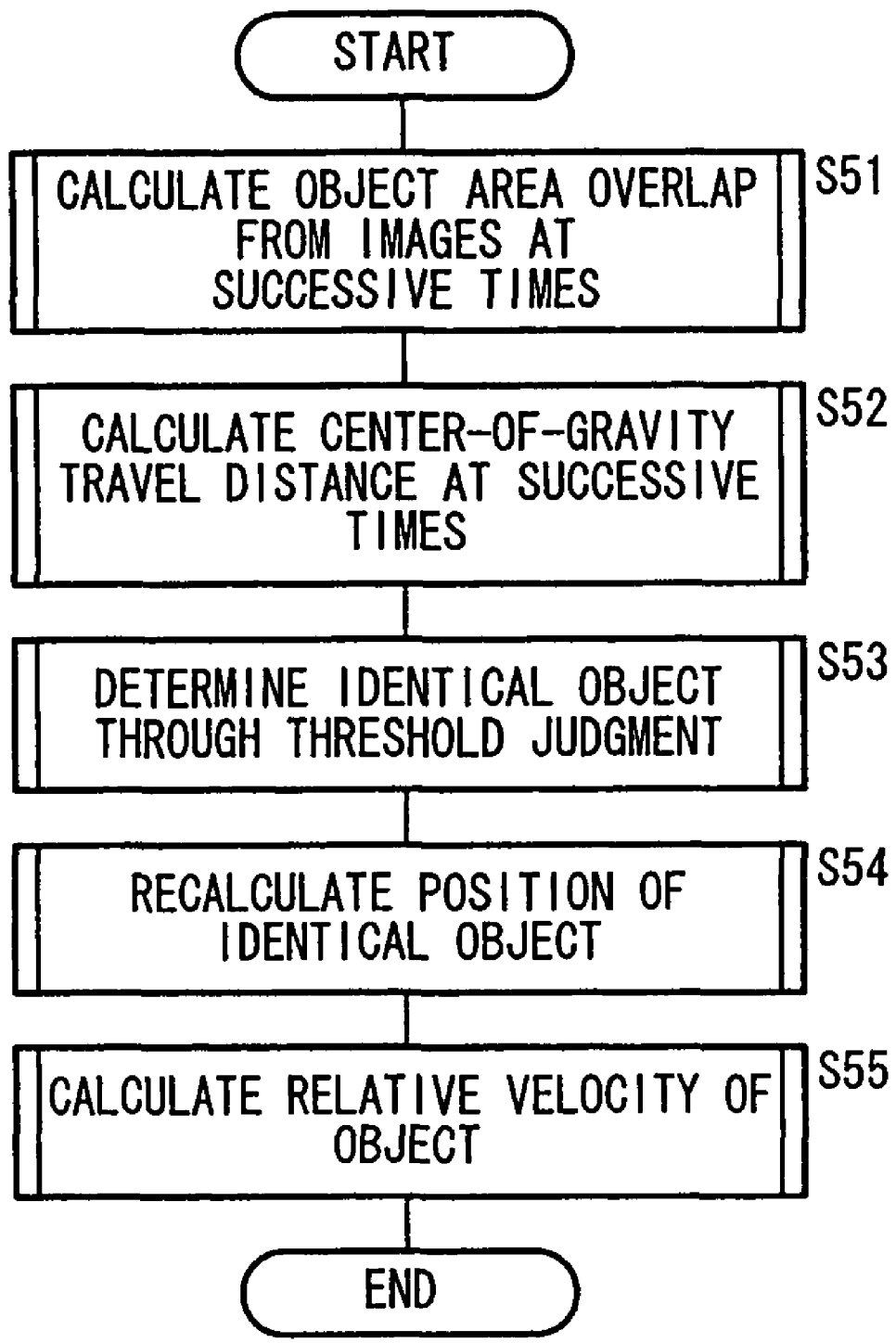
FIG. 18 is a flowchart of a processing sequence for calculating a relative velocity of an object.

Step S5 represents a process of calculating a relative velocity of an object, and comprises a subroutine of steps S51 through S55 shown in FIG. 18.

In step S51, an overlapping rate Rate of object areas is calculated from base images $I_b$ at successive times.

In step S52, a center-of-gravity travel distance Lg of the object is calculated at successive times.

In step S53 (identical object determining means), an identical object is determined through threshold judgment based on the overlapping rate Rate and the center-of-gravity travel distance Lg.

In step S54, in order to determine the position of the object highly accurately, it is recalculated to determine a position vector $P_r$.

In step S55, a relative velocity vector $V_{obst\text{-}rel}$ of the object is calculated based on the position vector $P_r$.

Figure 19:
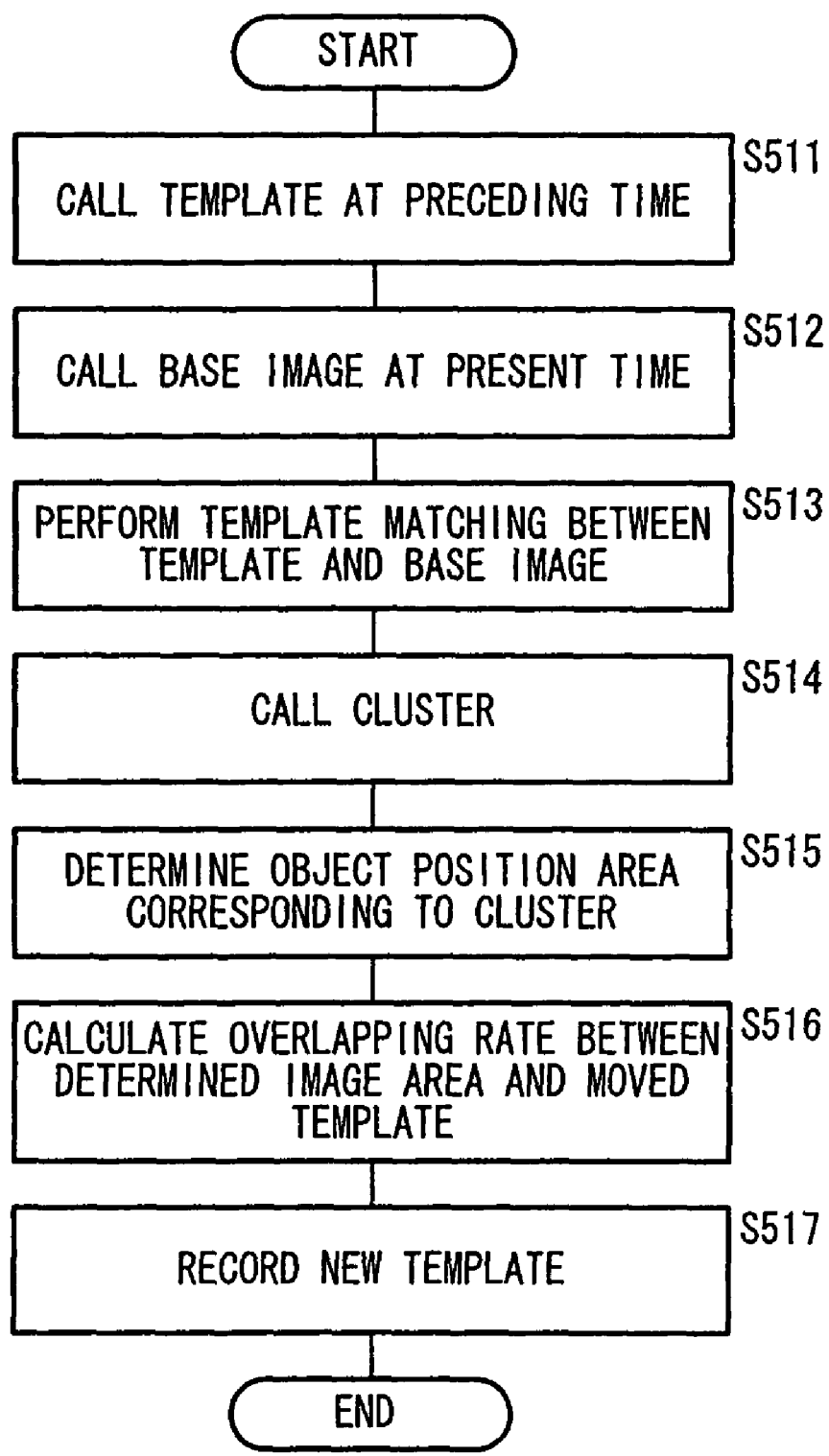
FIG. 19 is a flowchart of a processing sequence for checking how an object area is overlapped.

Step S5 (see FIG. 3) is constructed of these steps S51 through S55. Each of these steps will be described in greater detail below. In the description of steps S51 through S55, a processing sequence for a truck 70 (see FIG. 5) in the base image $I_b$ of the detected objects will be described by way of example. Other detected objects, such as a passenger car 72 and a guardrail 74, are also processed in the same manner. Step S51 comprises a subroutine of steps S511 through S517 shown in FIG. 19.

In step S511, a template 80a stored in step S517 at a preceding time is called from a given memory area. The template 80a represents a recorded image, in a specified area, of the truck 70 in the base image $I_b$ which corresponds to the cluster 54a in the voting plane 50 (see FIG. 20), and is recorded as an area at a height of 1.5 m from the plane.

Figure 20:
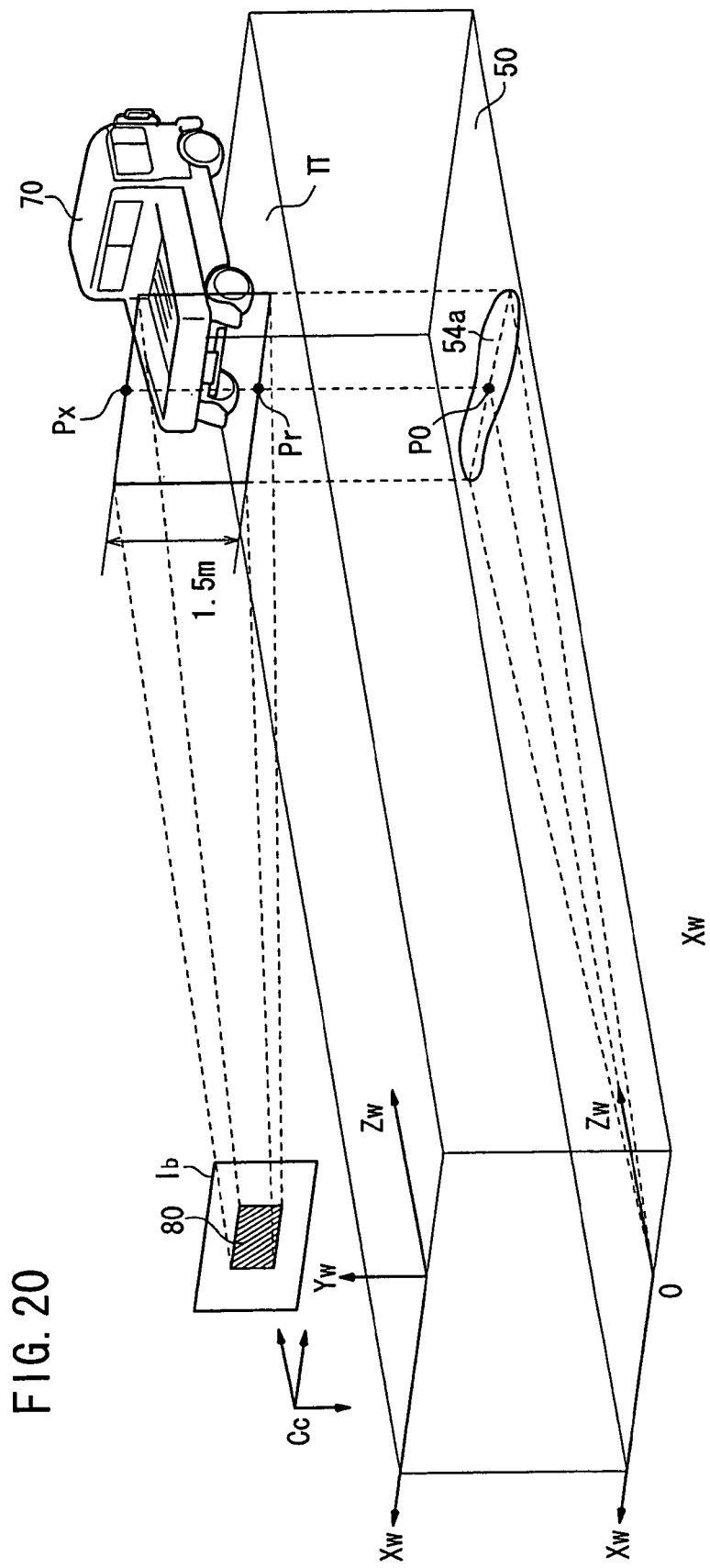
FIG. 20 is a diagram showing a process of generating a template based on a cluster.
Figure 21:
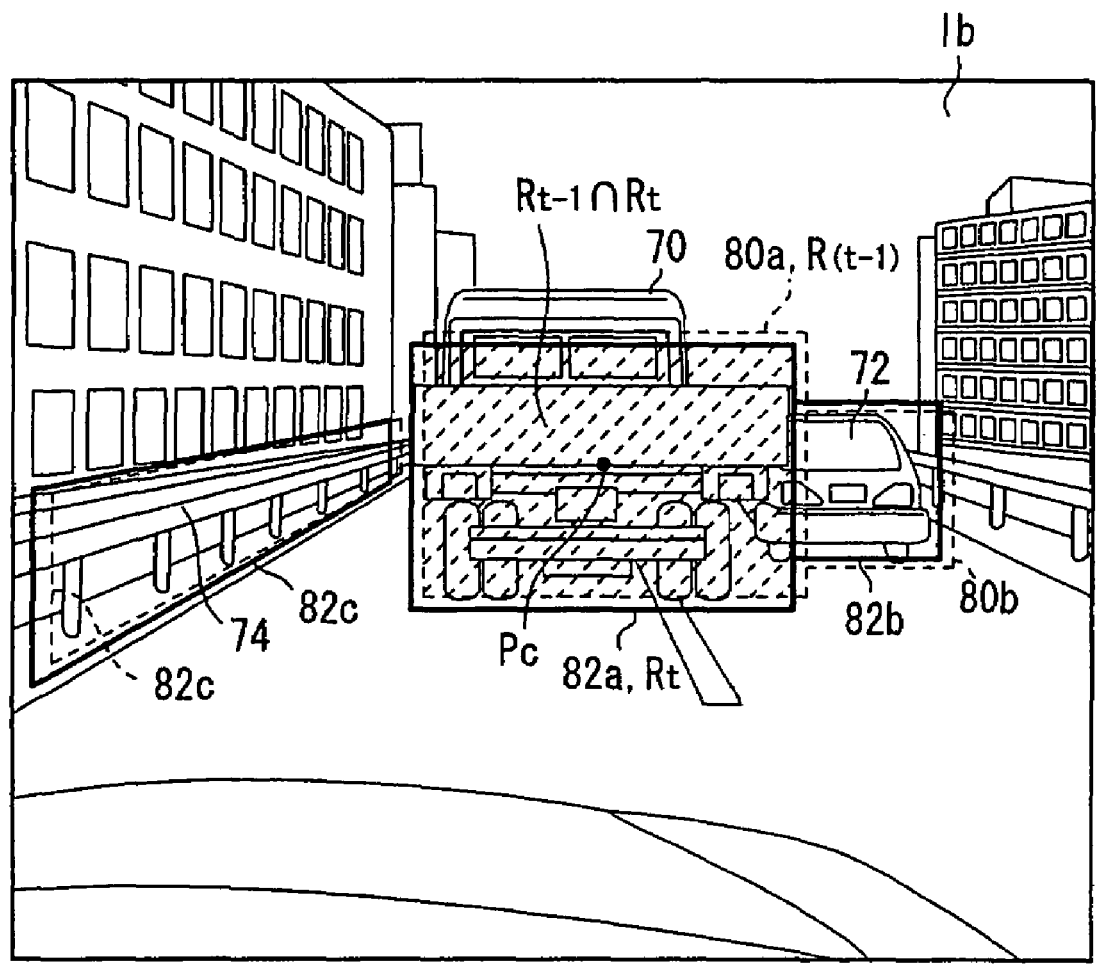
FIG. 21 is a diagram showing a base image with a template established therein.

Conceptually, as shown in FIG. 20, a point P0 is positioned on the voting plane 50 and is given as a point in the cluster 54a when scanned through a certain angle from the optical center O. World coordinates Cw can be calculated based on the point P0. A point Pr is located in the same width and depth positions as the point P0 and lies on the road plane Π. Since the point Pr lies on the road plane Π, its height is 0. A point Px is located in the same width and depth positions as the point P0 and has a height of 1.5 m from the road plane Π. The points Pr, Px are transformed into camera coordinates Cc. After having been transformed into camera coordinates Cc, they may be transformed into coordinates on the base image $I_b$ using a perspective projection matrix. In this manner, the template 80a corresponding to the cluster 54a at the preceding time is determined and recorded. Similarly, a template 80b and a template 80c shown in FIG. 21 are recorded respectively with respect to the cluster 54b at the preceding time which corresponds to the passenger car 72 and the cluster 54c at the preceding time which corresponds to the guardrail 74.

Since the heights of the respective objects have been determined in step S418, the heights of the respective templates 80a, 80b, 80c may be established depending on the determined heights of the objects.

In step S512, the base image $I_b$ acquired in step S0 according to the main routine at the present time is read out. It is assumed that an original image before it is LOG-filtered and histogram-equalized will be used.

In step S513 (template matching means), texture-based template matching is performed on the base image $I_b$ acquired at the present time, using each template 80a, and each template 80a is moved to a position of highest similarity. Specific processes for template matching may be a matching process according to the ZNCC expression (4-2), a matching process using SSD, a matching process using SAD, etc.

In step S514, the cluster 54a determined at the present time is called based on the data recorded in step S46.

In step S515 (object position area calculating means), a corresponding object position area 82a is determined with respect to the called cluster 54a. The object position area 82a is determined according to the procedure described above in step S511. The object position area 82a may be determined based on three-dimensional spatial positions of the edge points in the depth image 64 shown in FIG. 17, rather than the process determining the object position area 82a based on the plane cluster 54a.

In step S516 (overlapping rate calculating means), an overlapping rate Rate between the template 80a moved in step S513 and the object position area 82a determined in step S515 is calculated according to the following expression (5-1):

$$\text{Rate} = (R_{t-1} \cap R_t)/\min(R_{t-1}, R_t) \quad (5\text{-}1)$$

where $R_{t-1}$ represents the area of the moved template 80a, $R_t$ the corresponding object position area 82a, $\cap$ the operator indicative of the overlapping portion of the areas, and $\min(R_{t-1}, R_t)$ a function for selecting either one of $R_{t-1}$, and $R_t$ which has a smaller area.

According to the expression (5-1), Rate=1 if the moved template 80a and the object position area 82a are in complete agreement with each other, and Rate=0 if there is no agreement whatsoever therebetween. Conceptually, as shown in FIG. 21, the rate of an overlapping portion $R_{t-1} \cap R_t$ where $R_{t-1}$ indicative of the template and $R_t$ indicative of the object position area overlap each other in the base image $I_b$ is determined.

If the overlapping rate Rate is equal to or greater than a predetermined threshold value Tha (0<Tha<1), then it is temporarily judged that the cluster in the voting plane 50 at the preceding time and the cluster in the voting plane 50 at the present time are based on the same object, and a tracking process is performed. The tracking process is a process of matching clusters obtained at different times, and makes it possible to detect the motion of an object.

In step S517, the object position area 82a determined in step S515 is recorded as a new template 80a in the given memory. The new template 80a is called in step S511 in a next processing cycle, as described above.

In step S51 (steps S511 through S517), as described above, the template matching process is performed based on the template 80a, and the double tracking process is performed in order to determine the object position area 82a from the cluster 54a in the voting plane 50. The reliability of the tracking process is increased by determining the overlapping rate Rate of these results. Actually, the association of the tracking process determined in step S51 is finally confirmed in step S53.

Figure 22:
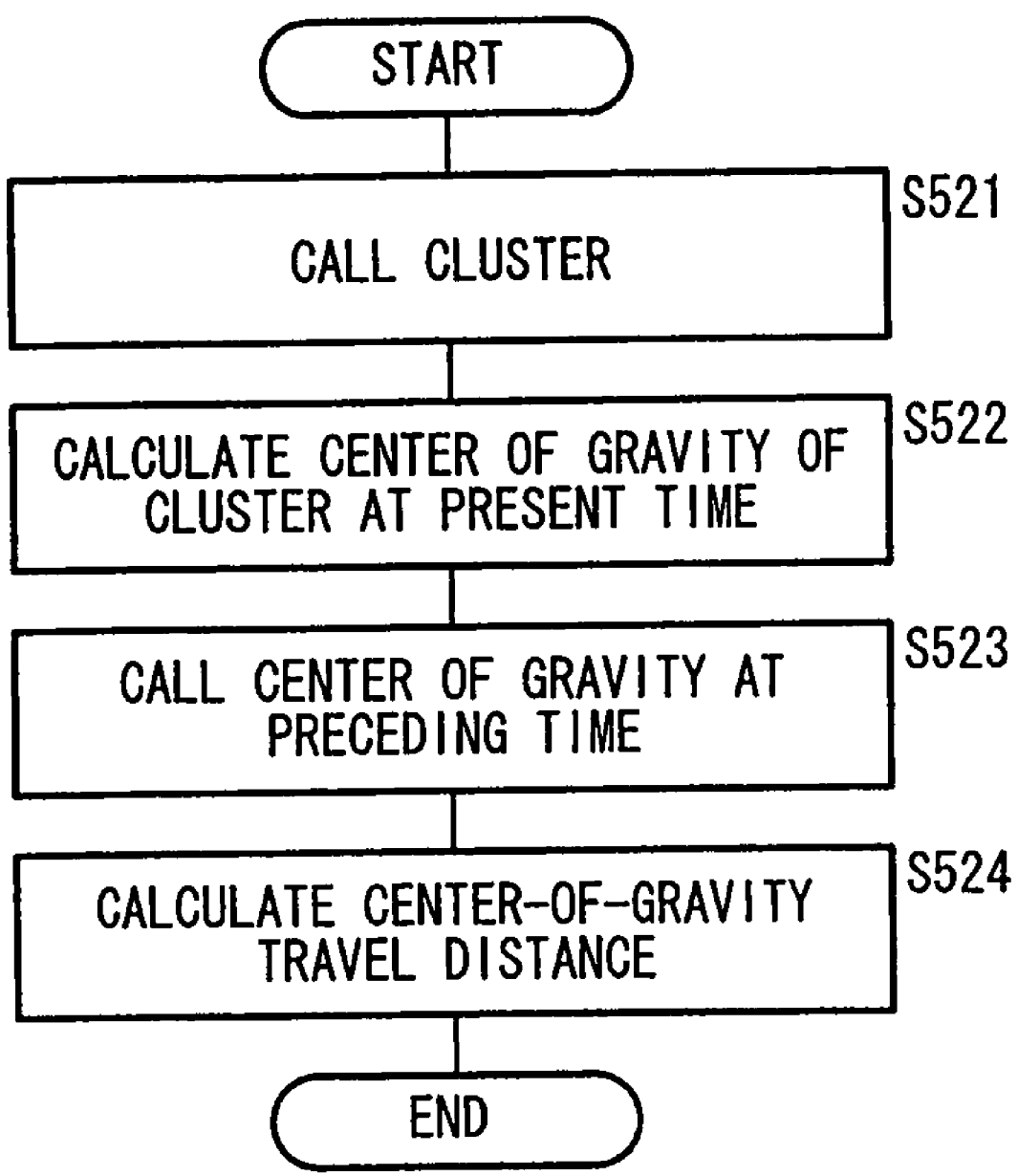
FIG. 22 is a flowchart of a processing sequence for calculating a center-of-gravity travel distance.

The processing of step S52 will be described below. Step S52 comprises a subroutine of steps S521 through S524 shown in FIG. 22.

In step S521, the cluster 54a determined at the present time is called based on the data recorded in step S46.

In step S522 (object center-of-gravity position calculating means), a center $g_T$ of gravity of the cluster 54a at the present time is determined and recorded in the voting plane 50 as shown in FIG. 10.

In step S523, a center $g_o$ of gravity of the cluster 54a at the preceding time which has been recorded in step S533 at the preceding time is read out.

In step S524 (travel-distance-between-object-centers-of-gravity calculating means), a center-of-gravity travel distance Lg between the center $g_o$ of gravity and the center $g_T$ of gravity of the cluster 54a is calculated.

In step S52 (steps S521 through S524), as described above, the center-of-gravity travel distance Lg between the center $g_o$ of gravity at the preceding time and the center $g_T$ of gravity at the present time of the cluster 54a is determined. Therefore, clusters whose respective travel distances within a short period of time are reasonable can be associated with each other. Actually, the association of the tracking process determined in step S52 is finally confirmed in step S53.

Figure 23:
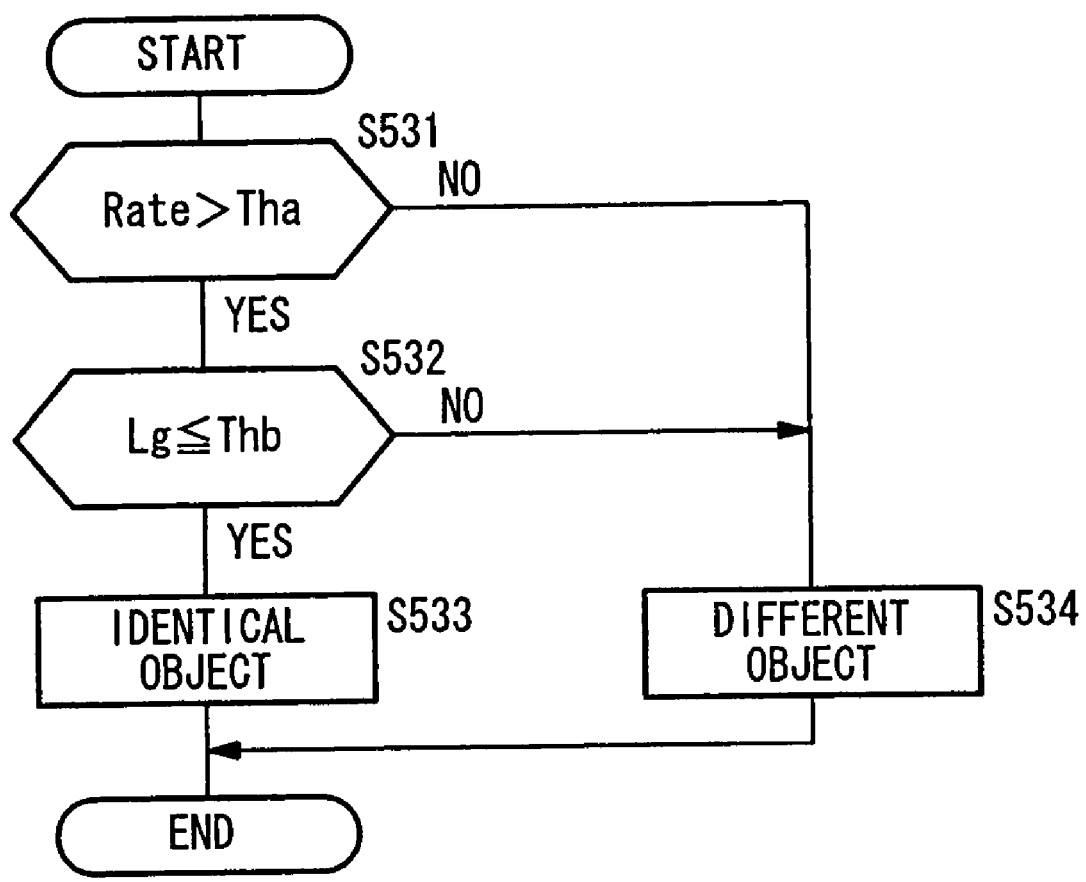
FIG. 23 is a flowchart of a processing sequence for determining an object identity.

The processing of step S53 will be described below. Step S53 comprises a subroutine of steps S531 through S534 shown in FIG. 23.

In step S531, the overlapping rate Rate determined in step S516 and the threshold value Tha are compared with each other for each corresponding object. If Rate≧Tha, then control goes to step S532. If Rate<Tha, then control goes to step S534.

In step S532, the center-of-gravity travel distance Lg determined in step S524 and a threshold value Thb are compared with each other for each corresponding object. If Lg≦Thb, then control goes to step S533. If Lg>Thb, then control goes to step S534. The threshold value Thb is established as a fixed value representative of a reasonable distance that an object can travel in a processing period, in view of the traveling velocity of the own vehicle and the traveling velocity of an oncoming vehicle.

In step S533, two associated objects are determinably recognized and recorded as an identical object. The center $g_o$ of gravity is changed as $g_o \leftarrow g_T$ and stored in the given memory.

In step S534, two associated objects are recognized as different objects. In this case, a registration process is performed to recognize an object that has not been associated, as a new object that has entered the image capturing range, based on a succession of images, or alternatively, a deleting process is performed to delete an object that has not been associated, as an object that has been moved out of the image capturing range.

In step S53 (steps S531 through S534), as described above, it is possible to confirm more reliably whether two objects that have been associated in the processing up to step S52 are an identical object or not, based on the overlapping rate Rate and the center-of-gravity travel distance Lg.

Steps S531 through S534 have been described above as being executed with respect to two objects that have temporarily been associated with each other in advance. However, these steps may be carried out on all of each object detected at the preceding time and each object detected at the present time for association.

The threshold value Thb used in step S532 has been described as a fixed value. However, a threshold value Th(Zg) as a function that varies based on the distance Zg from the vehicle 10 to the center $g_o$ of gravity in the direction of the coordinate axis Zw may be used for threshold-based determination. In this case, if the distance to the center $g_o$ of gravity of a certain object in the direction of the coordinate axis Zw is represented by Zg1, then the threshold value is represented by Th(Zg1). Similarly, a threshold value Th($|V_v|$) as a function that varies based on the own vehicle velocity $|V_v|$ may alternatively be used for threshold-based determination.

Figure 24:
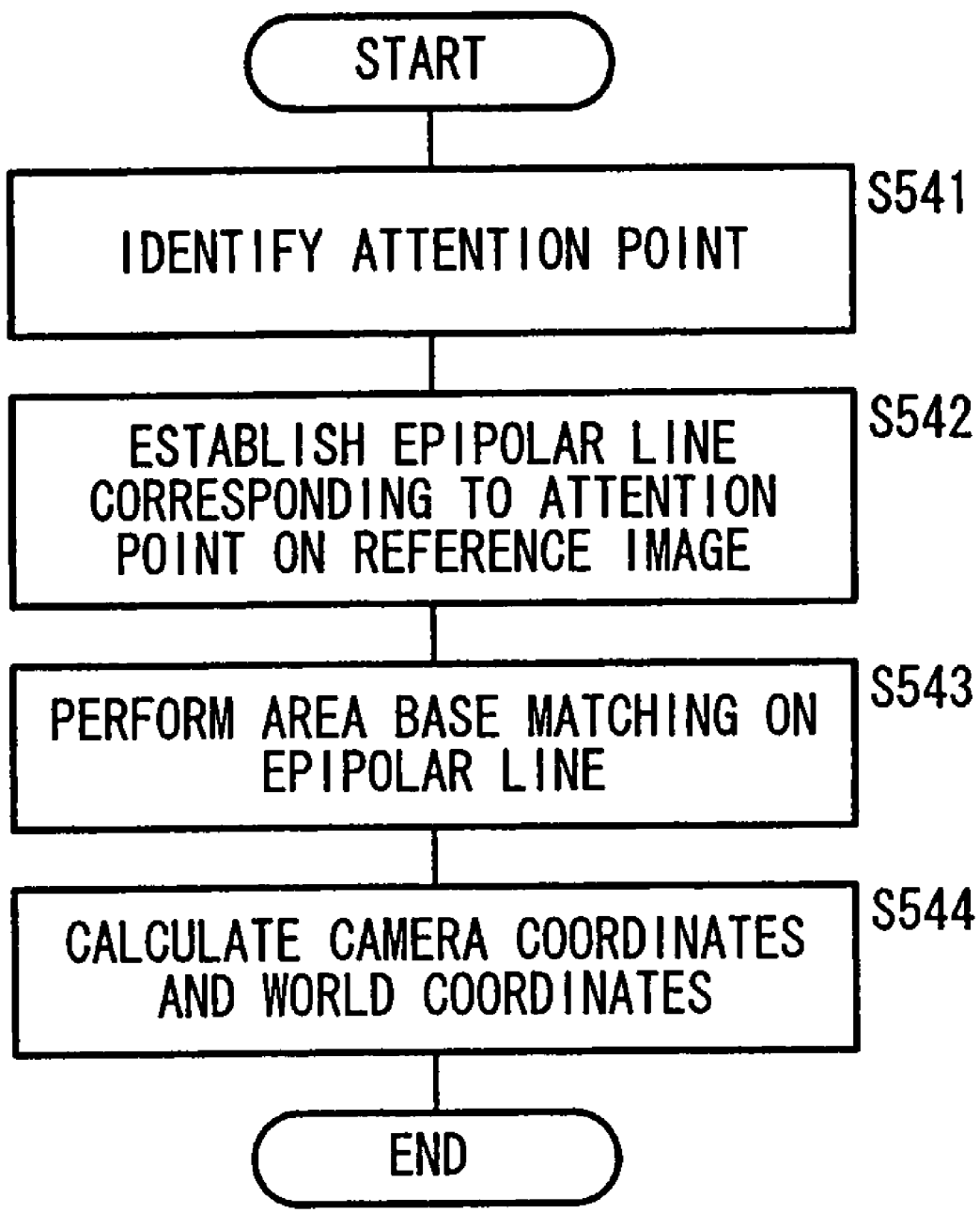
FIG. 24 is a flowchart of a processing sequence for recalculating the position of an identical object.

The processing of steps S54, S55 will be described below. Step S54 comprises steps S541 through S544 shown in FIG. 24, and step S55 comprises steps S551 through S553 shown in FIG. 26.

In step S541 (attention point determining means), an attention point Pc on an object in the base image $I_b$ is identified. The attention point Pc is established in the area of the template 80a which has been moved by the template matching process. For example, if the attention point Pc is identified as a feature point such as a central point of the template 80a, a corner of the object, or the like, then the attention point Pc is identified as substantially the same point on the object at all times.

In step S542, an epipolar line EP corresponding to the attention point Pc is established on the reference image $I_r$. At this time, since an approximate distance up to the truck 70 can be calculated using the cluster 54a, the epipolar line EP can be set to a necessarily and sufficiently short length, based on the calculated distance.

A process of calculating the approximate distance of the attention point Pc using the cluster will be described below. First, a coordinate Zw is determined from the center $g_T$ (see FIG. 10) of gravity of the cluster 54a. The determined coordinate Zw is temporarily set to the coordinate Zw of the attention point Pc. The coordinate Zw and image coordinates $(u_{pc}, v_{pc})$ of the attention point Pc are substituted into the expression (5-2) shown below to calculate a corresponding coordinate Xw. In the expression (5-2), $\lambda 0$ represents degrees of freedom which are represented by a constant multiplication.

$$\lambda \begin{bmatrix} u_{pc} \\ v_{pc} \\ 1 \end{bmatrix} = A_b(R_w^t \mid -R_w^t T_w) \begin{bmatrix} X_w \\ Y_w \\ Z_w \\ 1 \end{bmatrix} \quad (5\text{-}2)$$

A straight line is then established which passes through the position (Xw, Zw) thus determined on the voting plane 50 and the position (twx, twz) of the base camera. The points of the cluster 54a are then searched for along the straight line, and the coordinate Zw of the point which is closest to the vehicle 10 is used as representing an approximate distance of the attention point Pc.

In step S543, the area base matching process is performed on the epipolar line EP of the reference image $I_r$ with respect to the point on the base image $I_b$ which corresponds to the attention point Pc, in the same manner as with step S416.

Figure 25:
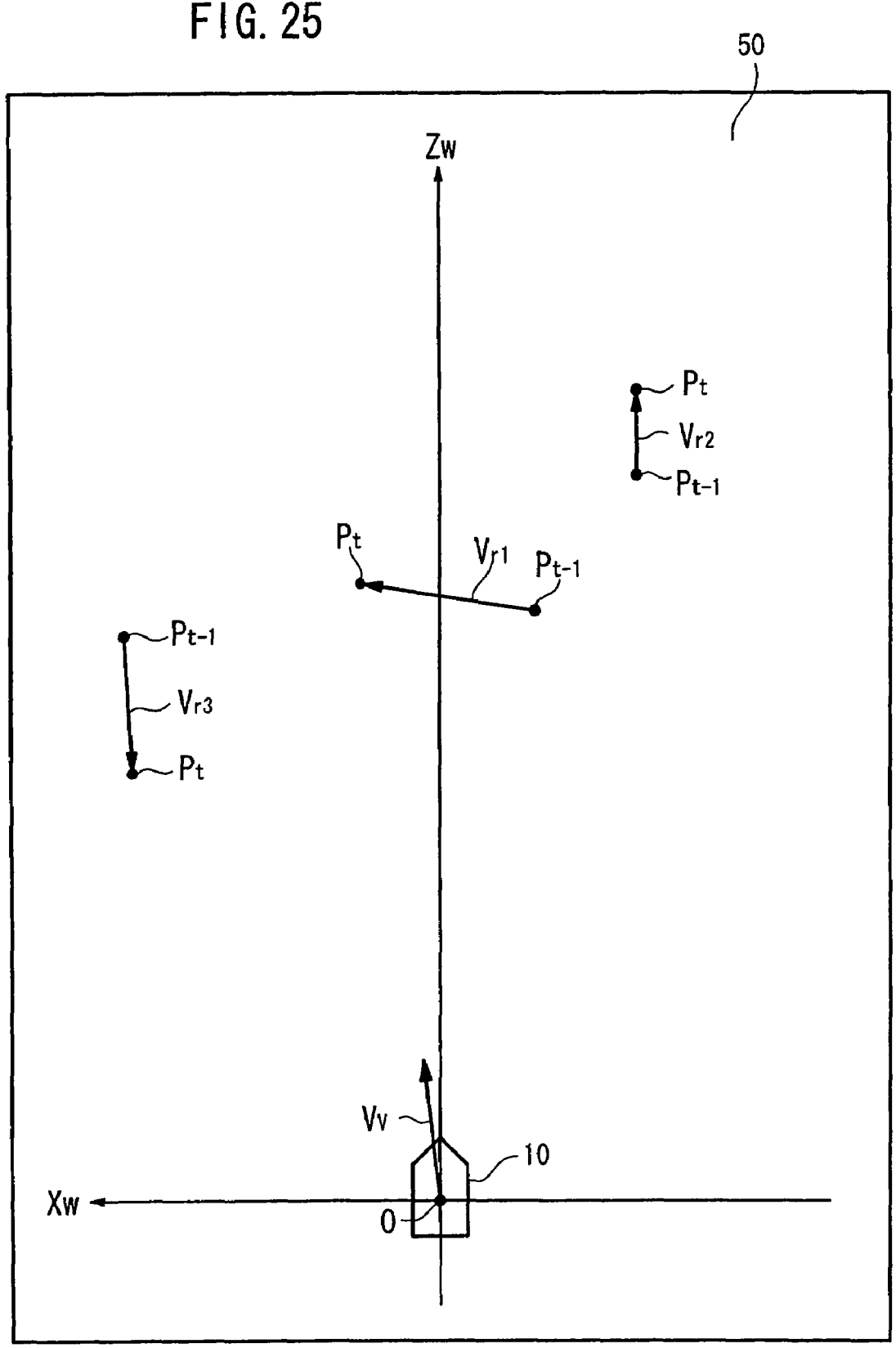
FIG. 25 is a diagram showing a voting plane in which a relative velocity of an object is recorded.

In step S544 (second object position calculating means), camera coordinates Cc of a corresponding point according to stereo measurement are calculated based on points on the base image $I_b$ and points on the reference image $I_r$ where the area base matching process is satisfied, in the same manner as with step S417. Furthermore, the camera coordinates Cc are transformed into world coordinates Cw in the same manner as with step S418. The world coordinates Cw, which represents the determined position of the object, is expressed as a two-dimensional position vector $P_t$ on the voting plane 50, as shown in FIG. 25.

Figure 26:
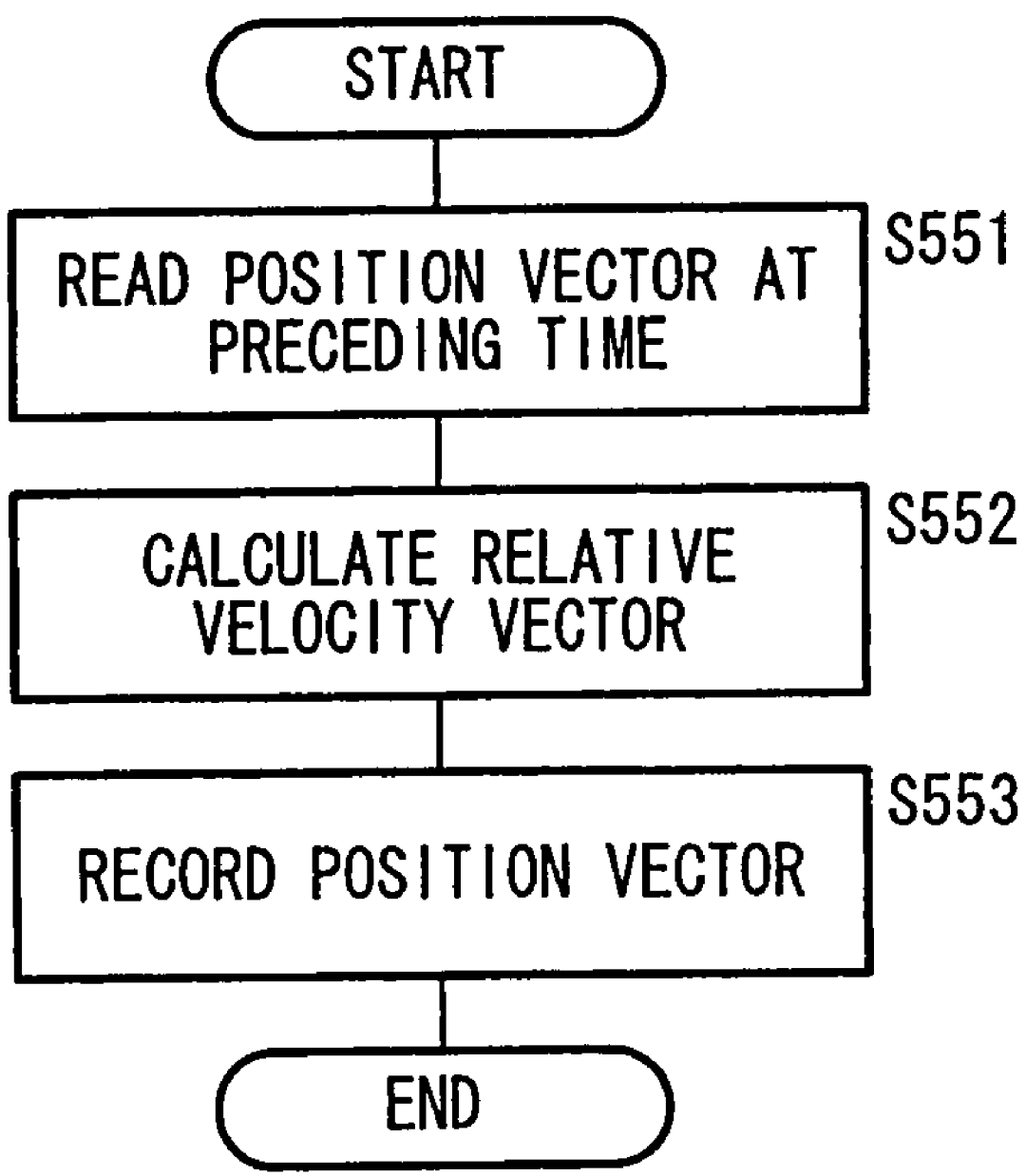
FIG. 26 is a flowchart of a processing sequence for calculating a relative velocity of an object.

In step S551 shown in FIG. 26, a position vector $P_{t-1}$ of the object detected at the preceding time is read out. The position vector $P_{t-1}$ is recorded in the given memory in step S533 in the processing cycle at the preceding time.

In step S552 (object movement vector calculating means), a relative velocity vector (movement vector) $V_{obst\text{-}rel}$ of the object is calculated according to the following expression (5-3):

$$V_{obst\_rel}=(P_t-P_{t-1})/\Delta t \quad (5\text{-}3)$$

where $\Delta t$ represents the processing period. The relative velocity vector $V_{obst\text{-}rel}$ is determined as a change in the position vector $P_t$ per unit time.

In step S553, the position vector $P_t$ is assigned to $P_{t-1}$ ($P_{t-1} \leftarrow P_t$) and recorded in the given memory for use in a next processing cycle. The position vector $P_t$ which is recorded has been updated according to the same processing sequence as steps S541 through S544 with respect to the object position area 82a stored as the new template 80a in step S517.

According to the processing of steps S54, S55, since the epipolar line EP is set to a sufficiently short length, the frequency of matching errors caused in the area base matching process in step S543 is sufficiently reduced to allow the distance of the object to be calculated highly accurately. As the attention point Pc is set to substantially the same point on the object at all times, the relative velocity vector $V_{obst\text{-}rel}$ which represents relative movement over time of the object including movement in the direction of the width (the direction of the coordinate axis Xw) can accurately be calculated.

As a result, vectors Vr1, Vr2, Vr3 which are relative velocity vectors $V_{obst\text{-}rel}$ of the truck 70, the passenger car 72, and the guardrail 74 are displayed as shown in FIG. 25. As can be seen from FIG. 25, it can be judged from the vector Vr1 that the truck 70 is changing its path to the left, from the vector Vr2 that the passenger car 72 is traveling forward at a velocity slightly higher than the vehicle 10, and from the vector Vr3 that the guardrail 74 which is a still object is moving relatively in a direction that is opposite to the traveling direction of the vehicle 10. The own vehicle velocity vector $V_v$ of the vehicle 10 shown in FIG. 25 is determined in steps S6, S7.

Figure 27:
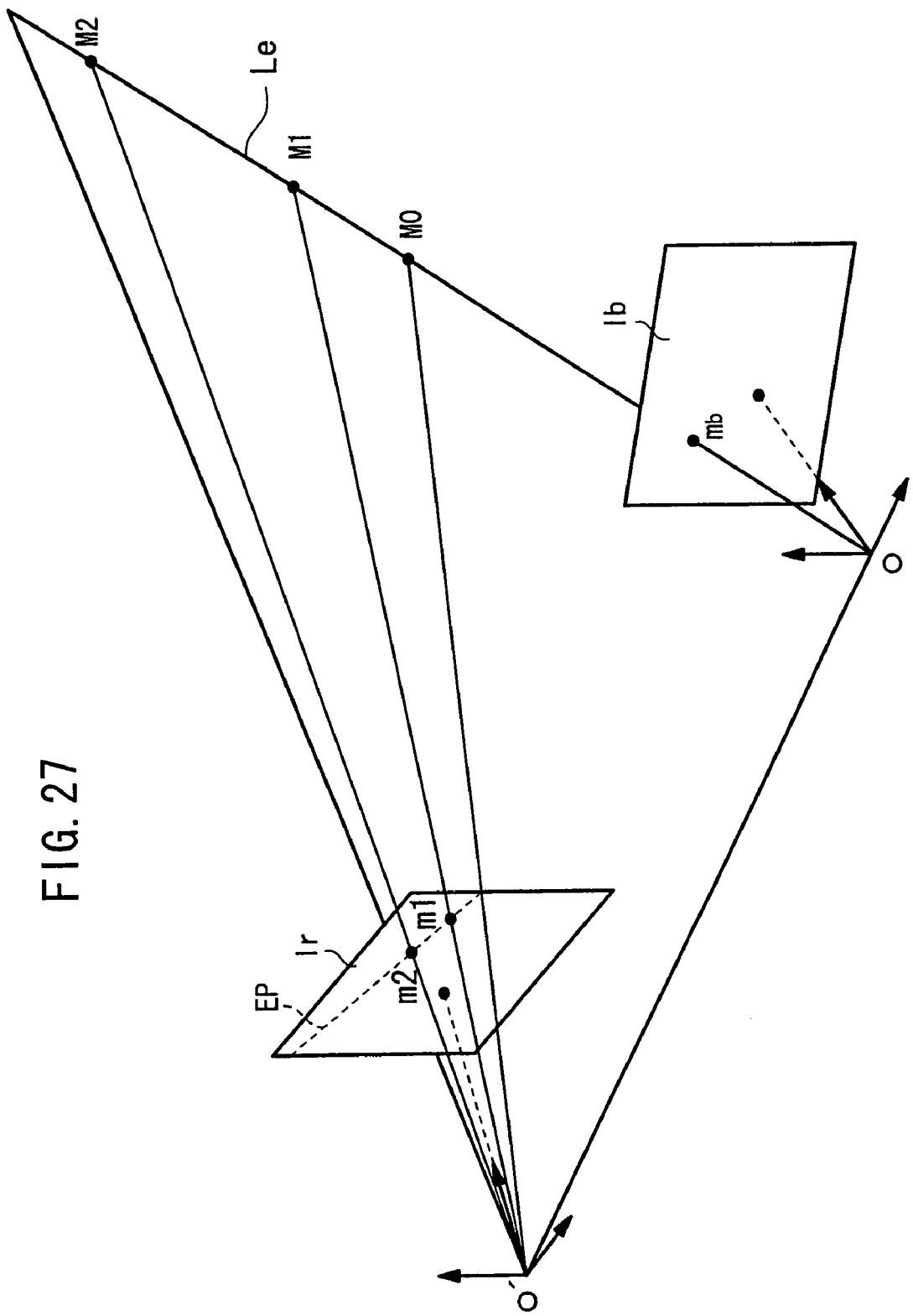
FIG. 27 is a diagram showing a process of establishing an epipolar line.

A process of establishing an epipolar line will be described below. For three-dimensional stereo measurement, the position of the observational point M1 on the base image $I_b$ and the position of the observational point M1 on the reference image $I_r$ need to be determined individually. As shown in FIG. 27, the observational point M1 is projected onto a point $m_b$ on the base image $I_b$, and the point $m_b$ is present on a straight line Le passing through the observational point M1 and the optical center O of the base camera 12. If points on the straight line Le are searched, then the observational point M1 can be found, and the straight line Le projected onto the reference image $I_r$ becomes an epipolar line EP. For associating the observational point M1 projected onto the base image $I_b$ with the reference image $I_r$, points on the epipolar line EP in the reference image $I_r$ may be searched. Points M0, M2 in FIG. 27 are other points projected onto the same point $m_b$ and located on the straight line Le.

Equations for epipolar constraint will be determined below. Using the rotation matrix R and the translation vector t, the relationship Xr=R·Xb+t is satisfied between a reference camera coordinate Xr and a base camera coordinate Xb.

At this time, a normalized image coordinate X̂ba of the base camera 12, a normalized image coordinate X̂ra of the reference camera 14, and the translation vector t are present on the same plane. Since the scalar triple product is 0, the following equation is satisfied:

$$\tilde{X}ra \cdot (t \times R \cdot \tilde{X}ba) = \tilde{X}ra^t [t]_x R \cdot \tilde{X}ba \quad (5\text{-}4)$$

where $$[t]_x = \begin{pmatrix} 0 & -t_3 & t_2 \\ t_3 & 0 & -t_1 \\ -t_2 & t_1 & 0 \end{pmatrix} \quad (5\text{-}5)$$

where t1, t2, t3 represents elements of the translation vector t. By substituting $\hat{m}_b = A_b\hat{X}ba$, $\hat{m}_r = A_r\hat{X}ra$ based on the relationship between the normalized image coordinates and the image coordinates, a fundamental matrix F is expressed by the following expressions (5-6), (5-7):

$$F = A_r^{-1}[t]_x R A_b^{-1} \qquad (5\text{-}6)$$

$$\tilde{m}_r{}^t F \tilde{m}_b = 0 \qquad (5\text{-}7)$$

According to the expression (5-7), if $l' = F\hat{m}$ when the position at which the observational point M1 in the space is projected onto the base image $I_b$ is represented by m, then because $\hat{m}^t l' = 0$, the following equation is satisfied in the reference image $I_r$:

$$l_1'U' + l_2'v' + l_3' = 0 \qquad (5\text{-}8)$$

representing an epipolar line EP corresponding to the observational point M1 in the reference image $I_r$. In the equation (5-8), "'" indicates the reference image, $l_1'$, $l_2'$, $l_3'$ represent parameters of the epipolar line EP in the reference image, and u', v' represent image coordinates of the reference image.

If an approximate position of the observational point M1 is known, then the length of the straight line Le may be limited so as to set the epipolar line EP to a short length.

If $l = F'm'$ when the position at which the observational point M1 in the space is projected onto the reference image $I_r$ is represented by m', then because $l'm = 0$, the following equation is satisfied in the reference image $I_r$:

$$l_1 u + l_2 v + l_3 = 0 \qquad (5\text{-}9)$$

representing an epipolar line EP in the base image $I_b$ at the observational point M1. The parameters u, u' used in the explanation of the epipolar line EP are different from vectors u, u' to be described later.

<Step S6>

Figure 28:
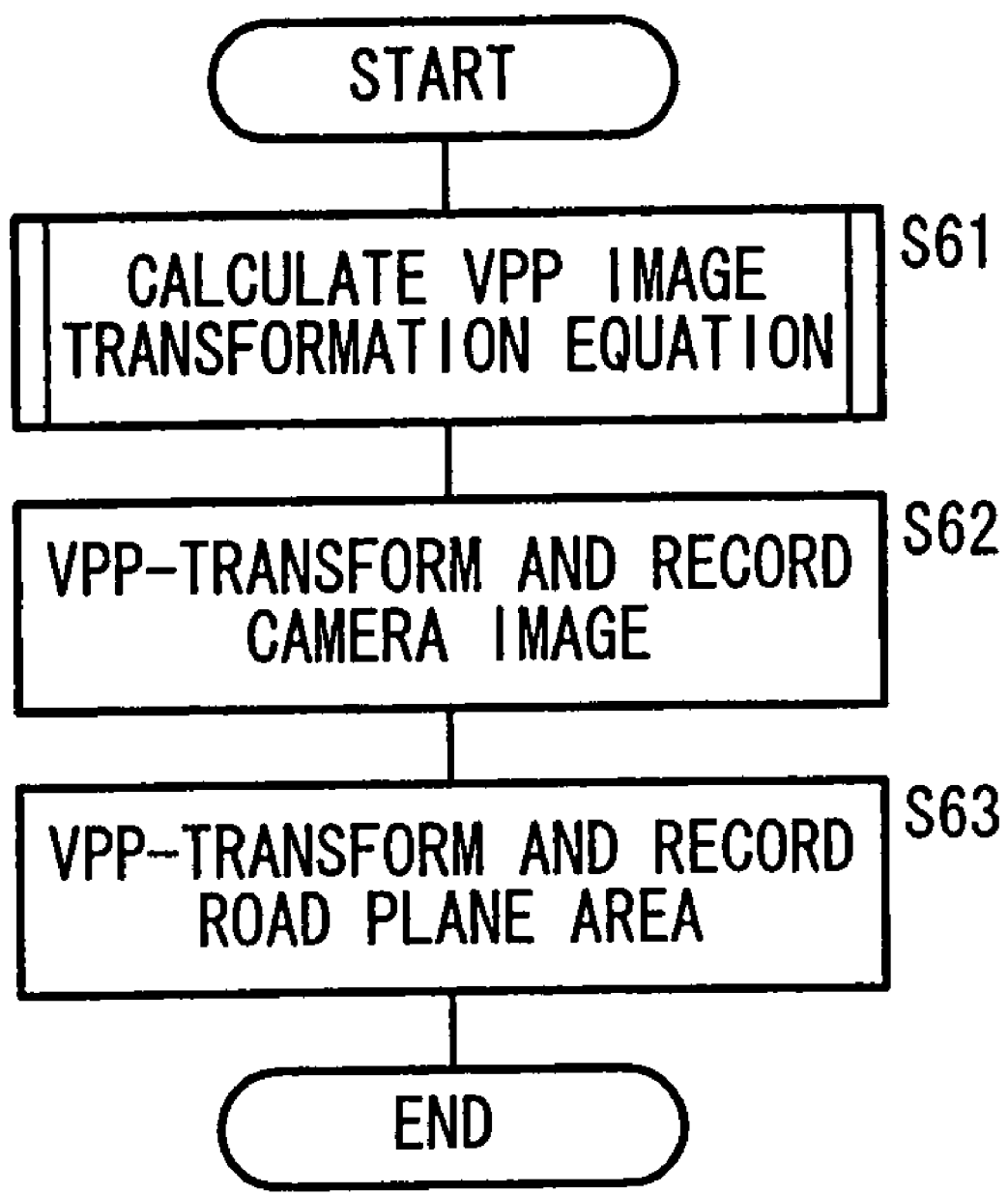
FIG. 28 is a flowchart showing a process of generating a VPP image.

Step S6 is a process of generating a VPP image representing the road plane Π as virtually seen from above in order to determine the own vehicle velocity vector $V_v$ (see FIG. 25) of the vehicle 10. Step S6 comprises a subroutine of steps S61 through S63 shown in FIG. 28. In step S61, a transformation equation $H_{vpp}$ for transforming the base image $I_b$ into a VPP image (hereinafter referred to as "VPP transformation") is calculated. Thereafter, in step S62, the base image $I_b$ is transformed into a VPP image $I_V$ according to the transformation equation $H_{VPP}$, and the VPP image $I_V$ is recorded (see FIG. 33). In step S63, the plane area $\Pi_f$ is VPP-transformed according to the same transformation equation $H_{VPP}$, and recorded (see FIG. 34). Each of steps S61 through S63 will be described in detail below.

A virtual camera for capturing the VPP image $I_V$ is assumed.

Figure 29:
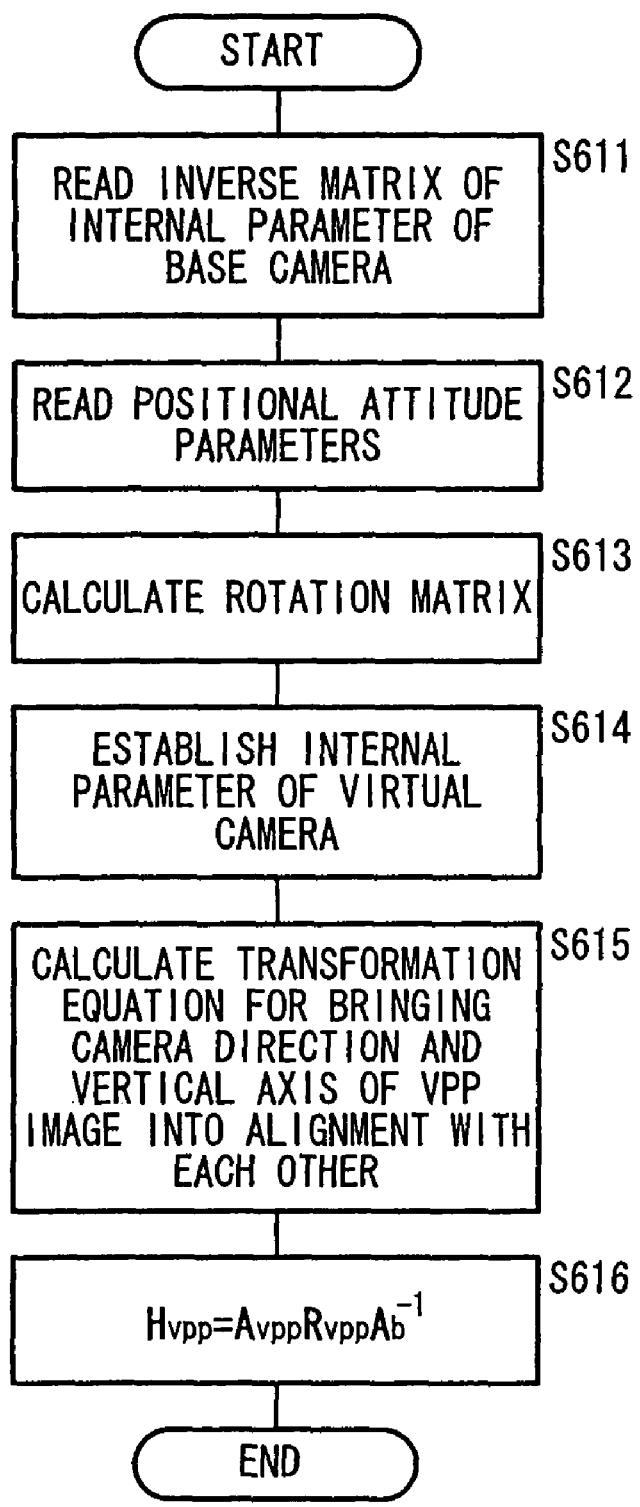
FIG. 29 is a flowchart showing a process of calculating a VPP image transformation formula.

In step S611 shown in FIG. 29, an inverse matrix $A_b^{-1}$ of the internal parameter $A_b$ of the base camera 12 is read. The internal parameter $A_b$ is expressed by the following expression (6-1):

$$A_b = \begin{pmatrix} \alpha_1 & s_1 & C_{x1} \\ 0 & \beta_1 & C_{y1} \\ 0 & 0 & 1 \end{pmatrix} \qquad (6\text{-}1)$$

where $\alpha_1$, $\beta_1$, $s_1$, $C_{x1}$, $C_{y1}$ represent constants determined by calibration of the base camera 12.

In step S612, the normal vector n and the distance d (see FIG. 16) which are positional attitude parameters with respect to the road plane Π are read.

In step S613, using the normal vector n and the distance d, a rotation matrix $R_n$ for bringing a vector $e_{OZ}$ (see FIG. 30) which represents the optical axis of the base camera 12 into alignment with the normal vector n, is calculated according to the following expressions (6-2) through (6-5):

$$e_{oz} = (0, 0, 1)^t \qquad (6\text{-}2)$$

$$\cos\theta_n = \frac{n \cdot e_{oz}}{\|n\|\|e_{oz}\|} \qquad (6\text{-}3)$$

$$c_n = (c_{n1} c_{n2} c_{n3})^t = \frac{n \times e_{oz}}{\|n \times e_{oz}\|} \qquad (6\text{-}4)$$

$$Rn = \begin{pmatrix} c_{n1}^2(1-\cos\theta_n)+\cos\theta_n & c_{n1}c_{n2}(1-\cos\theta_n)-c_{n3}\sin\theta_n & c_{n1}c_{n3}(1-\cos\theta_n)+c_{n2}\sin\theta_n \\ c_{n1}c_{n2}(1-\cos\theta_n)+c_{n3}\sin\theta_n & c_{n2}^2(1-\cos\theta_n)+\cos\theta_n & c_{n2}c_{n3}(1-\cos\theta_n)-c_{n1}\sin\theta_n \\ c_{n1}c_{n3}(1-\cos\theta_n)-c_{n3}\sin\theta_n & c_{n2}c_{n3}(1-\cos\theta_n)+c_{n1}\sin\theta_n & c_{n3}^2(1-\cos\theta_n)+\cos\theta_n \end{pmatrix} \qquad (6\text{-}5)$$

Figure 30:
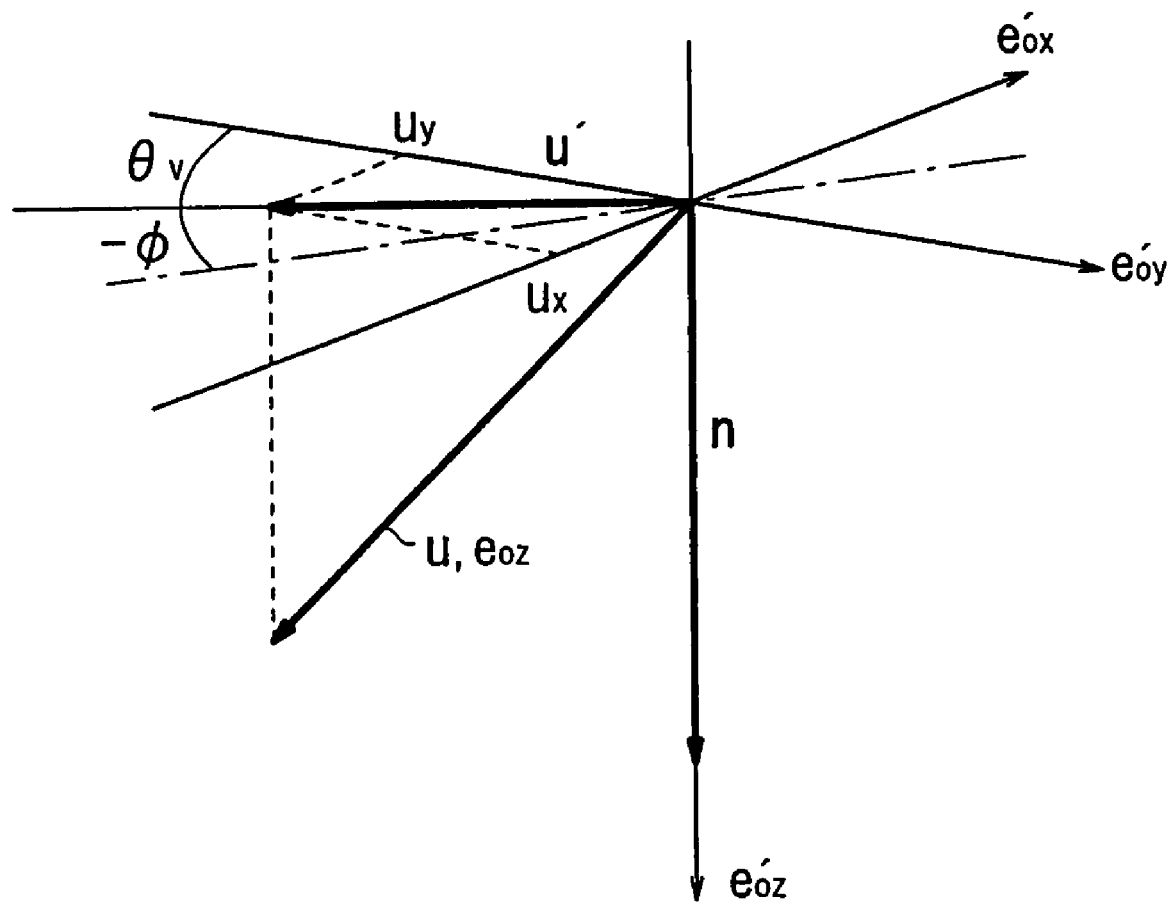
FIG. 30 is a coordinate diagram showing a relationship between a normal vector, a camera coordinate system, and the optical axis of a base camera.

These expressions (6-2) through (6-5) will be described below with reference to FIG. 30. In the expressions, portions enclosed by the vertical double lines indicate a norm, the vector $e_{OZ}$ is a unit vector of the coordinate axis Zc (see FIG. 16) which is the optical axis of the camera coordinate system. $c_n$ represents a unit vector perpendicular to the normal vector n and the vector $e_{OZ}$, and the angle θn is an angle formed between the normal vector n and the vector $e_{OZ}$. Vectors $e'_{OX}$, $e'_{OY}$, $e'_{OZ}$ shown in FIG. 30 are orthogonal unit vectors representing a virtual camera coordinate system. The dot-and-dash line represents the longitudinal direction of the vehicle 10.

In step S614, a projected distance, a scale, and an image center are specified, and an internal parameter $A_{VPP}$ of the virtual camera which views the road plane Π from above is established. The internal parameter $A_{VPP}$ is a matrix for transforming an image from virtual camera coordinates into image coordinates, and is expressed by the following expression (6-6):

$$A_{vpp} = \begin{pmatrix} \alpha_{vpp} & 0 & C_{x\_vpp} \\ 0 & \beta_{vpp} & C_{y\_vpp} \\ 0 & 0 & 1 \end{pmatrix} \qquad (6\text{-}6)$$

where $\alpha_{VPP} = d_{VPP} \cdot k_{X\text{-}VPP}$, $\beta_{VPP} = d_{VPP} \cdot k_{Y\text{-}VPP}$, $d_{VPP}$ represents the projected distance [m], $k_{X\text{-}VPP}$ and $k_{Y\text{-}VPP}$ represent scales [pixels/m] in the X, Y coordinate directions of the VPP image $I_V$, and $C_{X\text{-}VPP}$ and $C_{Y\text{-}VPP}$ represent X and Y coordinates of the center of the VPP image $I_V$, respectively.

When the distance d which is a parameter of the road plane is specified as the projected distance according to the internal parameter $A_{VPP}$, it is projected onto the detected road plane Π.

In step S615, a rotation matrix $R_V$ which is a transformation equation for rotating the image through an angle $\theta_V$ and an angle $-\theta$, in order to bring the longitudinal direction of the vehicle into alignment with the vertical axis of the VPP image, is calculated. Specifically, a vector u, as viewed from the VPP camera coordinate system, representing the unit vector $e_{OZ}$ in the direction of the optical axis of the base camera 12 is established based on FIG. 30 and the expression (6-7), and a vector u' representing the vector u as orthogonally projected onto an $e'_{OX}$, $e'_{OY}$ plane in the virtual camera coordinate system is established based on the expression (6-8).

$$u = R_n e_{OZ} = (u_x, u_y, u_z)^t \quad (6\text{-}7)$$

$$u' = (u_x, u_y, 0)^t \quad (6\text{-}8)$$

When the vectors u, u' are thus defined, the angle $\theta_v$ represents an angle formed between the vector u' and the virtual camera coordinate axis $e'_{OY}$, and expressed by the following expression (6-9):

$$\theta_v = \arctan\left(\frac{u_x}{u_y}\right) \quad (6\text{-}9)$$

The angle $\theta$ is an angle of the vector $e_{OZ}$ as the camera optical axis with respect to the longitudinal direction of the vehicle, and is determined in advance. The rotation matrix $R_V$ to be determined is expressed by the following expression (6-10):

$$R_v = \text{Rotate}(e'_{oz} - \phi)\text{Rotate}(e'_{oz}, \theta_v) \quad (6\text{-}10)$$

$$= \begin{pmatrix} \cos(-\phi) & -\sin(-\phi) & 0 \\ \sin(-\phi) & \cos(-\phi) & 0 \\ 0 & 0 & 1 \end{pmatrix} \begin{pmatrix} \cos\theta_v & -\sin\theta_v & 0 \\ \sin\theta_v & \cos\theta_v & 0 \\ 0 & 0 & 1 \end{pmatrix}$$

In step S616, the transformation equation $H_{VPP}$ for VPP transformation is calculated based on $A_b^{-1}$, $R_n$, $R_V$, $A_{VPP}$. The transformation equation $H_{VPP}$ is expressed by the following equation (6-11) where $R_{VPP} = R_V R_n$:

$$H_{vpp} = A_{vpp} R_v R_n A_b^{-1} \quad (6\text{-}11)$$

$$= A_{vpp} R_{vpp} A_b^{-1}$$

According to the equation (6-11), a process equivalent to the successive transformation of the base image $I_b$ with the matrixes $A_b^{-1}$, $R_n$, $R_V$ and $A_{VPP}$ is performed. Actually, the transformation can be performed once according to the single transformation equation $H_{VPP}$. However, the transformation with the matrixes $A_b^{-1}$, $R_n$, $R_V$ and $A_{VPP}$ will be described below for an easier conceptual understanding of the process of the transformation.

Figure 31:
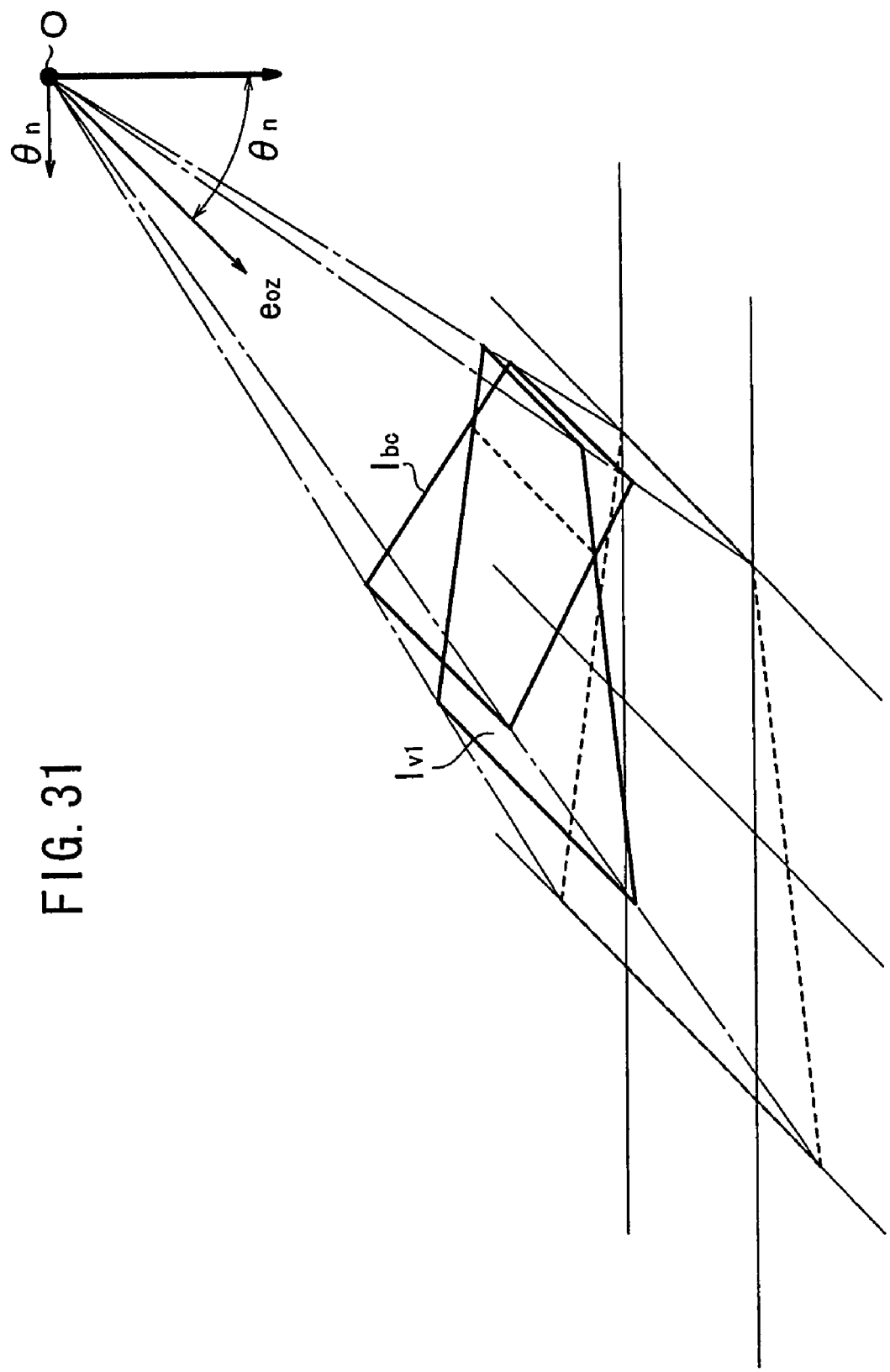
FIG. 31 is a diagram showing a process of transforming a camera coordinate system base image into an image parallel to a road plane.

First, when the base image $I_b$ (see FIG. 5) is transformed with the inverse matrix $A_b^{-1}$, it is transformed from image coordinates into the camera coordinate system, thereby producing a camera coordinate system base image $I_b c$ shown in FIG. 31.

Figure 32:
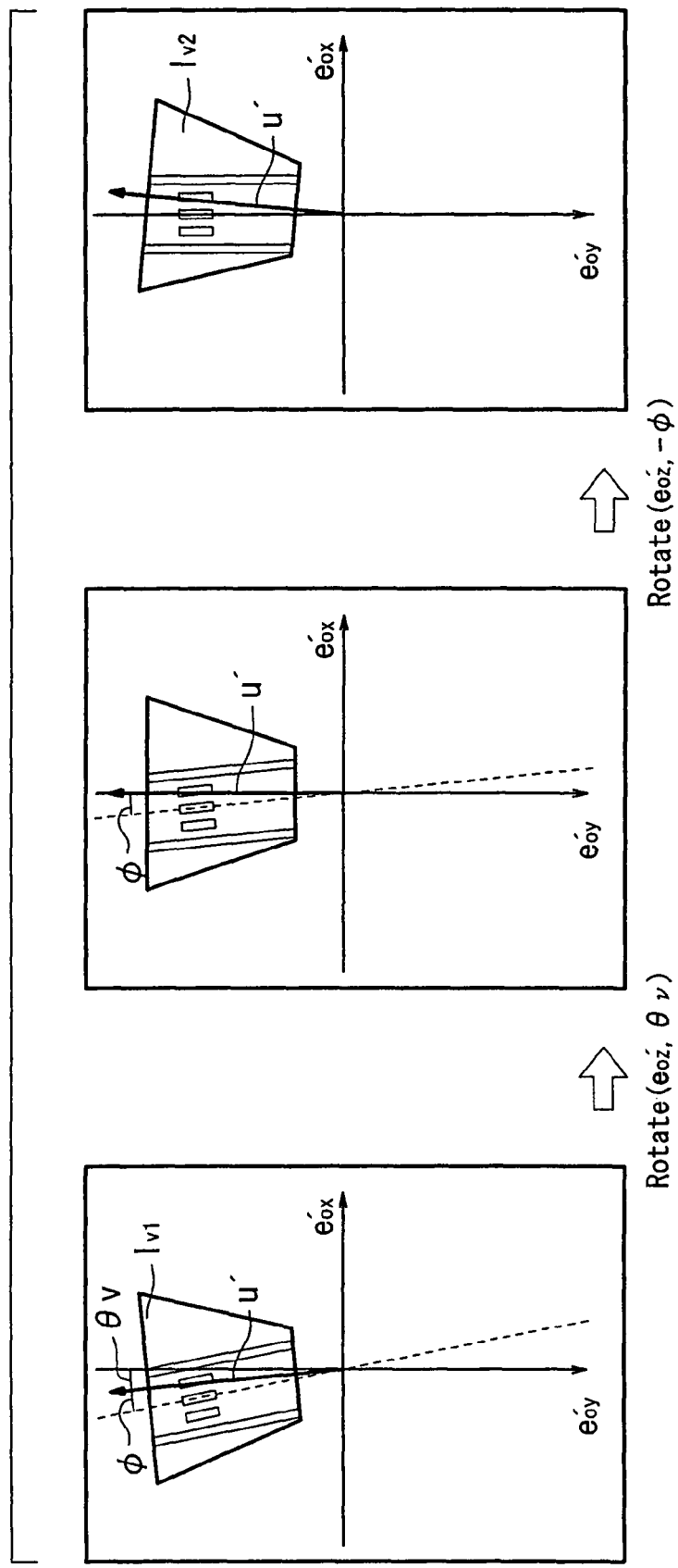
FIG. 32 is a diagram showing a rotational transformation of a first transformed image.

Then, the camera coordinate system base image $I_b c$ is transformed with the rotation matrix $R_n$. The camera coordinate system base image $I_b c$ is rotated through the angle $\theta_n$ into a first transformed image $I_{V1}$ parallel to the road plane Π with a far area thereof enlarged. As shown in FIG. 32, the first transformed image $I_{V1}$ is inclined at an angle $(\theta_V - \phi)$ to the vertical axis.

The first transformed image $I_{V1}$ is transformed with the rotation matrix $R_V$. The first transformed image $I_{V1}$ is rotated through the angle $(\theta_V - \phi)$ into a second transformed image $I_{V2}$ with the longitudinal direction of the vehicle and the vertical axis of the VPP image being aligned with each other.

Finally, the second transformed image $I_{V2}$ is transformed with the internal parameter $A_{VPP}$ of the virtual camera. The second transformed image $I_{V2}$ is transformed in scale to produce a VPP image $I_V$ (see FIG. 33) having a desired size.

The transformation equation $H_{VPP}$ is constructed of the series of matrixes $A_{VPP} R_V R_n A_b^{-1}$. The base image $I_b$ is VPP-transformed into the VPP image $I_V$ (see FIG. 33) by the transformation equation $H_{VPP}$. As described above, the VPP transformation is performed in step S62. The obtained VPP image $I_V$ is recorded in the memory.

Figure 33:
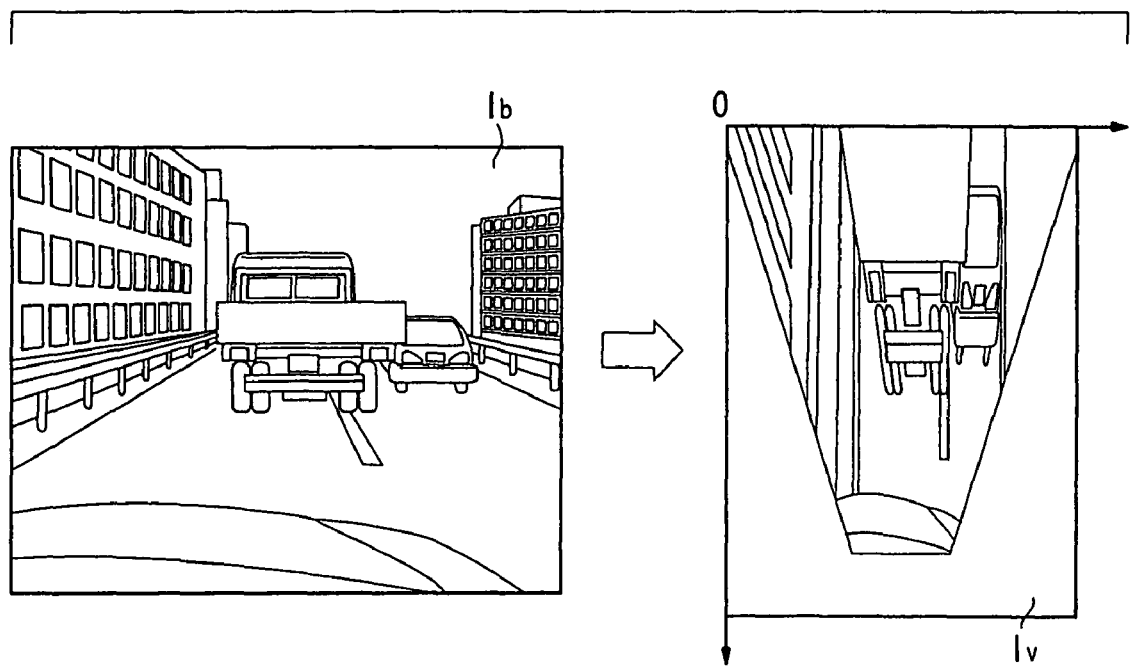
FIG. 33 is a diagram showing a VPP transformation of a base image.
Figure 34:
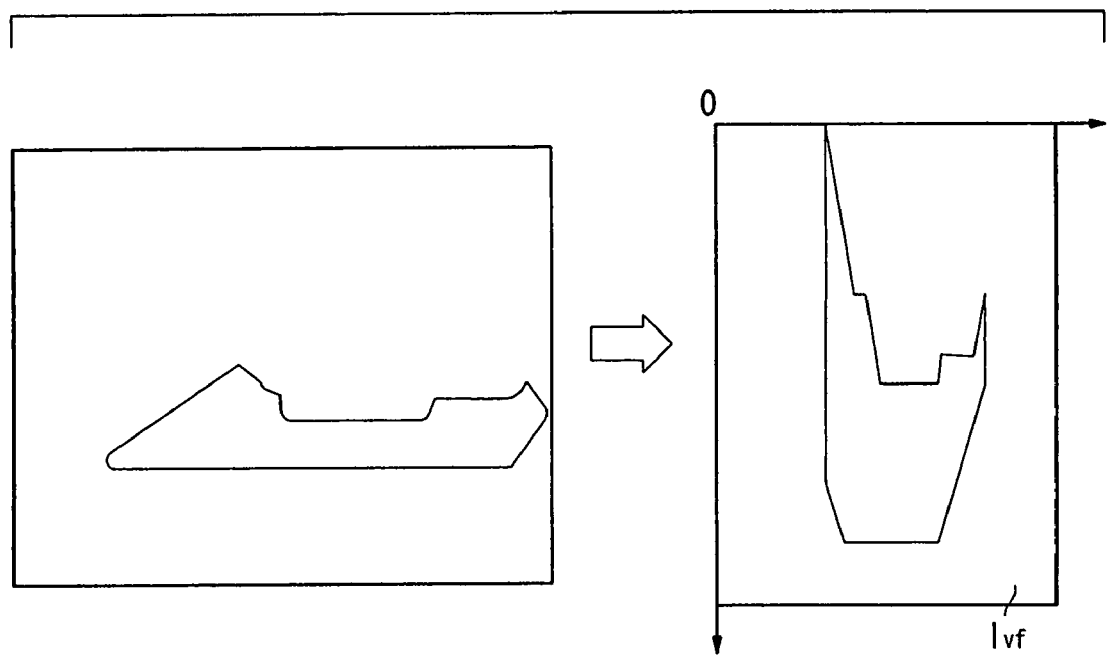
FIG. 34 is a diagram showing a VPP transformation of a road plane area.

The VPP image $I_V$ is defined by the setting of the internal parameter $A_{VPP}$ such that, as shown in FIG. 33, the origin is located at an upper left corner of the image, the transverse direction of the vehicle is the X direction (rightward direction in FIG. 33), and the longitudinal direction of the vehicle is the Y direction (downward direction in FIG. 33).

As can be seen from FIG. 33 that the VPP image $I_V$ is an image representing the road plane Π as viewed from above at a large distance with the road having a substantially constant width. The truck 70 and the passenger car 72 in the base image $I_b$ are displayed as distorted such that the upper portion of the image is enlarged.

Thereafter, in step S63, the plane area $\Pi_f$ (see FIG. 5) is VPP-transformed by the transformation equation $H_{VPP}$, producing a VPP plane image $I_{Vf}$ (see FIG. 34) which represents the plane area $\Pi_f$ as viewed from above and which is recorded. The VPP plane image $I_V f$ is indicative of the area of the road plane Π in the VPP image $I_V$. The obtained VPP plane image $I_V f$ is stored in the memory. The VPP plane image $I_V f$ is of the same shape as the road plane. In the example shown in FIG. 34, the VPP plane image $I_V f$ is substantially V-shaped and is free from the other truck 70 in the front, structures which are not horizontal such as a road side region, etc., and surfaces which are not in the same level as the road plane.

<Step S7 (Mobile Object Velocity Calculating Means>

Figure 35:
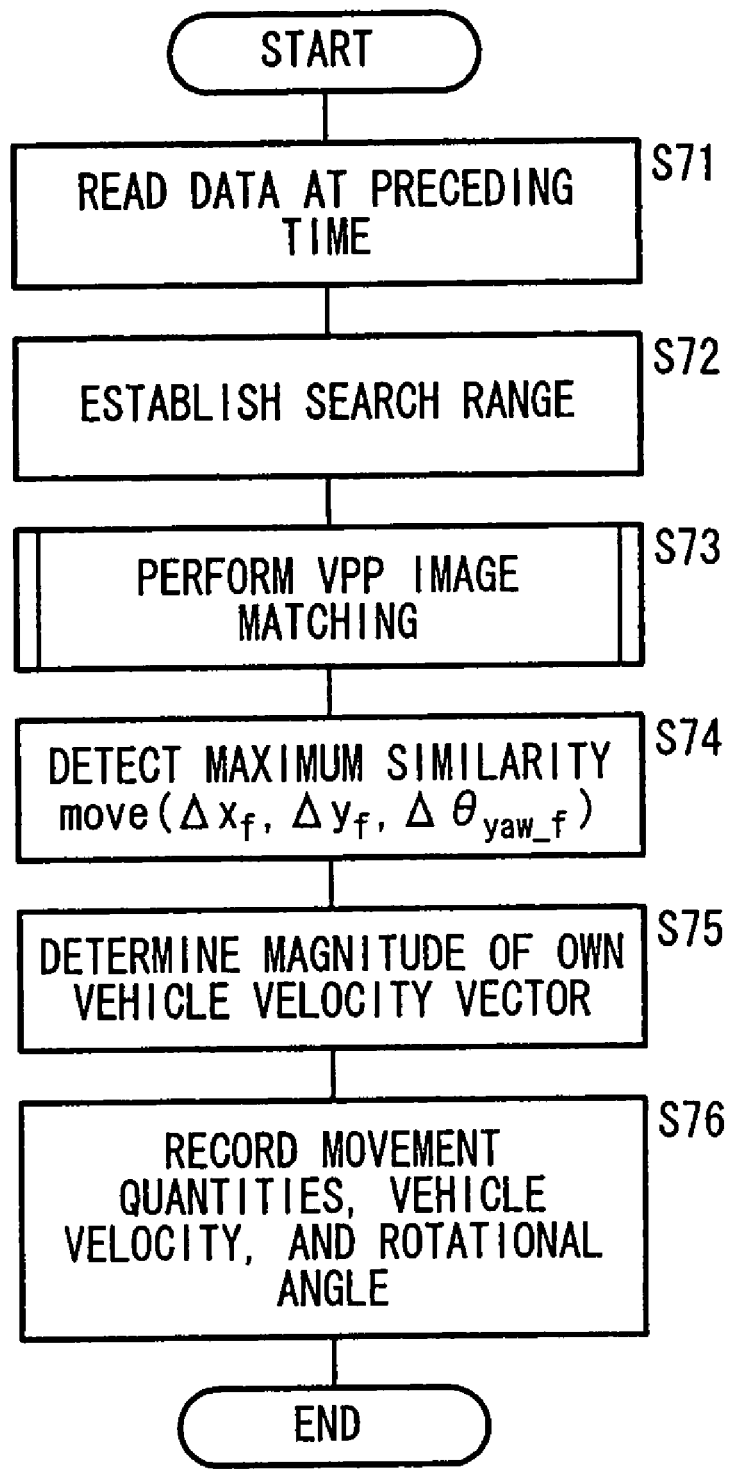
FIG. 35 is a flowchart of a processing sequence for calculating an own vehicle velocity.

Step S7 is a process for determining the own vehicle velocity vector $V_V$ (see FIG. 25) of the vehicle 10 based on the VPP image $I_V$ and the VPP plane image $I_V f$ which have been determined in step S6. Step S7 comprises a subroutine of steps S71 through S77 shown in FIG. 35. In the description which follows, a VPP image $I_V$ and a VPP plane image $I_V f$ which are obtained in the processing cycle at the present time are referred to as a VPP image $I_V(t)$ and a VPP plane image $I_{Vf}(t)$, and those which have been obtained in the processing cycle at the preceding time are differently referred to as a VPP image $I_V(t-1)$ and a VPP plane image $I_{Vf}(t-1)$. In the world coordinate system, the longitudinal direction of the vehicle 10 is defined as the coordinate axis Zw (see FIG. 10). Since the longitudinal direction of the vehicle 10 is defined as the Y axis in the VPP image $I_V$, as described above, parameters corresponding to the longitudinal direction of the vehicle 10 are denoted with a suffix "y" or "Y" in the description, given below, of step S7.

In step S71, the VPP image $I_V(t-1)$ and the VPP plane image $I_V f(t-1)$ in the processing cycle at the preceding time, and image matching movement quantities $\Delta X_0$, $\Delta Y_0$, $\Delta\theta_{yaw-0}$ are called. The image matching movement quantities $\Delta X_0$, $\Delta Y_0$, $\Delta\theta_{yaw\text{-}0}$ are parameters recorded in step S77 in the processing cycle at the preceding time, and represent a shift due to matching between the VPP image $I_V(t)$ and the VPP image $I_V(t-1)$ at the preceding time.

Figure 36:
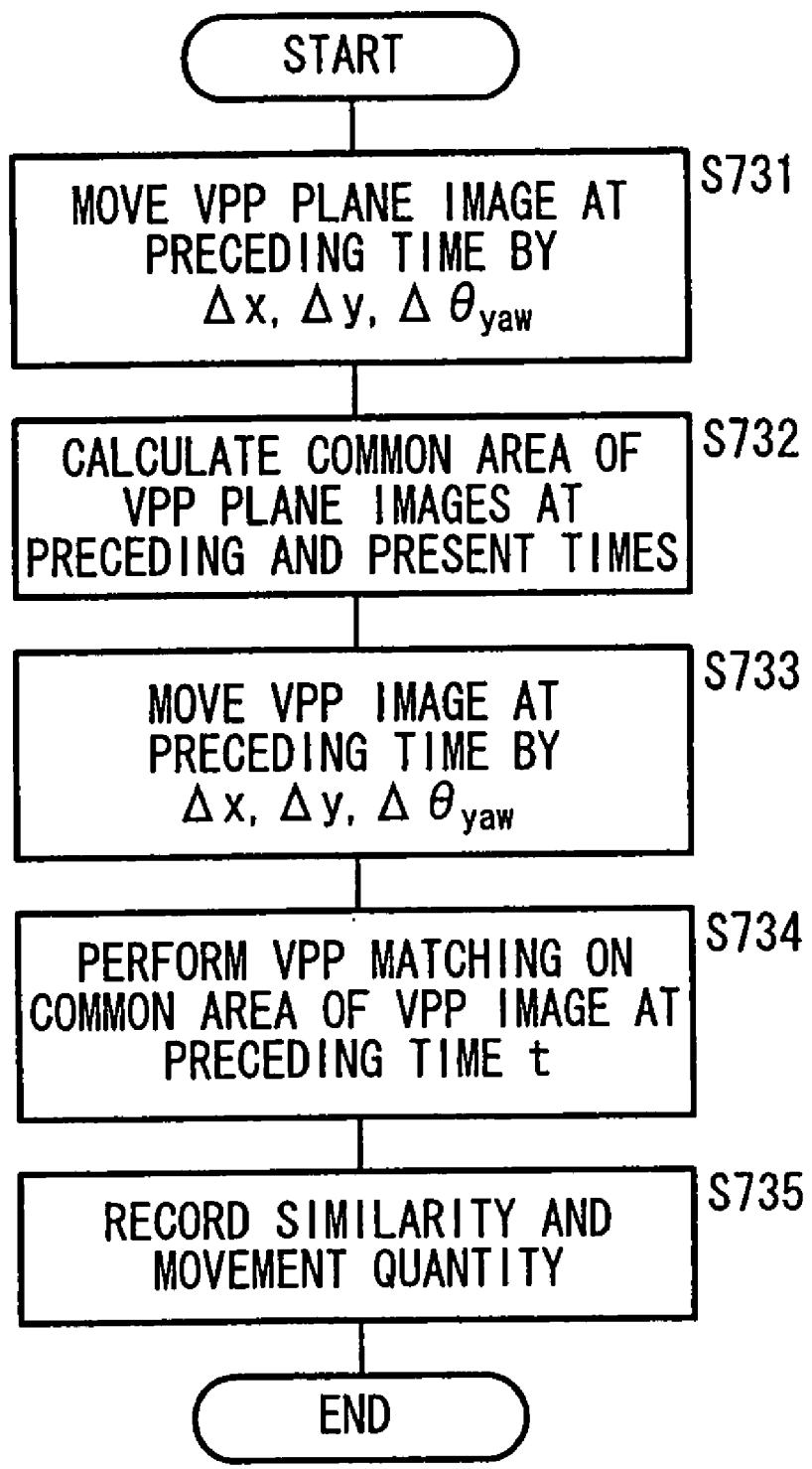
FIG. 36 is a flowchart of a processing sequence of a VPP image matching process.

In step S72, search ranges for matching between the VPP image $I_V(t)$ and the VPP image $I_V(t-1)$ are established. Specifically, ranges $\Delta X = \Delta X_{MIN}$ to $\Delta X_{MAX}$, $\Delta Y = \Delta Y_{MIN}$ to $\Delta Y_{MAX}$, and $\Delta\theta_{yaw} = \Delta\theta_{yaw\text{-}MIN}$ to $\Delta\theta_{yaw\text{-}MAX}$ having predetermined widths around the image matching movement quantities $\Delta X_0$, $\Delta Y_0$, $\Delta\theta_{yaw\text{-}0}$ at their centers are established. In step S73, the VPP image $I_V(t)$ and the VPP image $I_V(t-1)$ are relatively moved in the search ranges established in step S72 for thereby performing a VPP image matching process. Since the search ranges are established based on the image matching movement quantities $\Delta X_0$, $\Delta Y_0$, $\Delta\theta_{yaw\text{-}0}$, a period of time required to carry out the VPP image matching process may be short. Since the own vehicle velocity vector $V_V$ does not change rapidly, a portion where similarity is the greatest does not deviate from the search ranges around the image matching movement quantities $\Delta X_0$, $\Delta Y_0$, $\Delta\theta_{yaw\text{-}0}$ at their centers. Details of the VPP image matching process in step S73 will be described later (see FIG. 36).

In step S74, the results of the VPP image matching process which are determined in step S73 are referred to in detecting a portion where similarity between the VPP image $I_V(t)$ and the VPP image $I_V(t-1)$ is the greatest (a portion where NSSD ($\Delta X$, $\Delta Y$, $\Delta\theta_{yaw}$) is the smallest, as described later). A shift between the VPP image $I_V(t)$ and the VPP image $I_V(t-1)$ in the detected portion is determined as a movement quantity move ($\Delta X_f$, $\Delta Y_f$, $\Delta\theta_{yaw\text{-}f}$). $\Delta X_f$, $\Delta Y_f$, $\Delta\theta_{yaw\text{-}f}$ represent the respective values of $\Delta_X$, $\Delta_Y$, $\Delta\theta_{yaw}$ in the portion where similarity between the VPP image $I_V(t)$ and the VPP image $I_V(t-1)$ is the greatest.

In step S75, the magnitude of the own vehicle velocity vector $V_V$ of the vehicle 10 is determined based on the movement quantity move ($\Delta X_f$, $\Delta Y_f$) according to the expressions (7-1) through (7-3) shown below.

$$v_x = \frac{d_{vpp}}{\alpha_{vpp}} \frac{\Delta x_f}{\Delta t} [m/s] \quad (7\text{-}1)$$

$$v_z = \frac{d_{vpp}}{\beta_{vpp}} \frac{\Delta y_f}{\Delta t} [m/s] \quad (7\text{-}2)$$

$$|V_v| = \sqrt{v_x^2 + v_z^2} [m/s] \quad (7\text{-}3)$$

where $V_x$, $V_z$ represent the velocities in the respective transverse and longitudinal directions of the vehicle 10, and $d_{VPP}$, $\alpha_{VPP}$, $\beta_{VPP}$ the coefficient and numerical values defined by the above expression (6-6). As described above, $\Delta t$ represents the processing period. In the expressions (7-2), (7-3), the suffix "z", rather than "y", is used in the velocity $V_z$ in the longitudinal direction of the vehicle 10 because the coordinates are transformed from the VPP image coordinates back into the world coordinate system for consistency with other processes.

Since the magnitude of the own vehicle velocity vector $V_V$ is expressed as the length of an oblique line made up of velocity components in two orthogonal directions as well known in the art, the expression (7-3) is satisfied.

The magnitude of the own vehicle velocity vector $V_V$ and the angle $\theta_{YAW}$ are determined according to the expressions (7-3), (7-4), and the own vehicle velocity vector $V_V$ is thus determined. The own vehicle velocity vector $V_V$ is shown in FIG. 25. The angle $\theta_{YAW}$ may be used as the rotational angle of the vehicle 10.

In order to determine the rotational angle of the vehicle 10 more strictly, the VPP image $I_V(t-1)$ may not only be translated in the $\Delta X$ and $\Delta Y$ directions, but also be moved and rotated, and then similarity may be calculated. In this case, ranges $\Delta X = \Delta X_{MIN}$ to $\Delta X_{MAX}$, $\Delta Y = \Delta Y_{MIN}$ to $\Delta Y_{MAX}$ having predetermined widths around the image matching movement quantities $\Delta X_0$, $\Delta Y_0$ at their centers and a rotational angle $\omega = \Delta\theta_{MIN}$ to $\Delta\theta_{MAX}$ are established, and the VPP image $I_V(t-1)$ is moved with three degrees of freedom.

In step S76, the own vehicle velocity vector $V_V$ and the angle $\theta_{YAW}$ are recorded. In order to use $\Delta X_f$, $\Delta Y_f$, $\Delta\theta_{yaw\text{-}f}$ determined in step S74, as image matching movement quantities $\Delta X_0$, $\Delta Y_0$, $\Delta\theta_{yaw\text{-}0}$ for a next processing cycle, the substitutions $\Delta X_0 \leftarrow \Delta X_f$, $\Delta Y_0 \leftarrow \Delta Y_f$, $\Delta\theta_{yaw\text{-}0} \leftarrow \Delta\theta_{yaw\text{-}f}$ are performed and then recorded.

A first processing method of VPP image matching in step S73 will be described below. The first processing method comprises steps S731 through S735 shown in FIG. 36. The processing of steps S731 through S735 is carried out individually in the search ranges $\Delta X = \Delta X_{MIN}$ to $\Delta X_{MAX}$, $\Delta Y = \Delta Y_{MIN}$ to $\Delta Y_{MAX}$, and $\Delta\theta_{yaw} = \Delta\theta_{yaw\text{-}MIN}$ to $\Delta\theta_{yaw\text{-}MAX}$ established in step S72. However, the description of repetitive control is omitted, and only one processing cycle will be described below.

Figure 37:
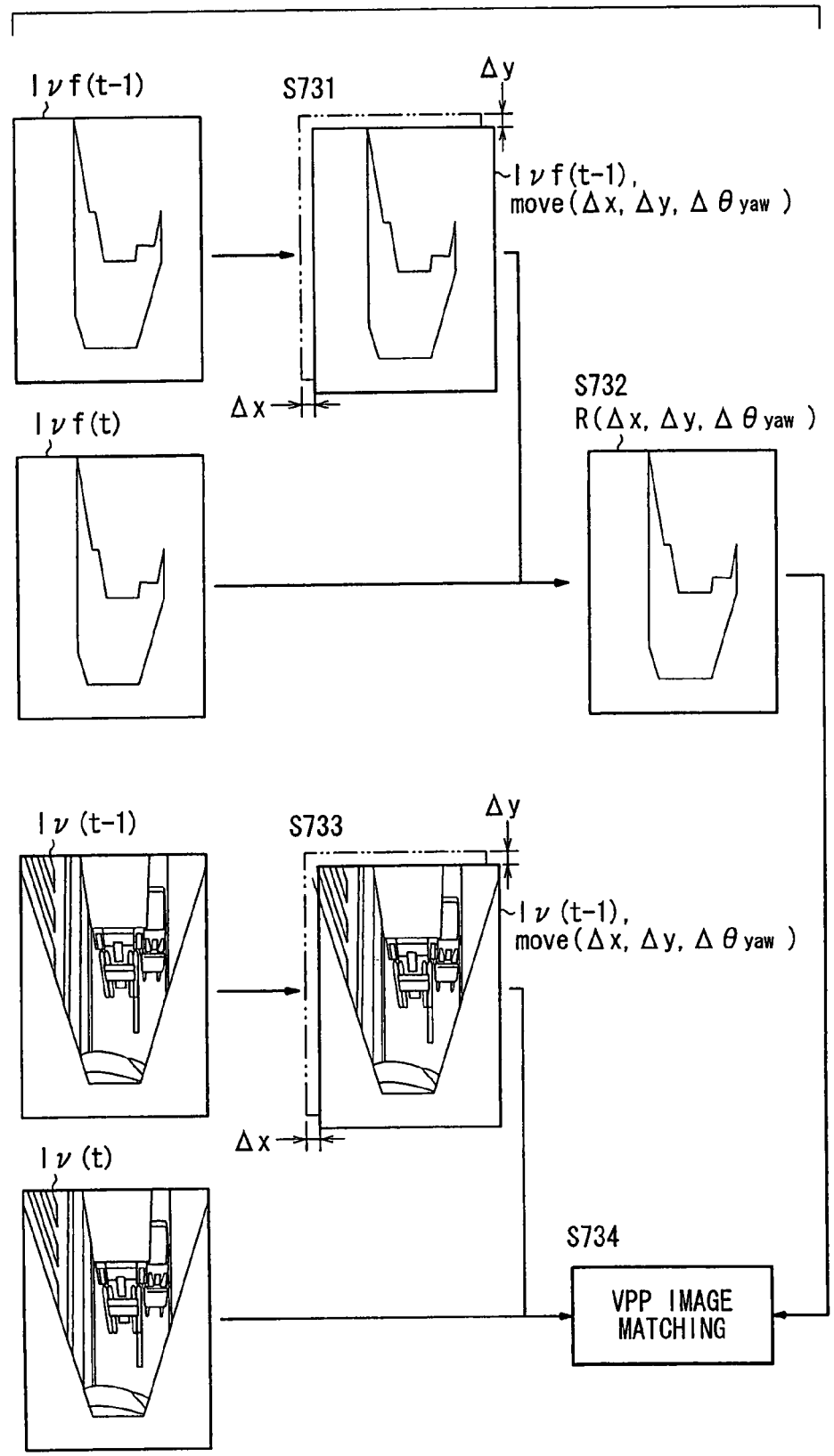
FIG. 37 is a block diagram showing processing details of the VPP image matching process.

In step S731, the VPP plane image $I_V f(t-1)$ is rotated through $\Delta\theta_{yaw}$ established at the present time and moved in the directions of $\Delta X$ and $\Delta Y$ (see "S731" shown in FIG. 37). The center of rotation is placed at the position ($C_{x\text{-}VPP}$, $C_{y\text{-}VPP}$) of the optical center of the VPP image.

In step S732 (second road plane area extracting means), a common area R ($\Delta X$, $\Delta Y$, $\Delta\theta_{yaw}$) of the VPP plane image $I_V f(t)$ and the VPP plane image $I_V(t-1)$ moved in step S731 is determined (see "S732" shown in FIG. 37).

In step S733, the VPP image $I_V(t-1)$ is rotated through $\Delta\theta_{yaw}$ established at the time and moved in the directions of $\Delta X$ and $\Delta Y$ (see "S733" shown in FIG. 37).

In step S734, based on the common area R ($\Delta X$, $\Delta Y$, $\Delta\theta_{yaw}$), the VPP image $I_V(t)$, and the moved VPP image $I_V(t-1)$, NSSD is calculated for VPP image matching according to the following expression (7-4):

$$NSSD(\Delta x, \Delta y, \Delta\theta_{yaw}) = \qquad (7\text{-}4)$$
$$\frac{1}{N} \sum_{x_i \in R(\Delta x, \Delta y, \Delta\theta_{yaw})} \{I_v(t-1) \text{ move } (\Delta x, \Delta y, \Delta\theta_{yaw})(x_i) - I_v(t)(x_i)\}^2$$

where $x_i$ represents the coordinates of pixels contained in the common area R ($\Delta X$, $\Delta Y$, $\Delta\theta_{yaw}$), N the total number of pixels contained in the common area R ($\Delta X$, $\Delta Y$, $\Delta\theta_{yaw}$), and $I_V(t-1)$ move ($\Delta X$, $\Delta Y$) an image produced by rotating the VPP image $I_V(t-1)$ through $\Delta\theta_{yaw}$ and moving the VPP image $I_V(t-1)$ by $\Delta X$, $\Delta Y$ in step S734.

According to the expression (7-4), the sum of squares of luminance differences per pixel between the VPP image $I_V(t)$ and the image produced by rotating the VPP image $I_V(t-1)$ through $\Delta\theta_{yaw}$ and moving the VPP image $I_V(t-1)$ by $\Delta X$, $\Delta Y$ is determined as a normalized value. In step S735, NSSD ($\Delta x$, $\Delta y$, $\Delta\theta_{yaw}$) is recorded as similarity with respect to each movement quantity move ($\Delta x$, $\Delta y$, $\Delta\theta_{yaw}$). Since NSSD ($\Delta x$, $\Delta y$, $\Delta\theta_{yaw}$) is normalized, mutual comparison is made possible regardless of whether the area of the common area R ($\Delta X$, $\Delta Y$, $\Delta\theta_{yaw}$) is large or small.

According to the processing of step S7, robustness is high because no corresponding point is searched for. Since a VPP image parallel to the plane is generated based on the positional attitude parameters of the plane, vibration resistance is high because of no effects of changes in the vehicle attitude. Actually, some patterns and feature points such as ground patterns are present in the road plane Π, although the road plane Π has irregular patterns. Thus, the own vehicle velocity vector $V_V$ can be determined based on those portions.

Furthermore, inasmuch as the VPP image matching process is performed within the common area R ($\Delta X$, $\Delta Y$, $\Delta\theta_{yaw}$) based on the road plane area $\Pi_{fs}$ superfluous portions such as other vehicles and road side regions are deleted, and highly accurate, fast calculations are performed.

ZNCC, referred to above, rather than NSSD, may be used as similarity in the VPP image matching process.

A second processing method of VPP image matching in step S73 will be described below. The second processing method is basically the same as the density gradient method described in step S1 and Non-patent Document 1, and converges two images so that they will overlap each other maximally while slightly changing a movement rotation matrix M which corresponds to the projection transformation matrix H.

First, a movement rotation matrix M as an initial value that is adequately close to a true value is established, and the VPP image $I_V(t-1)$ is moved and rotated according to the expression (7-5) shown below. $I_r(x)$ represents a luminance value at the coordinates x (x, y) of the VPP image $I_V(t-1)$. The movement rotation matrix M is a 3×3 matrix. The initial value of the movement rotation matrix M may be a value calculated in the step at the preceding time.

$$\tilde{I}_{vpp(t-1)}(\tilde{x}) = I_{Vpp(t-1)}(M\tilde{x}) \tag{7-5}$$

where "~" represents a luminance value after the transformation has been made.

If it is assumed that when each parameter of the movement rotation matrix M is slightly changed, the coordinates x (x, y) on the transformed VPP image $I_V(t-1)$ are changed to coordinates x" (x", y"), then the following relationship is obtained:

$$\tilde{x}'' \sim (I+D)\tilde{x} \tag{7-6}$$

where I represents a 3×3 unit matrix, and D represents a slightly changed 3×3 matrix having, as parameters thereof, slightly changed quantities of the respective parameters of the movement rotation matrix M, the slightly changed 3×3 matrix D being expressed by the following expression (7-7):

$$D = \begin{pmatrix} 0 & -\omega & dx \\ \omega & 0 & dy \\ 0 & 0 & 0 \end{pmatrix} \tag{7-7}$$

where ω represents a slight rotational angle, and dx, dy slight movement quantities in the x and y directions. ω, dx, and dy may also be referred to as a single parameter Θ. Using the relationship based on the expressions (7-5), (7-6), an evaluation function E(Θ) using the parameter Θ as an argument and indicating an overlapping state of the moved and rotated VPP image $I_V(t-1)$ and the VPP image $I_V(t)$ is expressed by the following expression (7-8):

$$E(\Theta) = \sum_{x_i \in R_{plane}} \left[\tilde{I}_{vpp(t-1)}(\tilde{x}_i'') - I_{vpp(t)}(\tilde{x}_i)\right]^2 \tag{7-8}$$

where "i" represents a pixel number, and $R_{plane}$ represents an area corresponding to the road plane Π in the VPP plane images $I_V(t-1)$, $I_V(t)$.

The expression (7-8) is equivalent to the expression (1-5). Also, the base image $I_b$ and the VPP image $I_V(t)$, the reference image $I_r$ and the VPP image $I_V(t-1)$, and the matrix Dx and the matrix D correspond to each other.

According to a method similar to the above method, therefore, $g_i$ (luminance gradient), $e_i$ (luminance difference), and Jacobian $J\Theta_i$ can be calculated, and a slightly changed matrix D can be determined by the least-squares method.

Using the slightly changed matrix D thus determined, the movement rotation matrix M is updated according to the following expression (7-9):

$$M \leftarrow M(I+D) \tag{7-9}$$

Using the movement rotation matrix M determined by the expression (7-9), the process of calculating the value of the evaluation function E(o) according to the expression (7-8) is repeated. In the repeated process, the movement rotation matrix M is updated as $M \leftarrow M(I+D)$ using the slightly changed matrix D that is obtained by the least-squares method. From the components of M at the time the value of the evaluation function E(Θ) converges to a predetermined value or smaller, $\Delta\theta_{yaw}$, $\Delta X$, $\Delta Y$ can be determined according to the expression (7-10).

$$M = \begin{pmatrix} \cos\Delta\theta_{yaw} & -\sin\Delta\theta_{yaw} & -C_{x\_vpp}\cos\Delta\theta_{yaw} + \\ & & C_{y\_vpp}\sin\Delta\theta_{yaw} + C_{x\_vpp} + \Delta X \\ \sin\Delta\theta_{yaw} & \cos\Delta\theta_{yaw} & -C_{x\_vpp}\sin\Delta\theta_{yaw} + \\ & & C_{y\_vpp}\cos\Delta\theta_{yaw} + C_{y\_vpp} + \Delta Y \\ 0 & 0 & 1 \end{pmatrix} \tag{7-10}$$

According to the second processing method in step S73, $\Delta\theta_{yaw}$, $\Delta X$, $\Delta Y$ determined by the first processing method are used as initial values, and hence $\Delta\theta_{yaw}$, $\Delta X$, $\Delta Y$ can be determined more accurately.

<Step S8>

Figure 38:
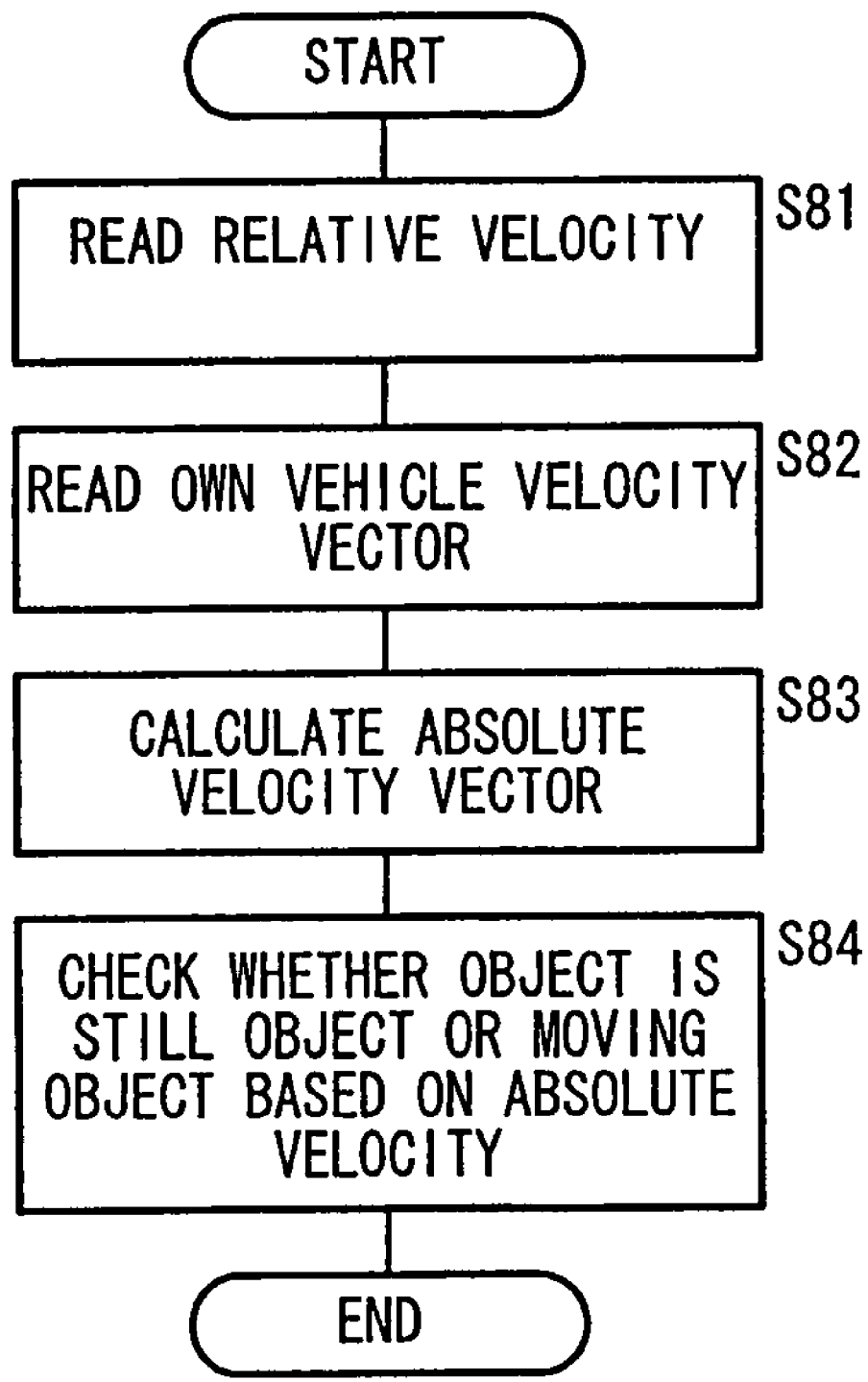
FIG. 38 is a block diagram showing a processing sequence for calculating an absolute velocity of an object.

Step S8 is a process of determining whether a detected object is a still object or a moving object. Step S8 comprises a subroutine of steps S81 through S84 shown in FIG. 38.

In step S81, the vectors Vr1, Vr2, Vr3 representing relative velocities of respective objects determined in step S55 are read. These vectors are indicated by the arrows in FIG. 25.

In step S82, the own vehicle velocity vector $V_V$ of the vehicle 10 determined in step S7 is read. The own vehicle velocity vector $V_V$ of the vehicle 10 is indicated as having its base point at the origin in FIG. 25.

Figure 39:
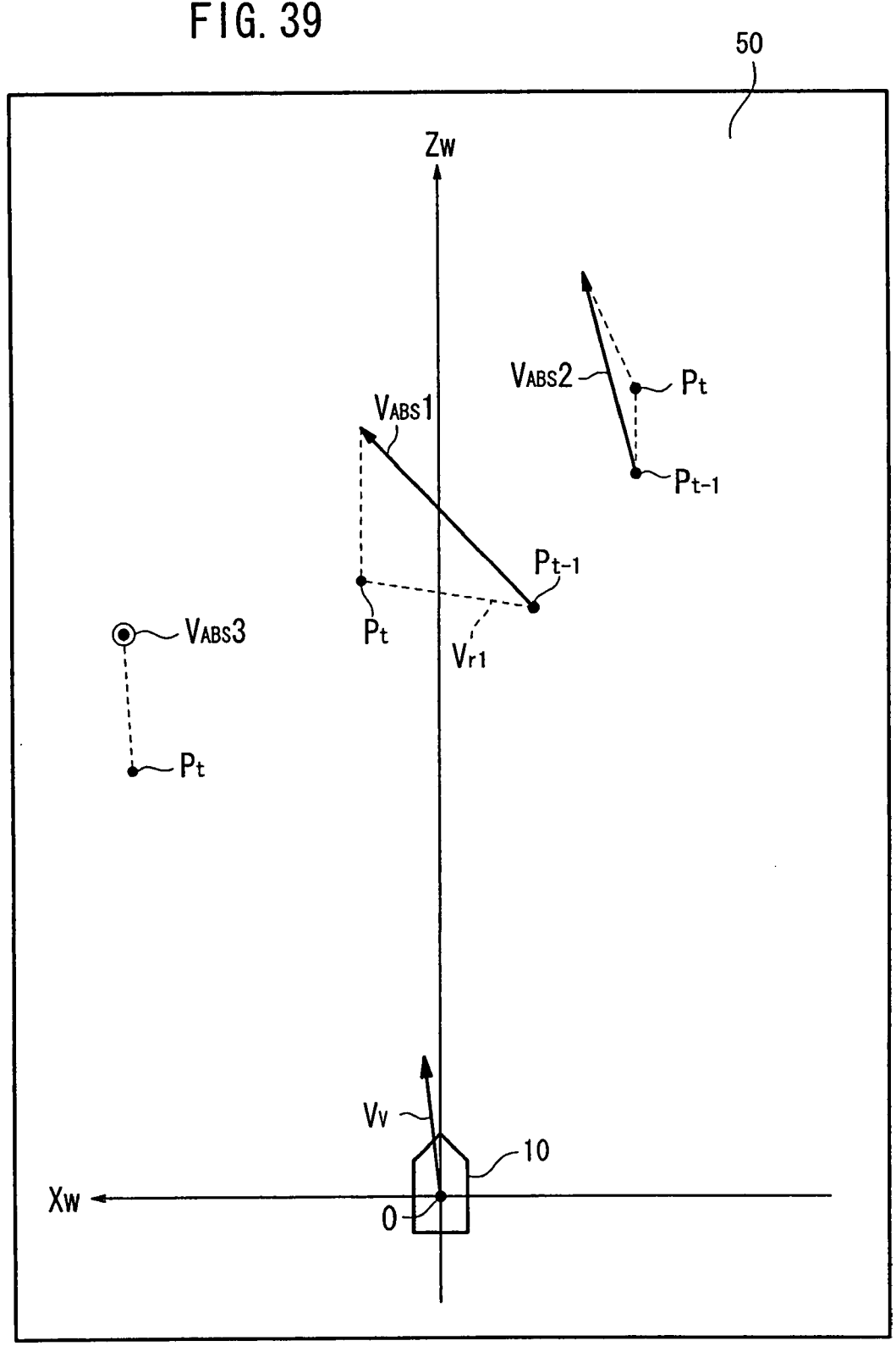
FIG. 39 is a diagram showing a voting plane in which an absolute velocity of an object is recorded.

In step S83, absolute velocity vectors $V_{ABS}N$ (N=1, 2, 3, . . . ) of the respective detected objects are calculated. The absolute velocity vectors $V_{ABS}N$ are determined by a vector addition represented by $V_{ABS}N = V_rN + V_V'$ where $V_V'$ represents a velocity component due to the motion of the vehicle, contained in the relative velocity $V_rN$. FIG. 39 shows the absolute velocity vectors $V_{ABS}N$ determined of the respective objects. As can be seen from FIG. 39, $V_{ABS}3 \approx 0$ for the guardrail 74 which is a still object.

In step S84, it is checked whether each of the detected objects is a still object or a moving object based on the absolute velocity vector $V_{ABS}N$. Specifically, the magnitude $|V_{ABS}N|$ of the absolute velocity vector of each object and a threshold value $Th_{ABS}$ are compared with each other. If $Th_{ABS} \geq |V_{ABS}N|$, then it is judged that the object under test is a still object. If $|V_{ABS}N| > Th_{ABS}$, then it is judged that the object under test is a moving object. Therefore, the guardrail 74 where $V_{ABS}3\approx0$ is identified as a still object, and the truck 70 and the passenger car 72 as moving objects.

According to the processing of step S8, therefore, the absolute velocity of a detected object can be determined accurately, and it can be judged accurately whether the object is a still object or not. Information as to the judged results may be given to a proximity reminding means between the vehicle 10 and objects.

According to the processing of steps S7, S8, a travel distance is calculated using only the plane area $\Pi_f$ of the VPP image $I_V(t)$, so that the own vehicle velocity vector $V_V$ can be determined accurately even in an environment where moving and still objects exist together.

It is known in the art that if an object at a certain height (distance) such as a road surface or the like is imaged and a velocity is measured with respect to the road surface, then when an object having a height with respect to the road surface is imaged and a velocity is measured with respect to the object, a velocity detection error occurs based on the height. According to the processing of steps S7, S8, since only the plane area $\Pi_f$ is used and calculations are made excluding the object with the height, no height-induced error is caused.

According to the processing of steps S7, S8, since the distance to the plane is also detected, even if a plane having a height with respect to a road surface such as a footway occupies a substantial portion of the image, for example, a velocity can be calculated in view of the height.

The plane area $\Pi_f$ determined in the present embodiment is an area corresponding to the substantially flat road plane $\Pi$ on which the vehicle 10 travels, and is exclusive of vertical surfaces and other surfaces at different levels though they are planar.

In the above description, the base camera 12 and the reference camera 14 are provided. However, more cameras may be provided if necessary.

The invention claimed is:

1. An object detecting apparatus comprising:
    an image capturing unit including two cameras installed on a vehicle for capturing an image of a road plane in a predetermined period of time;
    an object detecting unit for detecting an object in a predetermined period of time;
    a first object position calculating unit for calculating a spatial position of said object detected by said object detecting unit;
    an object position storing unit for storing said spatial position of said object calculated by said first object position calculating unit;
    an object position area calculating unit for calculating an object position area indicative of a position of said object on said image from said image capturing unit;
    a template storing unit for storing, as a template, said object position area calculated by said object position area calculating unit;
    a template matching unit for performing template matching on said image by moving said template at a preceding time, stored in said template storing unit, to a position of highest similarity;
    an overlapping rate calculating unit for calculating an overlapping rate between said object position area calculated by said object position area calculating unit and said template at said preceding time, moved by said template matching unit; and
    an identical object judging unit for judging whether said object detected by said object detecting unit is identical with an object previously detected or not, using said overlapping rate calculated by said overlapping rate calculating unit,
    wherein the image capturing unit acquires a stereo image consisting of a base image and a reference image captured by said two cameras, and further comprising:
    a plane area extractor for extracting a road plane area that can be traveled by the vehicle from the stereo image acquired by the image capturing unit; and
    a base image feature point extractor for extracting a feature point from the base image,
    wherein the object detecting unit is configured to:
        use stereo matching with respect to the extracted feature point with reference to the reference image;
        determine world coordinates of edge points based on the extracted feature point;
        set cells on selected one of the plane and planes parallel to the plane;
        project some edge points as candidate points located within a predetermined distance from the plane onto the cells, among the edge points whose world coordinates have been determined;
        determine a number of the candidate points projected for each of the cells; and
        perform a clustering process to detect the object, the clustering process grouping adjacent cells having the determined number of one or more, and wherein the first object position calculating unit calculates a three-dimensional position of the object detected by the object detecting unit, based on two-dimensional coordinates of the grouped adjacent cells.

2. An object detecting apparatus according to claim 1, further comprising:
    an object center-of-gravity position calculating unit for calculating an object center-of-gravity position in space using a result obtained from said first object position calculating unit;
    an object center-of-gravity position storing unit for storing said object center-of-gravity position calculated by said object center-of-gravity position calculating unit; and
    a travel-distance-between-object-centers-of-gravity calculating unit for calculating a travel distance between an object center-of-gravity position at a preceding time, stored in said object center-of-gravity position storing unit and said object center-of gravity position in space;
    wherein said identical object judging unit judges whether said object detected by said object detecting unit is identical with an object previously detected or not, using said travel distance calculated by said travel-distance-between-object-centers-of-gravity calculating unit and said overlapping rate.

3. An object detecting apparatus according to claim 1, further comprising:
    an image storing unit for storing said image captured by said image capturing unit;
    an attention point determining unit for determining an attention point in an object position area of said object that has been judged as an identical object by said identical object judging unit, among said object position areas calculated by said object position area calculating unit; and
    a second object position calculating unit for calculating a spatial position of said object using stereo matching with respect to said attention point on said image stored in said image storing unit.

4. An object detecting apparatus according to claim 3, further comprising:

an object position storing unit for storing said position of said object calculated by said second object position calculating unit; and an object movement vector calculating unit for calculating a movement vector of said object from a position of said object at a preceding time, stored in said object position storing unit and said position of said object calculated by said second object position calculating unit.

5. An object detecting apparatus according to claim 4, further comprising:

a mobile object velocity calculating unit for calculating a movement velocity of a mobile object with said object detecting apparatus mounted therein;

an object absolute velocity calculating unit for calculating an absolute velocity of said object based on said movement velocity of said object calculated by said object movement vector calculating unit and said movement velocity of said mobile object calculated by said mobile object velocity calculating unit; and a still object judging unit for judging whether said object is a still object or not, based on said absolute velocity calculated by said object absolute velocity calculating unit.

6. An object detecting apparatus according to claim 2, further comprising:

an image storing unit for storing said image captured by said image capturing unit;

an attention point determining unit for determining an attention point in an object position area of said object that has been judged as an identical object by said identical object judging unit, among said object position areas calculated by said object position area calculating unit; and a second object position calculating unit for calculating a spatial position of said object using stereo matching with respect to said attention point on said image stored in said image storing unit.

* * * * *